US011354023B2

(12) United States Patent
Moore et al.

(10) Patent No.: US 11,354,023 B2
(45) Date of Patent: Jun. 7, 2022

(54) LOCATION-BASED APPLICATION RECOMMENDATIONS

(71) Applicant: Apple Inc., Cupertino, CA (US)

(72) Inventors: Bradford A. Moore, San Francisco, CA (US); Sean B. Kelly, San Francisco, CA (US); Marcel Van Os, San Francisco, CA (US); Stephen O. Lemay, San Francisco, CA (US); Woo-Ram Lee, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/512,879

(22) Filed: Jul. 16, 2019

(65) Prior Publication Data
US 2019/0339833 A1 Nov. 7, 2019

Related U.S. Application Data

(63) Continuation of application No. 14/058,012, filed on Oct. 18, 2013, now abandoned.
(Continued)

(51) Int. Cl.
*G06F 3/0484* (2022.01)
*H04W 4/024* (2018.01)
(Continued)

(52) U.S. Cl.
CPC .......... *G06F 3/0484* (2013.01); *G01C 21/00* (2013.01); *G01C 21/3438* (2013.01);
(Continued)

(58) Field of Classification Search
CPC ....... G06F 3/0484; G01C 21/00; G01C 21/36; G01C 21/3679; G01C 21/3438;
(Continued)

(56) References Cited

U.S. PATENT DOCUMENTS 4,914,605 A  4/1990 Loughmiller et al.
5,289,572 A  2/1994 Yano et al.
(Continued)

FOREIGN PATENT DOCUMENTS

CN  102840866 A  12/2012
EP  1102037 A1  5/2001
(Continued)

OTHER PUBLICATIONS

Author Unknown, "Touch & Go' Owner's Manual," Jul. 2011, 218 pages, TOYOTA, United Kingdom.
(Continued)

*Primary Examiner* — Jennifer N Welch
*Assistant Examiner* — Parmanand D Patel
(74) *Attorney, Agent, or Firm* — Invoke

(57) ABSTRACT

A method to share map information between an electronic device and other nearby devices using peer-to-peer communication is provided. The method receives identification of different map items such as a route, points of interest, search results, a current map view and sends to a selected nearby device. The method provides different options to select the map items to share. The particular map information to share in some embodiments depends on what is currently displayed and/or selected on the map. When there are several items that can be shared and there is not a clear indication for what the user intends to share, an action list is shown to allow the user to select the information to share. Once a map item to share is selected, the method displays a share list to display a list of nearby devices. The method sends the shared information to selected devices.

17 Claims, 44 Drawing Sheets

Related U.S. Application Data

Figure 1A:
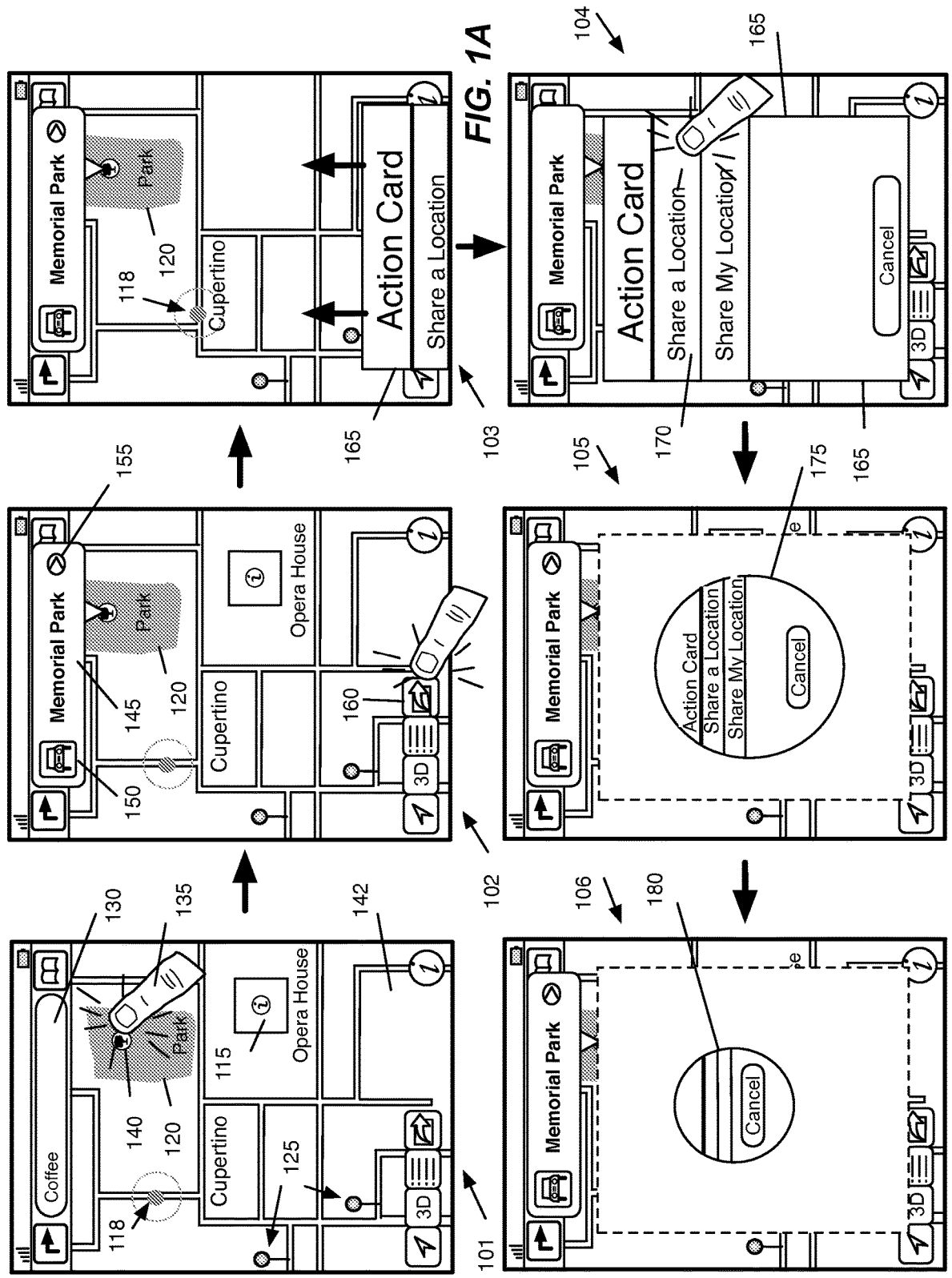

(60) Provisional application No. 61/831,912, filed on Jun. 9, 2013.

(51) Int. Cl.
| | | |
|---|---|---|
| *H04L 29/08* | (2006.01) | |
| *H04W 4/02* | (2018.01) | |
| *G06Q 30/06* | (2012.01) | |
| *G06Q 30/02* | (2012.01) | |
| *G09B 29/00* | (2006.01) | |
| *G09B 29/10* | (2006.01) | |
| *G01C 21/00* | (2006.01) | |
| *G01C 21/36* | (2006.01) | |
| *G01C 21/34* | (2006.01) | |
| *H04L 67/104* | (2022.01) | |

(52) U.S. Cl.
CPC .......... *G01C 21/36* (2013.01); *G01C 21/367* (2013.01); *G01C 21/3679* (2013.01); *G06Q 30/0261* (2013.01); *G06Q 30/0631* (2013.01); *G09B 29/003* (2013.01); *G09B 29/106* (2013.01); *H04L 67/104* (2013.01); *H04W 4/02* (2013.01); *H04W 4/024* (2018.02)

(58) Field of Classification Search
CPC .. G01C 21/367; G09B 29/106; G09B 29/003; G06Q 30/0261; G06Q 30/0631; H04L 67/104; H04W 4/02; H04W 4/024
See application file for complete search history.

(56) References Cited

U.S. PATENT DOCUMENTS

| | | | |
|---|---|---|---|
| 5,654,892 A | 8/1997 | Fujii et al. | |
| 5,920,316 A * | 7/1999 | Oran | G06F 3/0482 715/779 |
| 6,321,158 B1 | 11/2001 | Delorme et al. | |
| 6,360,167 B1 | 3/2002 | Millington et al. | |
| 6,396,518 B1 * | 5/2002 | Dow | H04N 1/00127 400/88 |
| 7,149,625 B2 | 12/2006 | Mathews et al. | |
| 7,917,285 B2 | 3/2011 | Rothschild | |
| 8,015,167 B1 | 9/2011 | Riggs et al. | |
| 8,102,253 B1 | 1/2012 | Brady, V | |
| 8,355,862 B2 | 1/2013 | Matas et al. | |
| 8,464,182 B2 | 6/2013 | Blumenberg et al. | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,660,541 B1 | 2/2014 | Beresniewicz et al. | |
| 8,739,249 B1 | 5/2014 | Kay et al. | |
| 8,798,918 B2 | 8/2014 | Onishi et al. | |
| 8,849,564 B2 | 9/2014 | Mutoh | |
| 9,043,150 B2 | 5/2015 | Forstall et al. | |
| 9,264,480 B1 * | 2/2016 | Saylor | H04L 63/104 |
| 2001/0056325 A1 | 12/2001 | Pu et al. | |
| 2002/0138196 A1 | 9/2002 | Polidi et al. | |
| 2003/0225508 A9 * | 12/2003 | Petzold | G01C 21/3676 701/533 |
| 2004/0054428 A1 * | 3/2004 | Sheha | G06F 3/04817 700/56 |
| 2004/0070602 A1 | 4/2004 | Kobuya et al. | |
| 2004/0158395 A1 | 8/2004 | Yamada et al. | |
| 2004/0203863 A1 | 10/2004 | Huomo | |
| 2004/0236498 A1 | 11/2004 | Le et al. | |
| 2004/0260464 A1 * | 12/2004 | Wong | G01C 21/3611 701/533 |
| 2005/0137791 A1 | 6/2005 | Agrawala et al. | |
| 2005/0251331 A1 | 11/2005 | Kreft | |
| 2005/0273251 A1 | 12/2005 | Nix et al. | |
| 2005/0273252 A1 | 12/2005 | Nix et al. | |
| 2006/0041372 A1 | 2/2006 | Kubota et al. | |
| 2006/0080032 A1 * | 4/2006 | Cooper | G01C 21/367 701/532 |
| 2006/0138224 A1 | 6/2006 | Azami et al. | |
| 2006/0256734 A1 | 11/2006 | Erhart et al. | |
| 2009/0063041 A1 | 3/2009 | Hirose et al. | |
| 2009/0143977 A1 | 6/2009 | Beletski et al. | |
| 2009/0254273 A1 | 10/2009 | Gill et al. | |
| 2010/0153010 A1 | 6/2010 | Huang | |
| 2010/0210281 A1 | 8/2010 | Xue et al. | |
| 2010/0325194 A1 | 12/2010 | Williamson et al. | |
| 2011/0055763 A1 | 3/2011 | Utsuki et al. | |
| 2011/0092185 A1 | 4/2011 | Garskof | |
| 2011/0105150 A1 | 5/2011 | Moon et al. | |
| 2011/0153186 A1 | 6/2011 | Jakobson | |
| 2011/0167058 A1 | 7/2011 | Van Os | |
| 2011/0199313 A1 * | 8/2011 | Tsai | G06F 9/451 345/173 |
| 2011/0250875 A1 | 10/2011 | Huang et al. | |
| 2011/0282871 A1 * | 11/2011 | Seefeld | G06F 16/9537 707/723 |
| 2011/0307174 A1 | 12/2011 | Uusitalo | |
| 2011/0313657 A1 | 12/2011 | Myllymaki et al. | |
| 2011/0313874 A1 | 12/2011 | Hardie et al. | |
| 2012/0041674 A1 | 2/2012 | Katzer | |
| 2012/0042036 A1 | 2/2012 | Lau et al. | |
| 2012/0110464 A1 | 5/2012 | Chen et al. | |
| 2012/0131519 A1 | 5/2012 | Jitkoff | |
| 2012/0253659 A1 | 10/2012 | Pu et al. | |
| 2012/0254804 A1 | 10/2012 | Sheha et al. | |
| 2012/0265685 A1 | 10/2012 | Brudnicki et al. | |
| 2012/0265758 A1 | 10/2012 | Han et al. | |
| 2012/0284789 A1 | 11/2012 | Kim et al. | |
| 2012/0303263 A1 | 11/2012 | Alam et al. | |
| 2012/0323898 A1 | 12/2012 | Kumar et al. | |
| 2013/0045729 A1 | 2/2013 | Haik et al. | |
| 2013/0172013 A1 | 7/2013 | Dessouky et al. | |
| 2013/0191020 A1 | 7/2013 | Emani et al. | |
| 2013/0205196 A1 | 8/2013 | Han et al. | |
| 2013/0244685 A1 | 9/2013 | Dempski | |
| 2013/0252583 A1 | 9/2013 | Brown et al. | |
| 2014/0032707 A1 | 1/2014 | Doshi | |
| 2014/0129951 A1 | 5/2014 | Amin et al. | |
| 2014/0132400 A1 | 5/2014 | Heaven et al. | |
| 2014/0171116 A1 | 6/2014 | Lamarca et al. | |
| 2014/0194146 A1 | 7/2014 | Yarvis | |
| 2014/0213304 A1 * | 7/2014 | Beckett | G01C 21/32 455/456.6 |
| 2014/0256357 A1 | 9/2014 | Wang et al. | |
| 2014/0274145 A1 | 9/2014 | Cronin et al. | |
| 2014/0278051 A1 | 9/2014 | Mcgavran et al. | |
| 2014/0282102 A1 | 9/2014 | Avrahami | |
| 2015/0351073 A1 | 12/2015 | Ball et al. | |

FOREIGN PATENT DOCUMENTS

| | | |
|---|---|---|
| EP | 2672225 A2 | 12/2013 |
| EP | 2672226 A2 | 12/2013 |
| WO | 2010/040405 A1 | 4/2010 |
| WO | 2011/146141 A1 | 11/2011 |
| WO | 2012/034581 A1 | 3/2012 |
| WO | 2013/184348 A2 | 12/2013 |
| WO | 2013/184444 A2 | 12/2013 |
| WO | 2013/184449 A2 | 12/2013 |
| WO | 2015/183445 A1 | 12/2015 |

OTHER PUBLICATIONS

Author Unknown, "Android 2.3.4 User's Guide", May 20, 2011, pp. 1-384, Google, Inc.

Author Unknown, "Garmin. nuvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

(56) References Cited

OTHER PUBLICATIONS

Ruhs, Chris, "My Favorite Android Apps: Maps," Jun. 24, 2011, 1 page, available at http://www.youtube.com/watch?v=v2aRkLkLT3s.

* cited by examiner

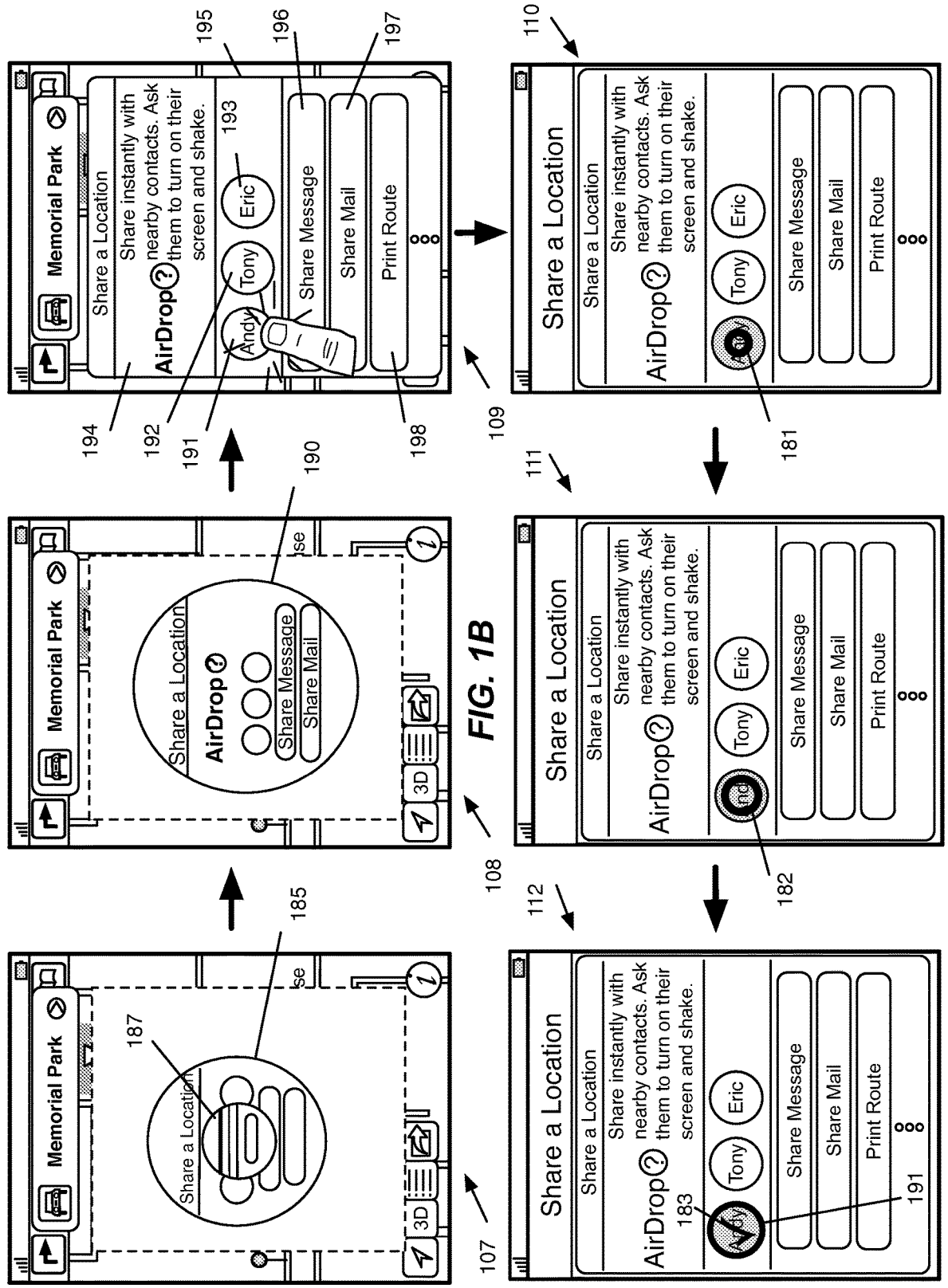

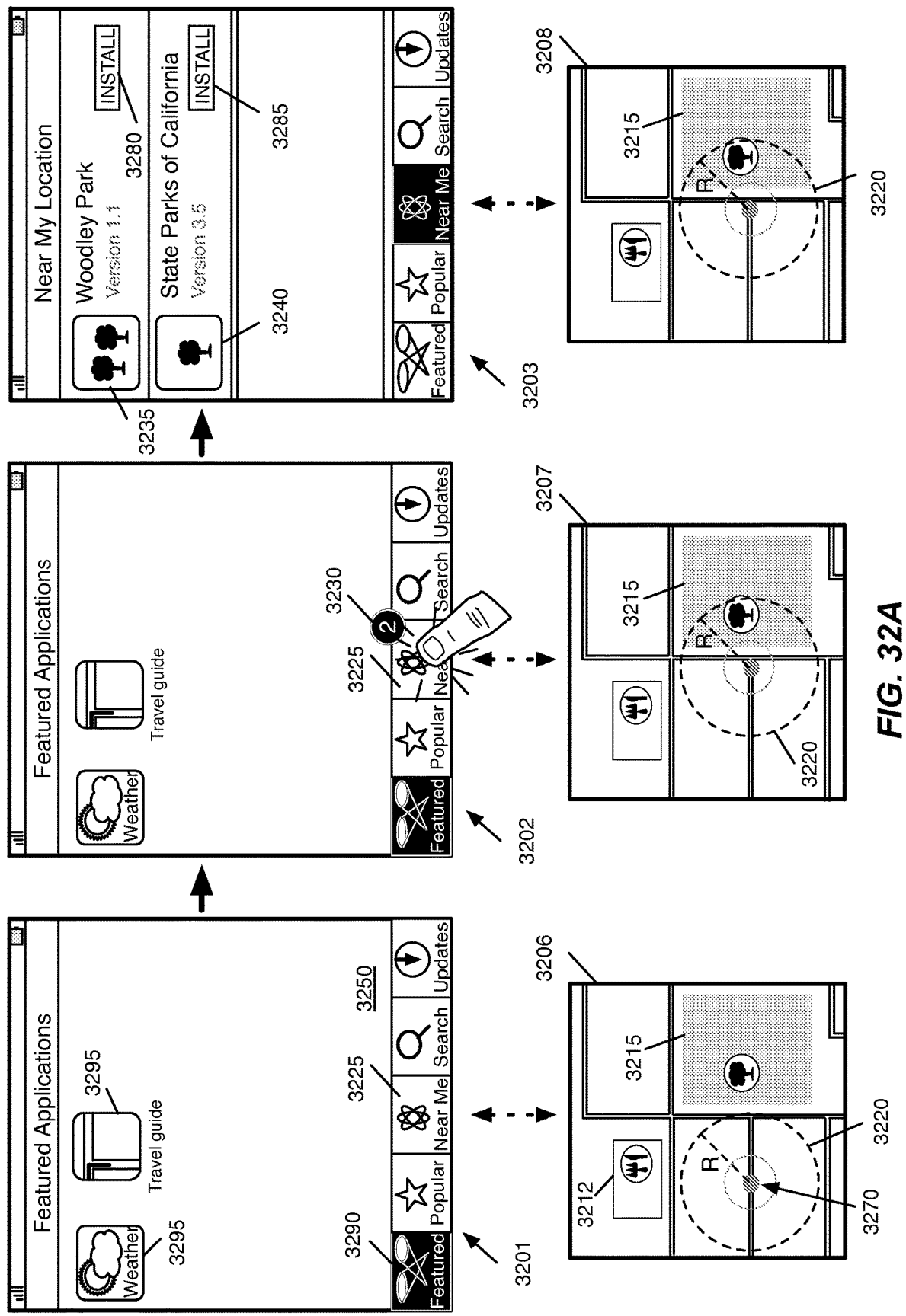

LOCATION-BASED APPLICATION RECOMMENDATIONS

INCORPORATION BY REFERENCE; DISCLAIMER

Each of the following applications are hereby incorporated by reference: application Ser. No. 14/058,012 filed on Oct. 18, 2013; application No. 61/832,912 filed on Jun. 9, 2013. The Applicant hereby rescinds any disclaimer of claim scope in the parent application(s) or the prosecution history thereof and advises the USPTO that the claims in this application may be broader than any claim in the parent application(s).

BACKGROUND

Many electronic devices such as desktops, laptops, tablet devices, smartphones, etc., include mapping and navigation applications. Most of these applications generate displays of a map based on map data that describes relative locations of streets, highways, points of interest, etc., in the map.

Some mapping and navigation applications provide tools for searching for points of interest and addresses. Users can select the search results, points of interest, or addresses and read detailed information cards associated with these locations. Some mapping and navigation applications provide photos, phone numbers, addresses, web sites, etc., related to a selected location of the map. Some mapping and navigation applications allow the user to see different routes between source and destination addresses and get turn-by-turn directions. Users can mark points of interest and addresses on a map by dropping marker pins on these locations. Some mapping and navigation applications allow bookmarking the information cards associated with different locations on the map.

Some electronic devices utilize a digital application distribution platform that include a set of servers sometimes referred to as application store server (or app store servers) that provide a list of available applications to select and download into the electronic devices. The available applications include free as well as for fee applications.

The device includes a client application (referred to as application store or app store application) that receives the list of available applications from the set of servers. The applications are often categorized in different groups such as games, music, business, developer tools, education, lifestyle, etc., to allow browsing for applications in a desirable category. In addition some application are recommended, for example, based on the number of downloads, reviews, popularity, price, etc.

BRIEF SUMMARY

Some embodiments provide a method for a device to share map information with other nearby devices using peer-to-peer communication. The method receives identification of different map items such as routes, points of interest, search results, a current map view, etc., and sends the identified information to selected nearby devices.

The method provides different options to select the map items to share. The particular map information to share in some embodiments depends on what is currently displayed and/or selected on the map. When there are several items that can be shared and there is not a clear indication for what the user intends to share (e.g., at the same time the current location is available and a route is displayed), an action list is shown to allow the user to select the information to share.

Anytime it is clear what the user intends to share, the action list is not displayed and the share list is displayed. For instance, when the map shows the current location but no other map items such as points of interest or pins are selected and no routes are displayed, the method shares the current location of the device.

Once a map item to share is selected, the method displays a share list that includes using peer-to-peer communication as one of the options for sharing the information. The share list also displays a list of nearby devices that have established peer-to-peer communication with the device and provides an option for selecting any of the listed nearby devices to receive the shared information.

Some embodiments provide animations for displaying the action list, replacing it with the share list, and sending of the information to the selected user. For instance, the action list slides up from the bottom of the screen. In some embodiments the action list is replaced by the share list with a telescopic animation where the action list shrinks into a small circle or a point and the share list grows from the circle or the point.

Some embodiments list the nearby devices as small icons or selection buttons that identify the nearby device (or the device user). When a nearby device is selected to receive the shared information, some embodiments use animation on a corresponding selection button to show the progress for sending the information. For instance, an enlarging and shrinking colored geometric object (e.g., a circle) is displayed inside the selection button to show the information transfer is in progress and the geometric object is replaced by another object (such as a checkmark) to show the successful transmission.

Some embodiments hide different control buttons that are required to take different actions on a displayed map in order to maximize the area, used for displaying the map. When a command is received from the user, a set of control buttons that are relevant o the task at hand are displayed. The set of controls are hidden again after receiving another command from the user. For instance, when the devices has a touch-screen display, the hidden control buttons are displayed when the user performs a hand gesture such as a single touch (or tap) on the touchscreen. The same gesture hides the buttons again.

Once a nearby device receives map information to share, the receiving device displays a notification for receiving the map information. When sharing is accepted, the mapping application is brought to the foreground of the receiving device and the shared map information is displayed.

Some embodiments provide a method for recommending applications to be installed on a device based on the current location of the device or based on the location of a selected item on a map that is displayed on the device. Some embodiments provide an application (also referred to as application store or app store) that facilitates finding and installing different applications to be executed on a device. In some embodiments this application provides an option to recommend popular and/or the most relevant applications based on the current location of the device. Some embodiments provide a selection button (also referred to as "near me" button) that allows access to location-based application recommendations. When a device moves around, the "near me" button in shows badges to indicate the number of available apps. As a device moves, the recommended apps change based on the current location of the device.

Some embodiments provide application recommendations when a map is displayed on a device. For instance, when a point of interest is selected on a displayed map, popular applications related to the vicinity of the selected item are shown. The user is provided with the option to install the recommended applications (for a fee or for free).

Some embodiments provide an option for businesses, points of interests, and other locations on the map to register applications for recommending to users that are near their locations. In some embodiments applications that are registered for a location are considered the most relevant and are prioritized to show as recommended applications. For instance, when a device is in or close to a grocery store and the grocery store has registered an application that offers discount coupons, the grocery store application is shown as a high priority recommendation. The device can then install the grocery store application and use the offered discount coupons.

When a device is away from home (e.g., away from the billing area of the device or the user's home address) the recommended applications are suggested based on the assumption that the user is travelling. For example, in Paris a device that is registered to an American user gets recommendations for applications that provide Paris Guide or French translator while a device in the same vicinity that is registered to a local French user gets recommendations for local newspapers or local events applications.

Some embodiments provide location-based application recommendation based on both the current location of a device and the travelling speed of the device. For instance, when a device is at a bus or train station, an application to show the bus or train schedules is recommended. On the other hand, when the speed of the device indicates that the device might already be in a bus or a train, an application for travel itinerary is recommended.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF TIRE DRAWINGS

The novel features of the invention are set forth in the appended claims. However, purpose of explanation, several embodiments of the invention are set forth in the following figures.

FIGS. 1A-1B conceptually illustrate a user interface for sharing map information in some embodiments of the invention.

Figure 2:
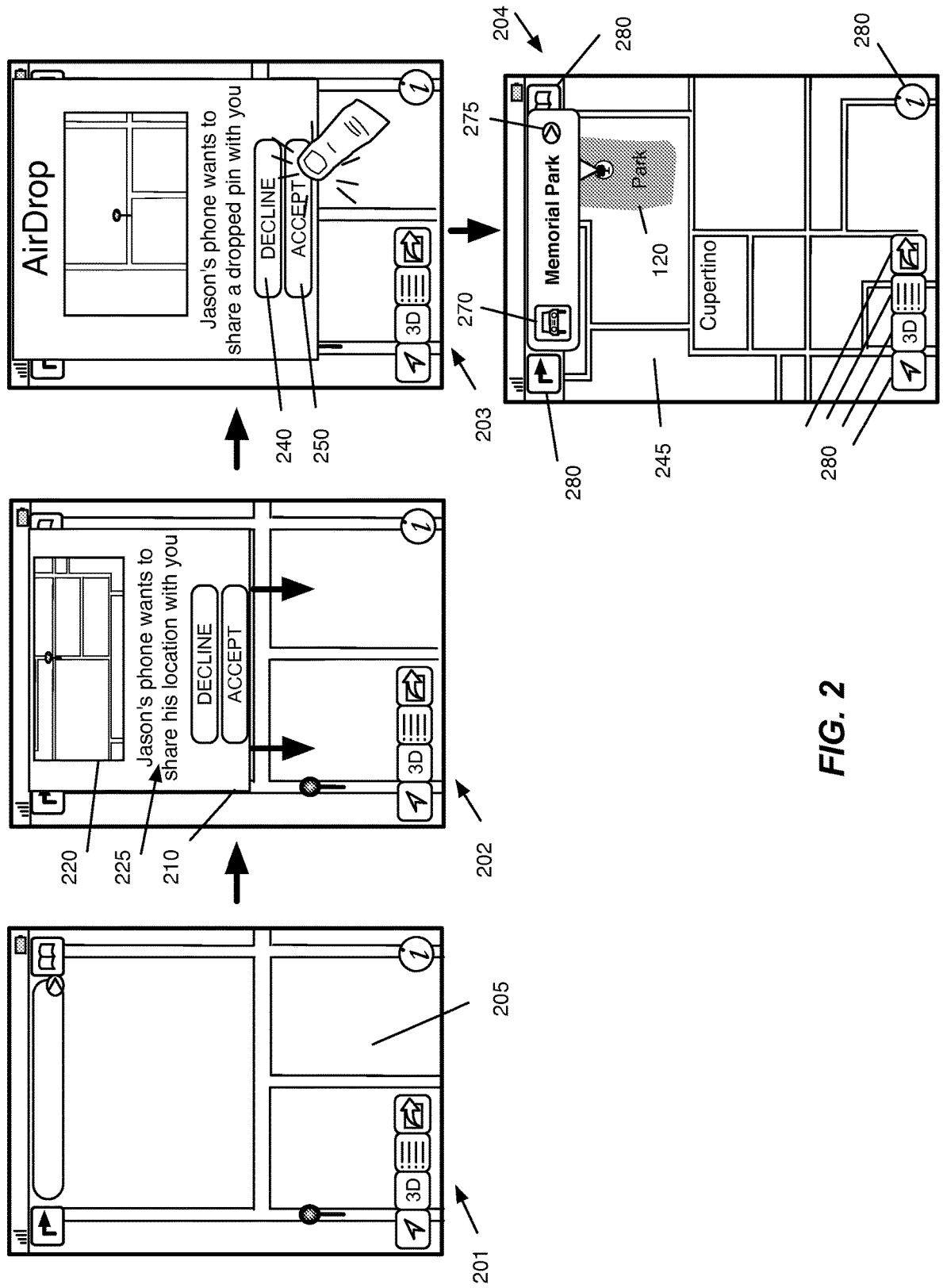

FIG. 2 conceptually illustrates a user interface for receiving shared map information from other devices in some embodiments of the invention.

Figure 3:
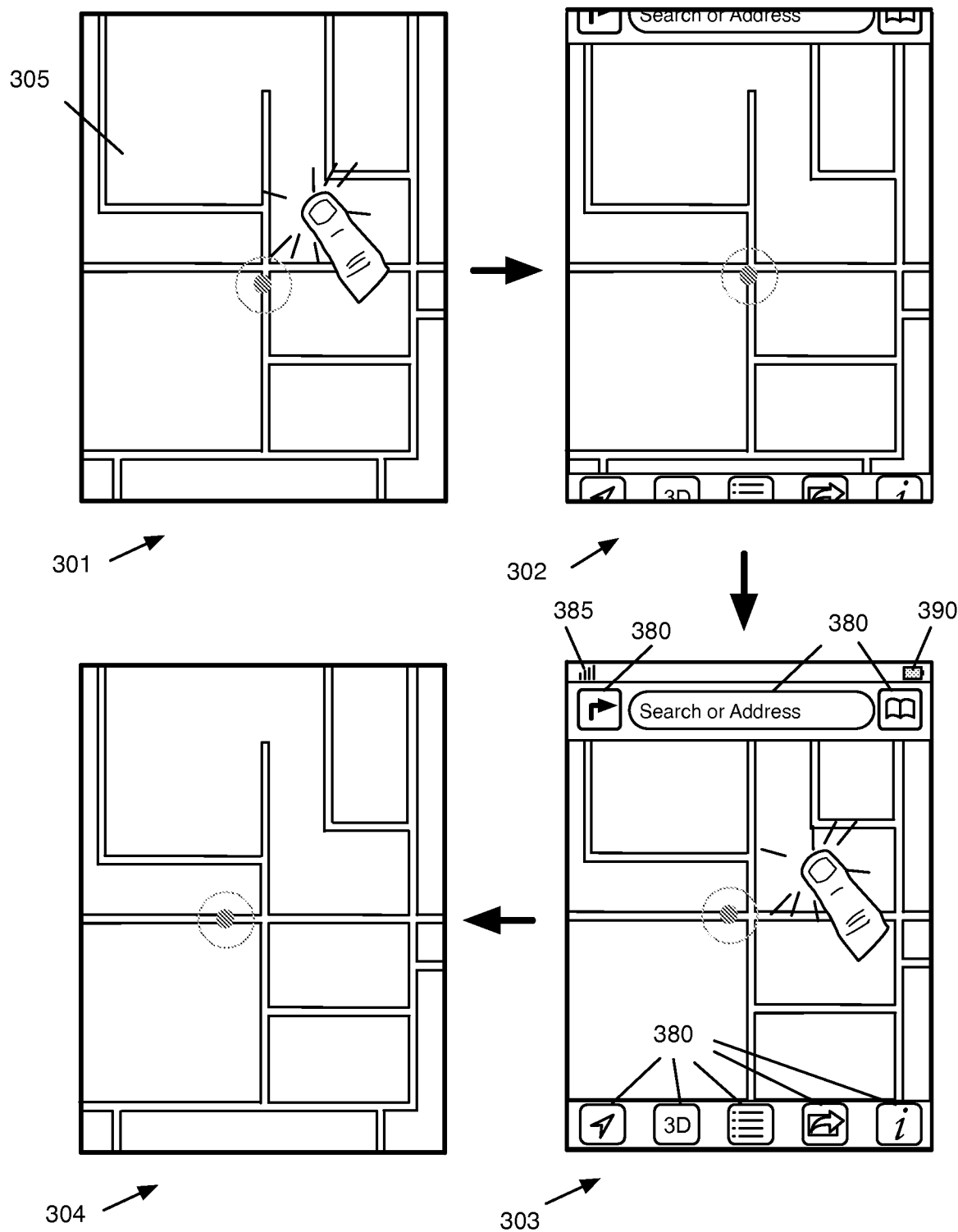

FIG. 3 conceptually illustrates a user interlace for displaying a map in some embodiments of the invention.

Figure 4A:
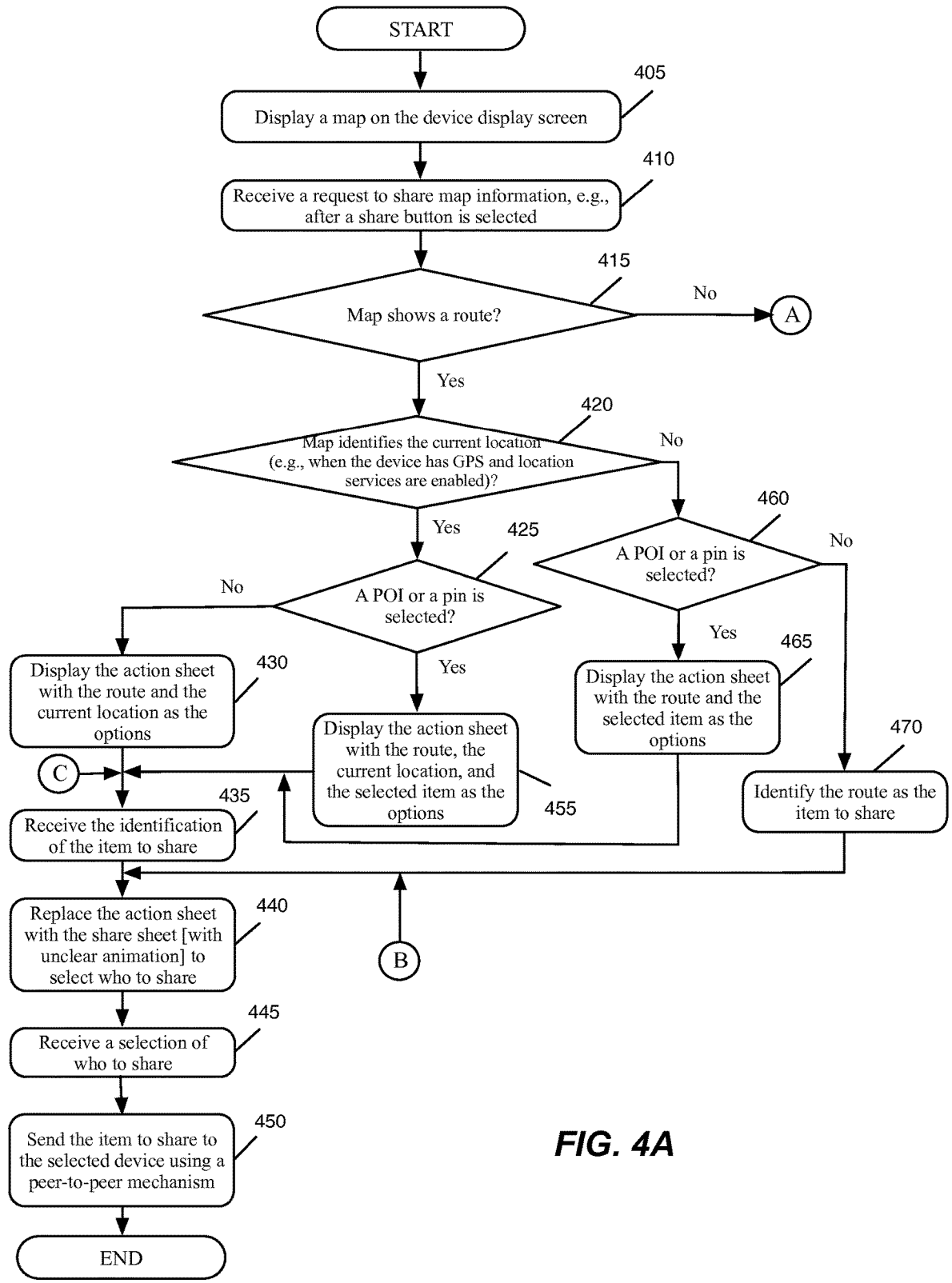
Figure 4B:
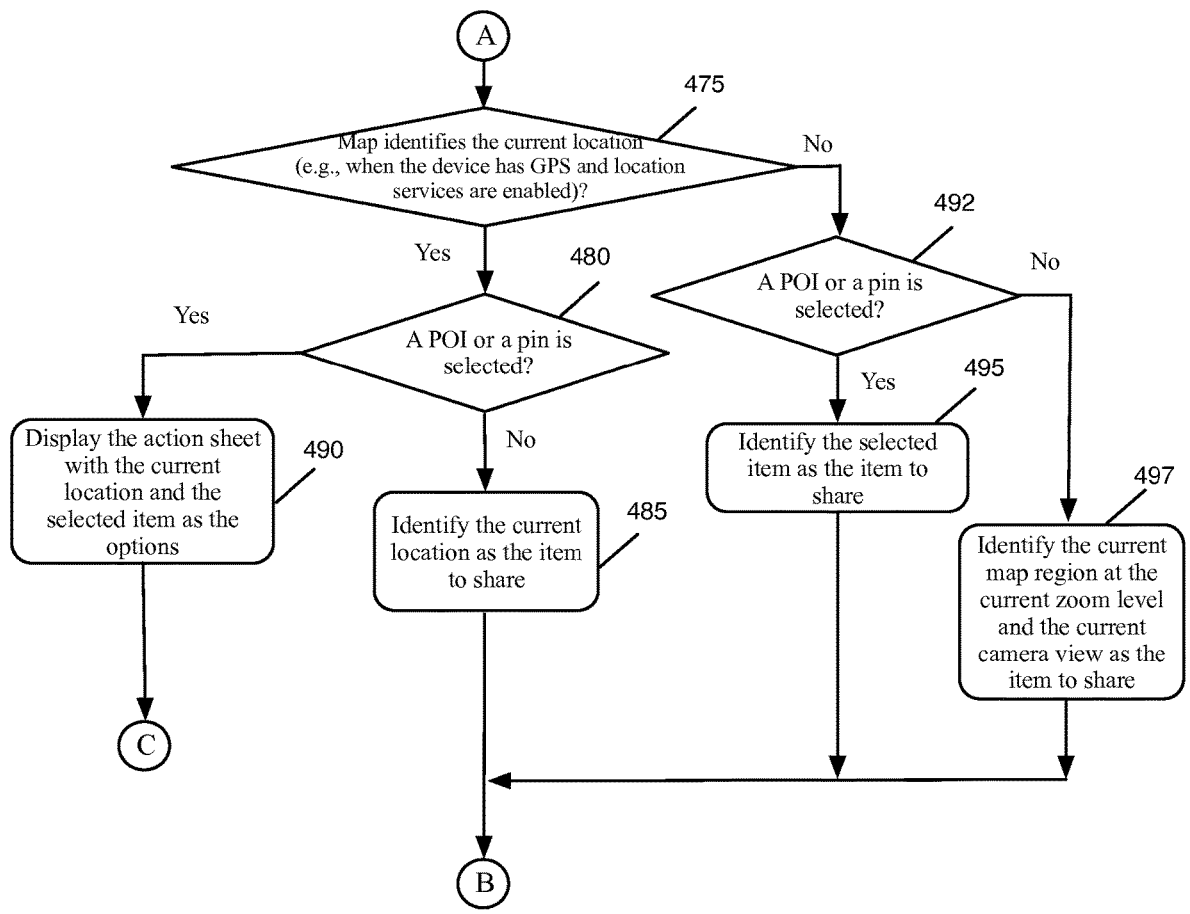

FIGS. 4A-4B conceptually illustrate a process for sharing map-related information to share with other devices.

Figure 5:
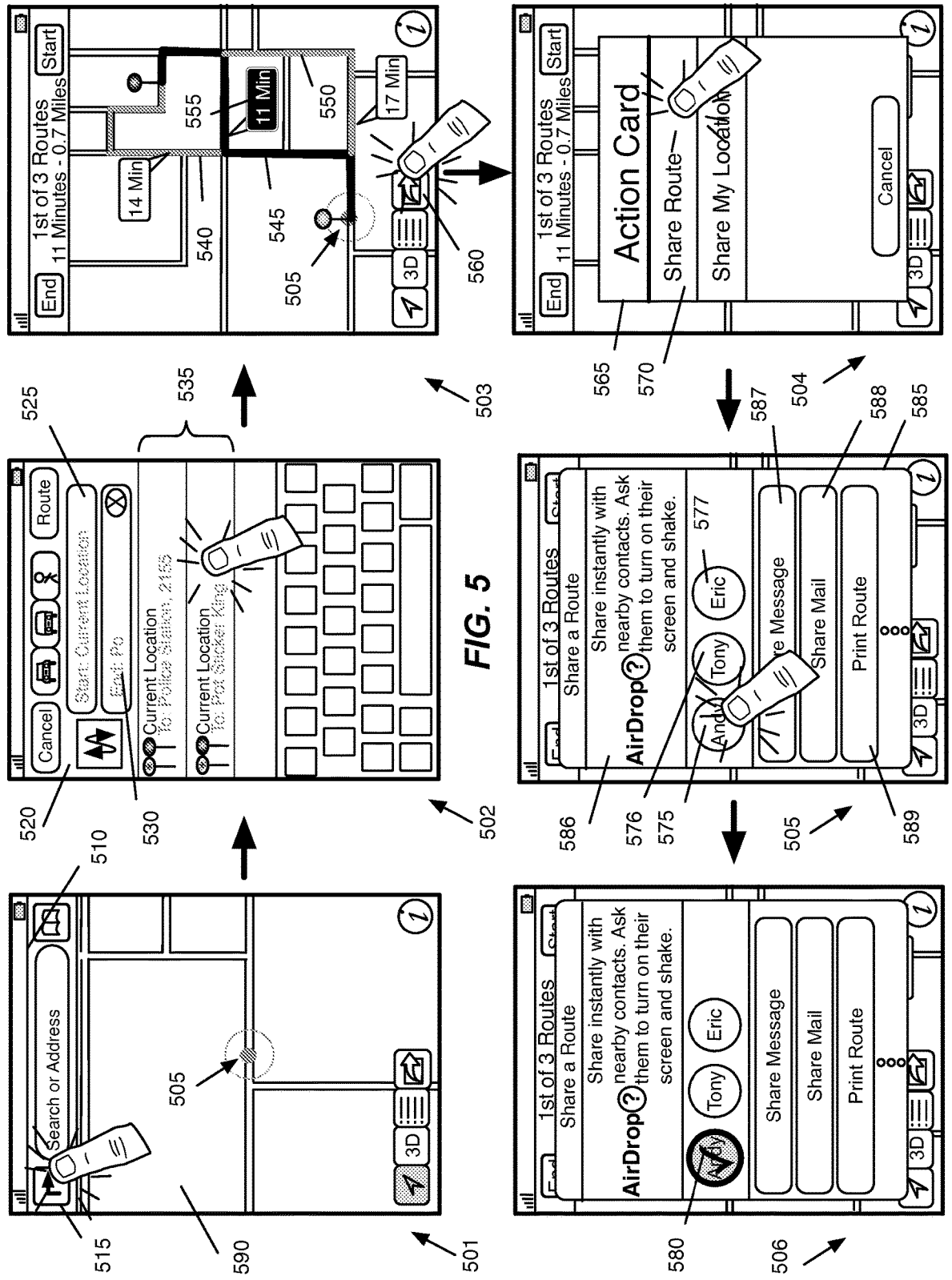

FIG. 5 conceptually illustrates a user interface for sharing map information when the current location of the device is available and a route is displayed on the map in some embodiments of the invention.

Figure 6:
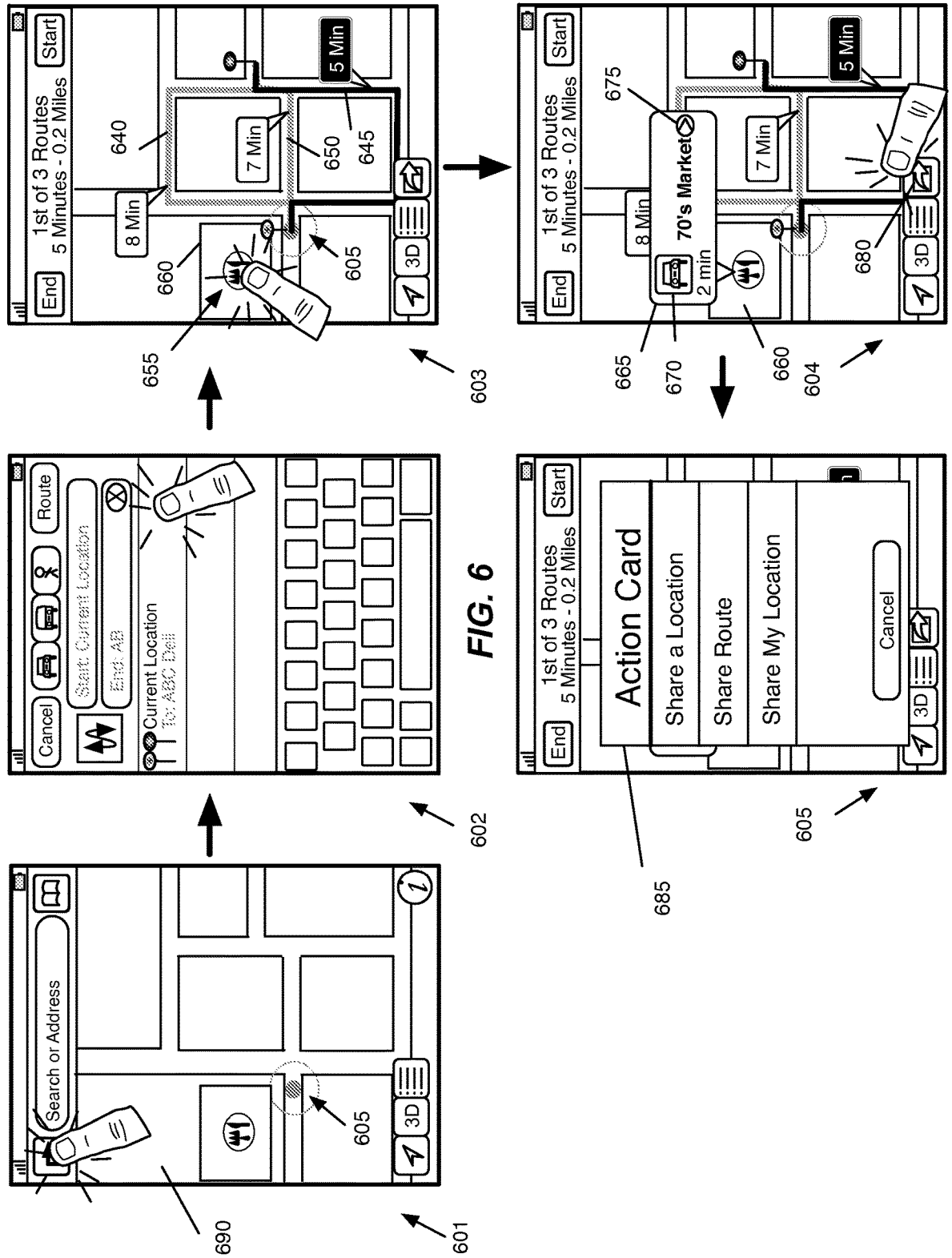

FIG. 6 conceptually illustrates a user interface for sharing map information the current location of the device is available, a route is displayed, and another item is selected on the map in some embodiments of the invention.

Figure 7:
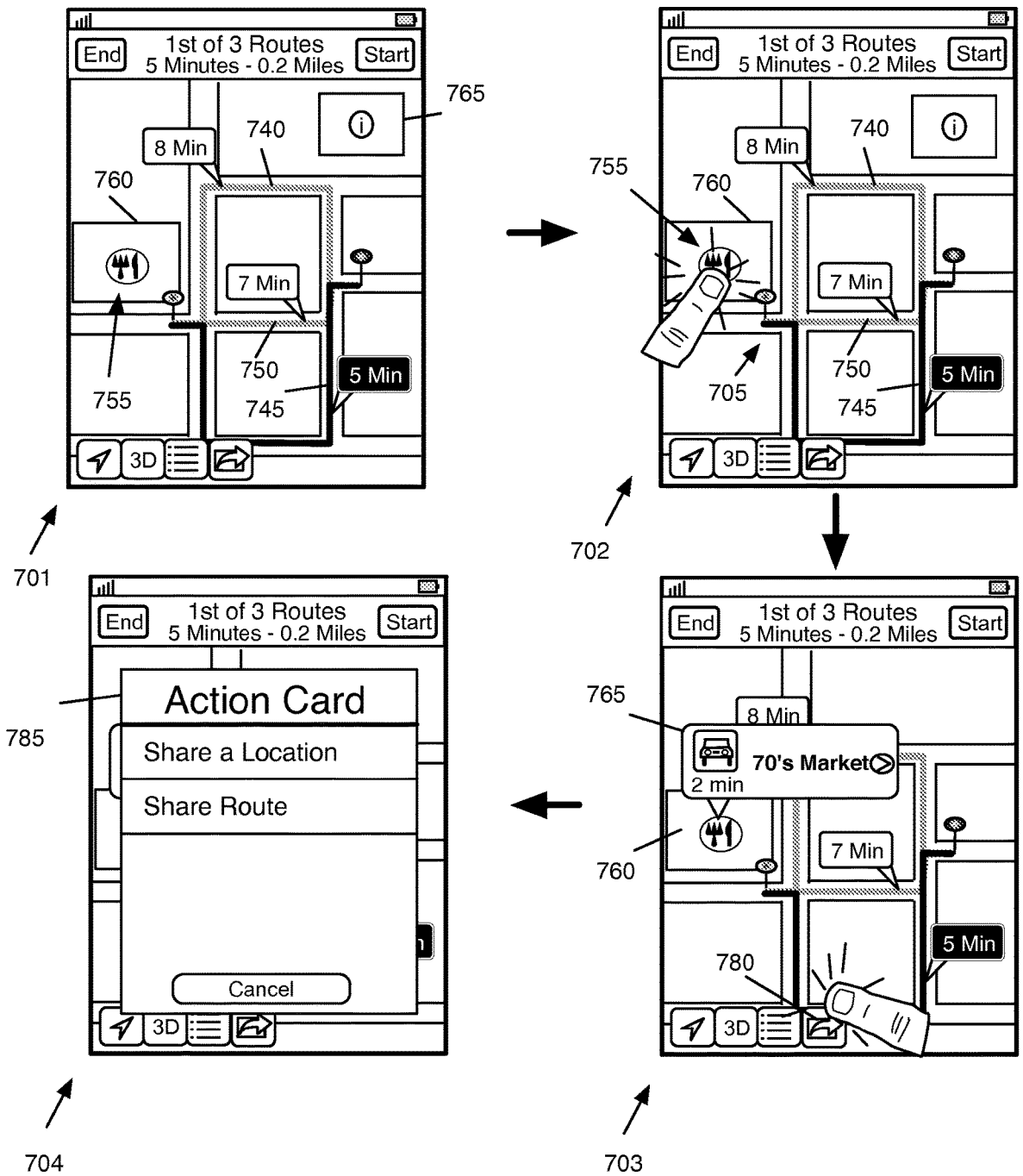

FIG. 7 conceptually illustrates a user interface for sharing map information when the current location of the device is not available, a route is displayed, and another item is selected on the map in some embodiments of the invention.

Figure 8:
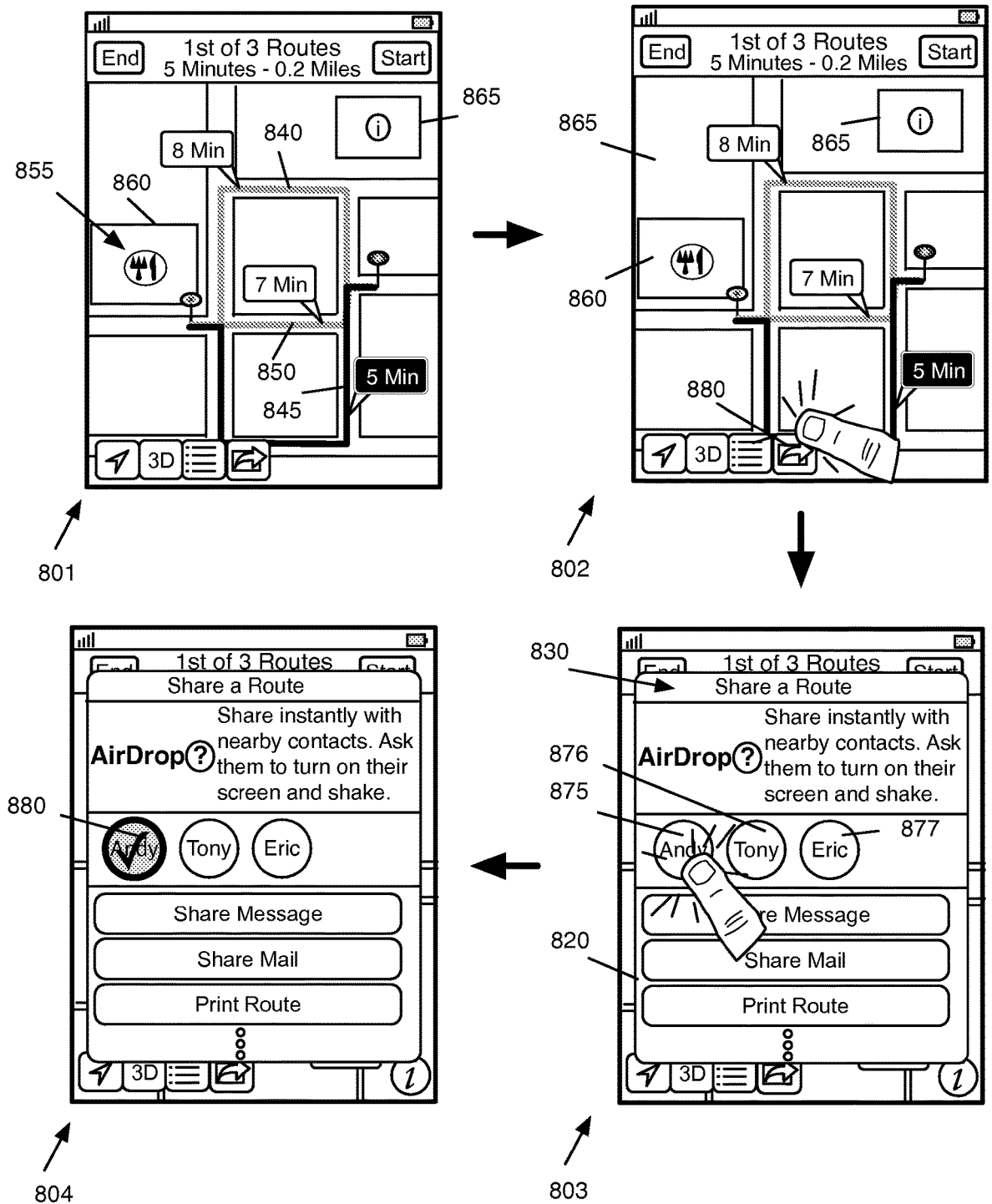

FIG. 8 conceptually illustrates a user interface for sharing map information when the current location of the device is not available, a route is displayed, and no other items is selected on the map in some embodiments of the invention.

Figure 9:
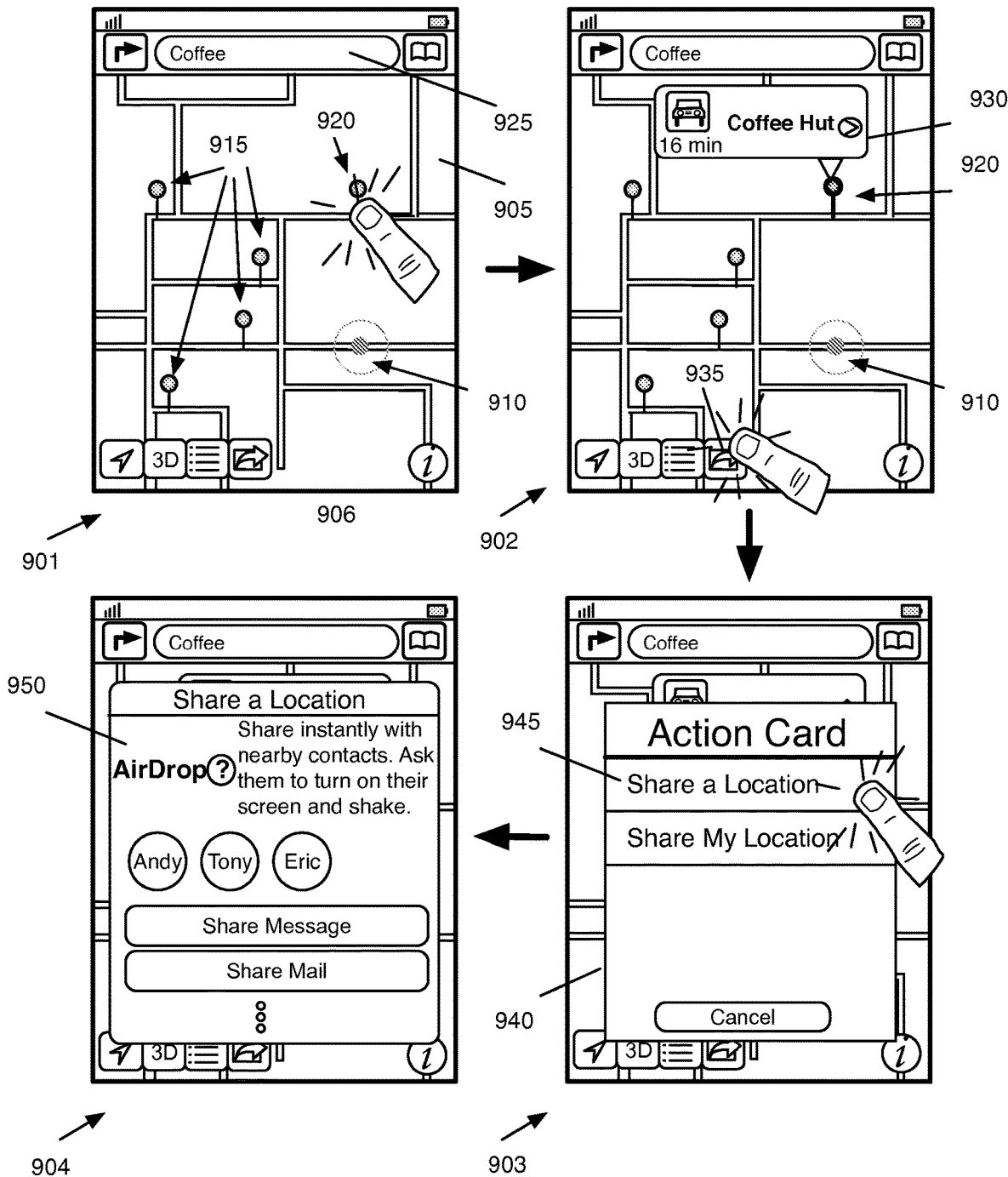

FIG. 9 conceptually illustrates a user interface for sharing map information when the current location of the device is available, no route is displayed, and another item is selected on the map in some embodiments of the invention.

Figure 10:
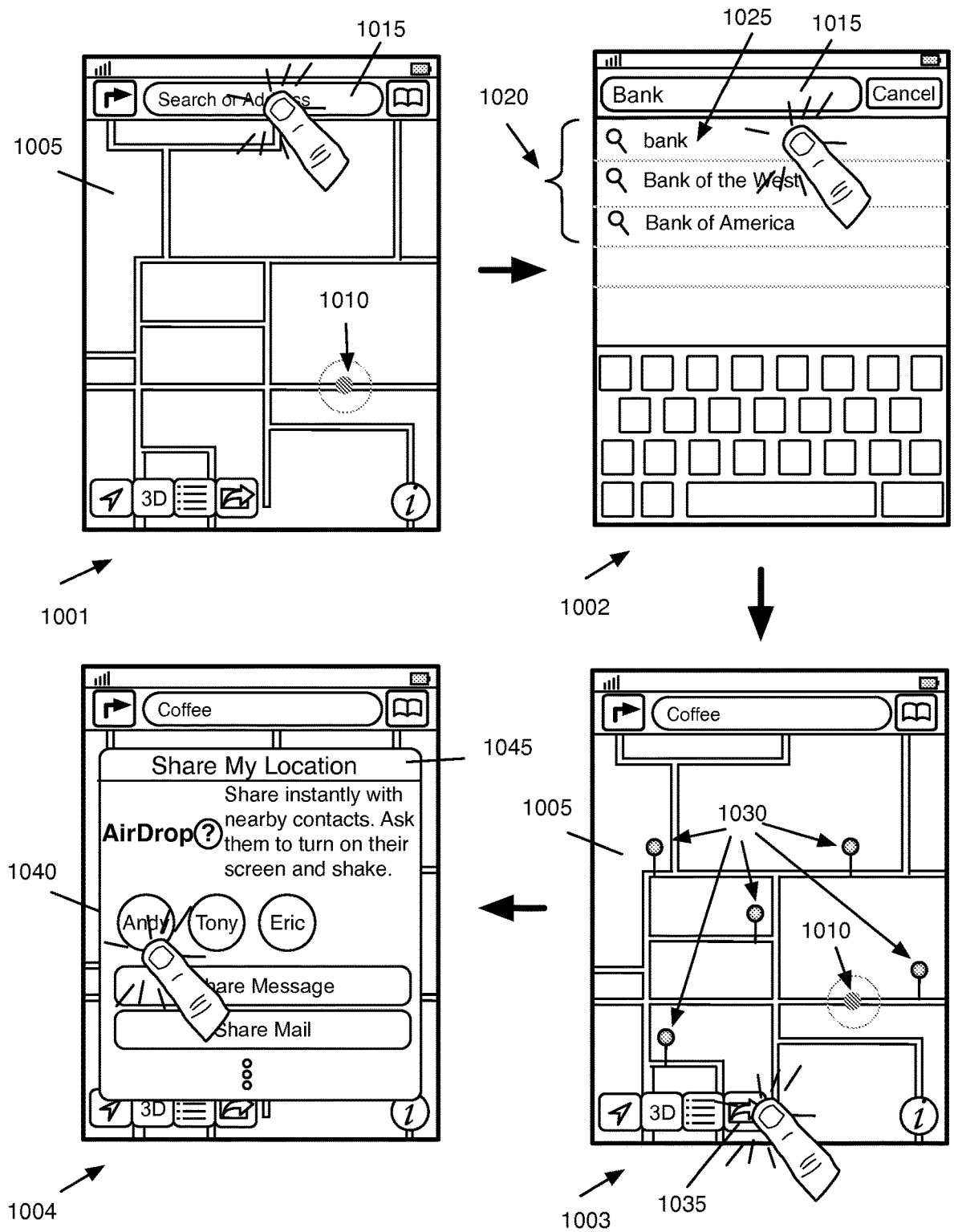

FIG. 10 conceptually illustrates a user interface for sharing map information when the current location of the device is available, no route is displayed, and no other items is selected on the map in some embodiments of the invention.

Figure 11:
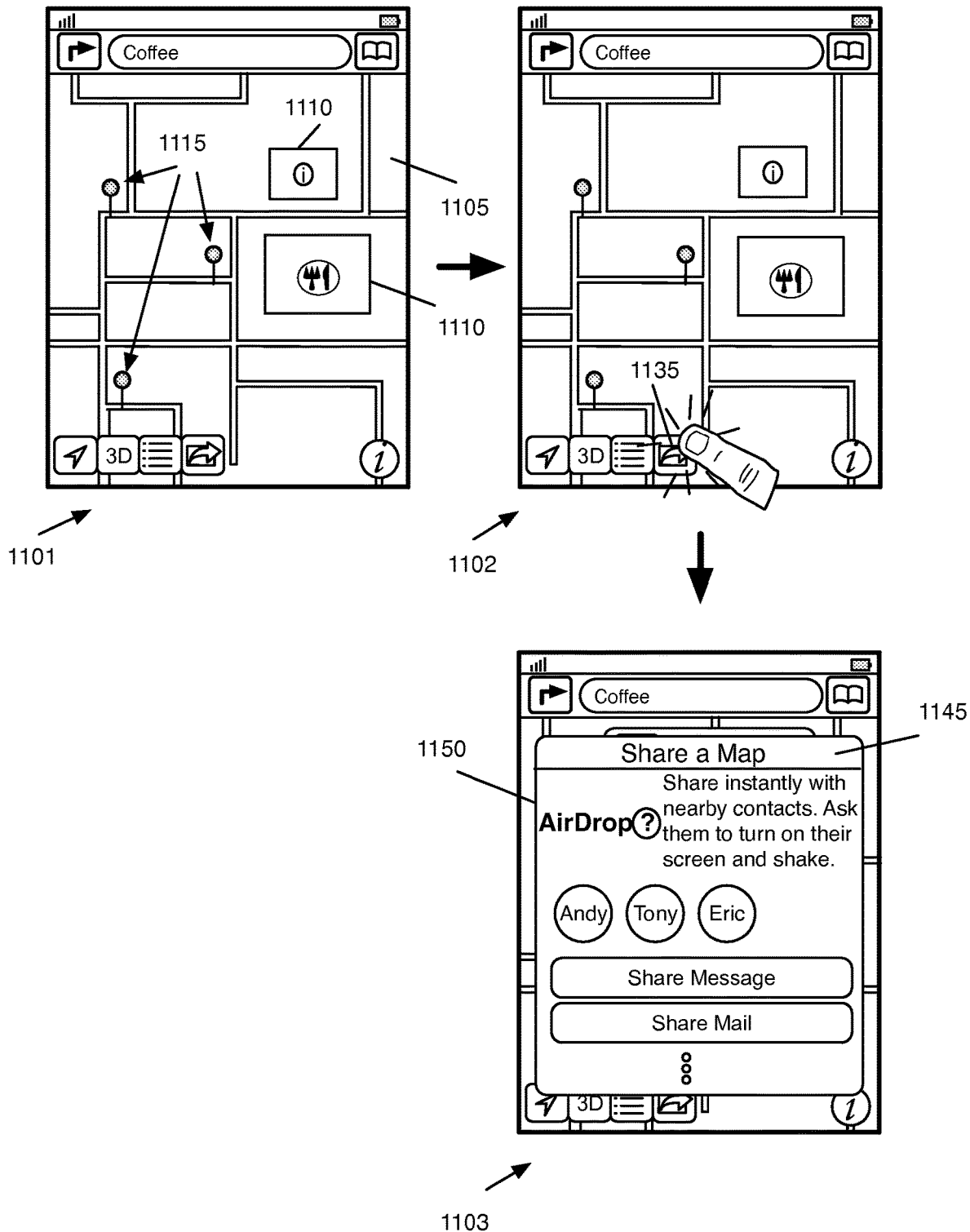

FIG. 11 conceptually illustrates a user interface for sharing map information when the current location of the device is not available, no route is displayed, and no other items is selected on the map in some embodiments of the invention.

Figure 12:
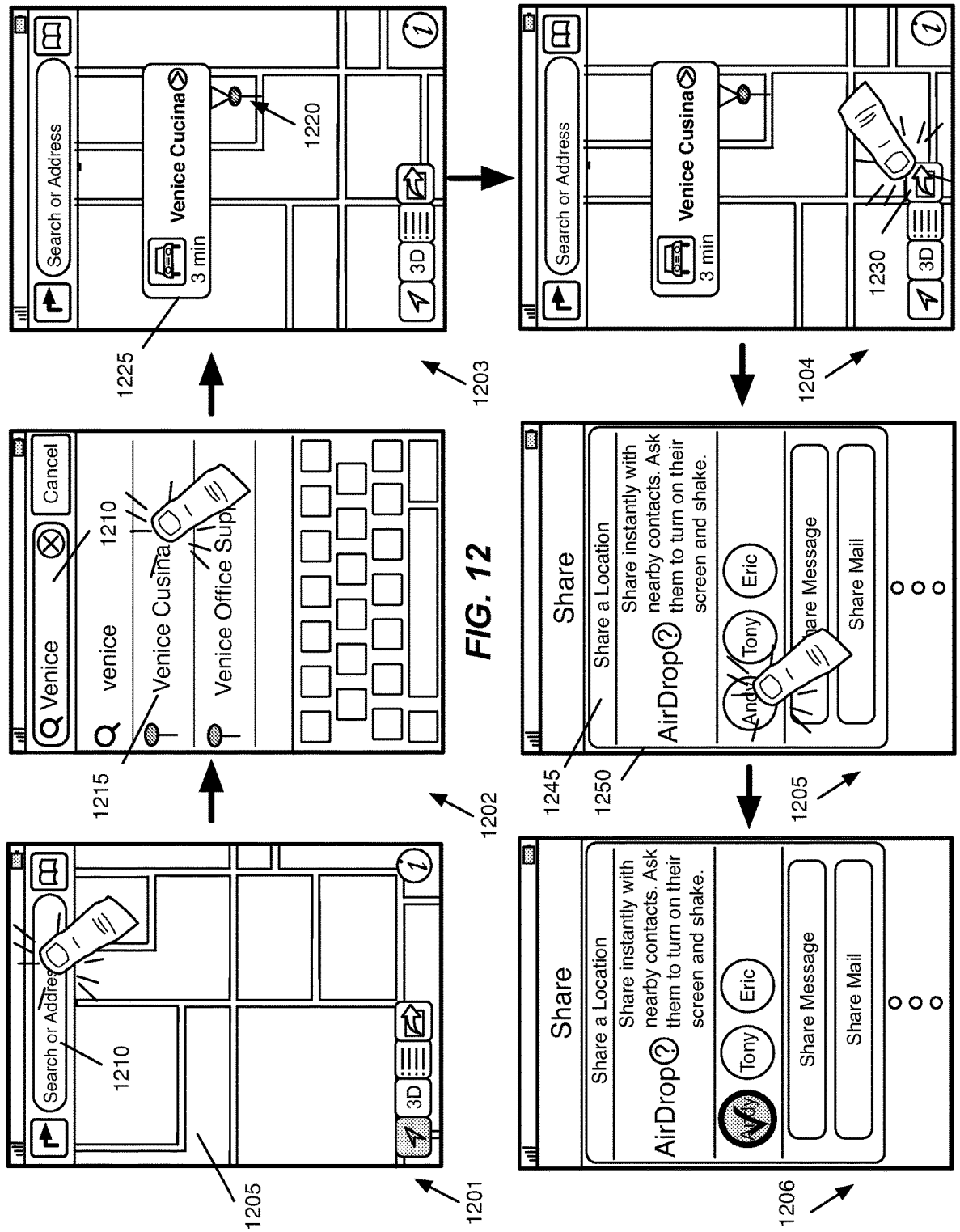

FIG. 12 conceptually illustrates a user interface for sharing map information when the current location of the device is not available, no route is displayed, and an item is selected on the map in some embodiments of the invention.

Figure 13:
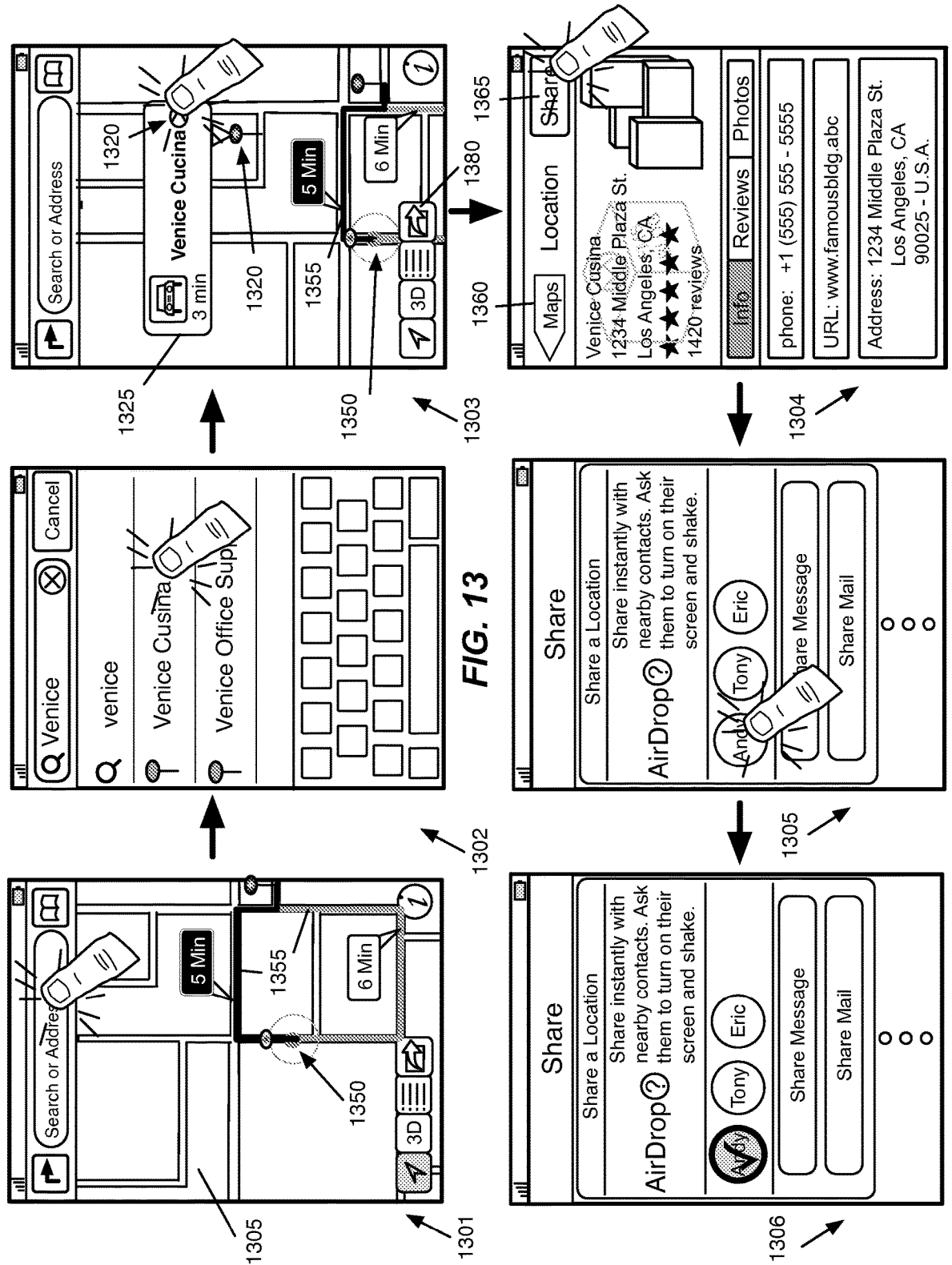

FIG. 13 conceptually illustrates a user interface for an alternative manner of sharing a selected item on a map in some embodiments of the invention.

Figure 14:
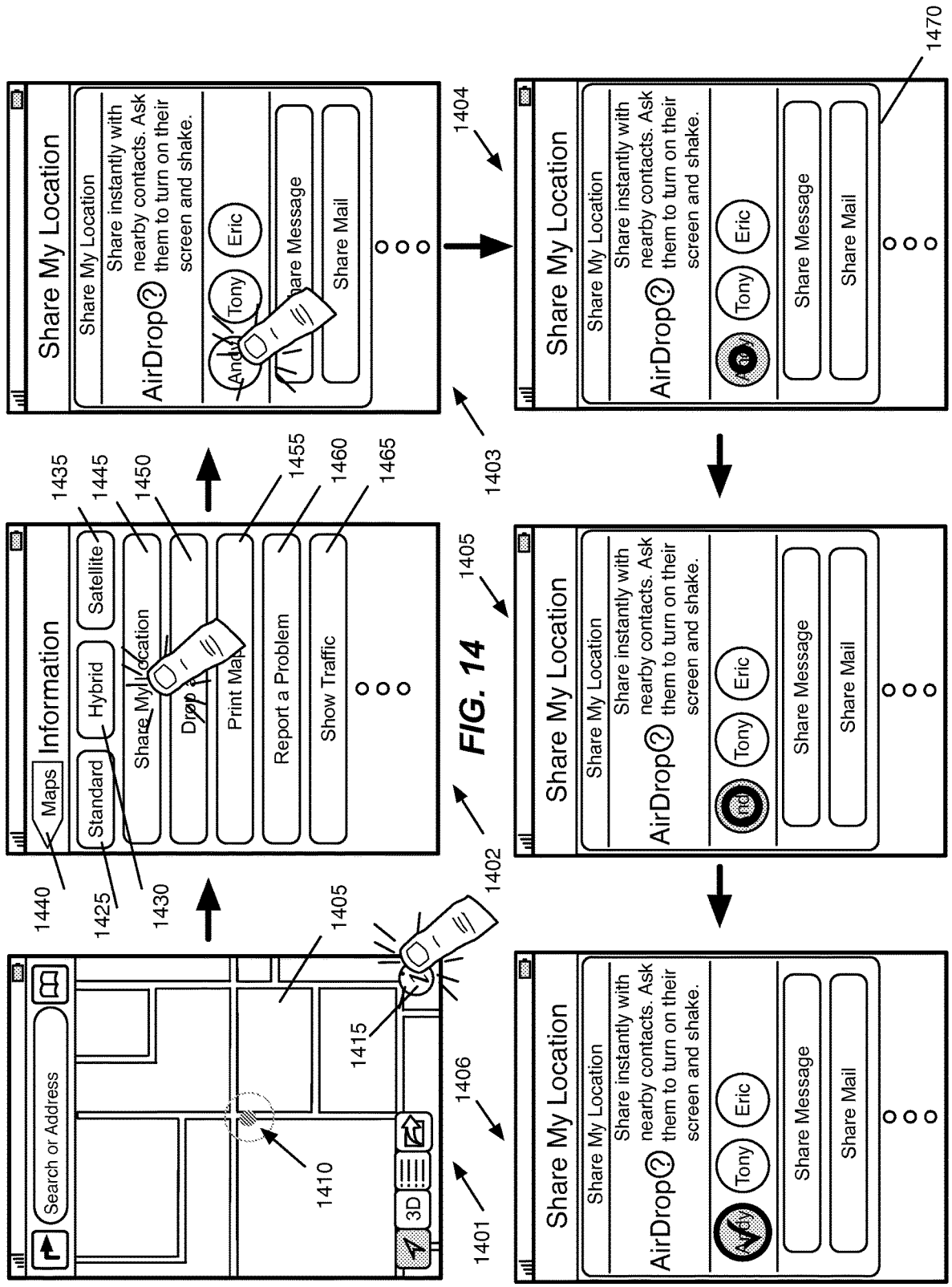

FIG. 14 conceptually illustrates a user interface for an alternative manner of sharing a selected item on a map in some embodiments of the invention.

Figure 15:
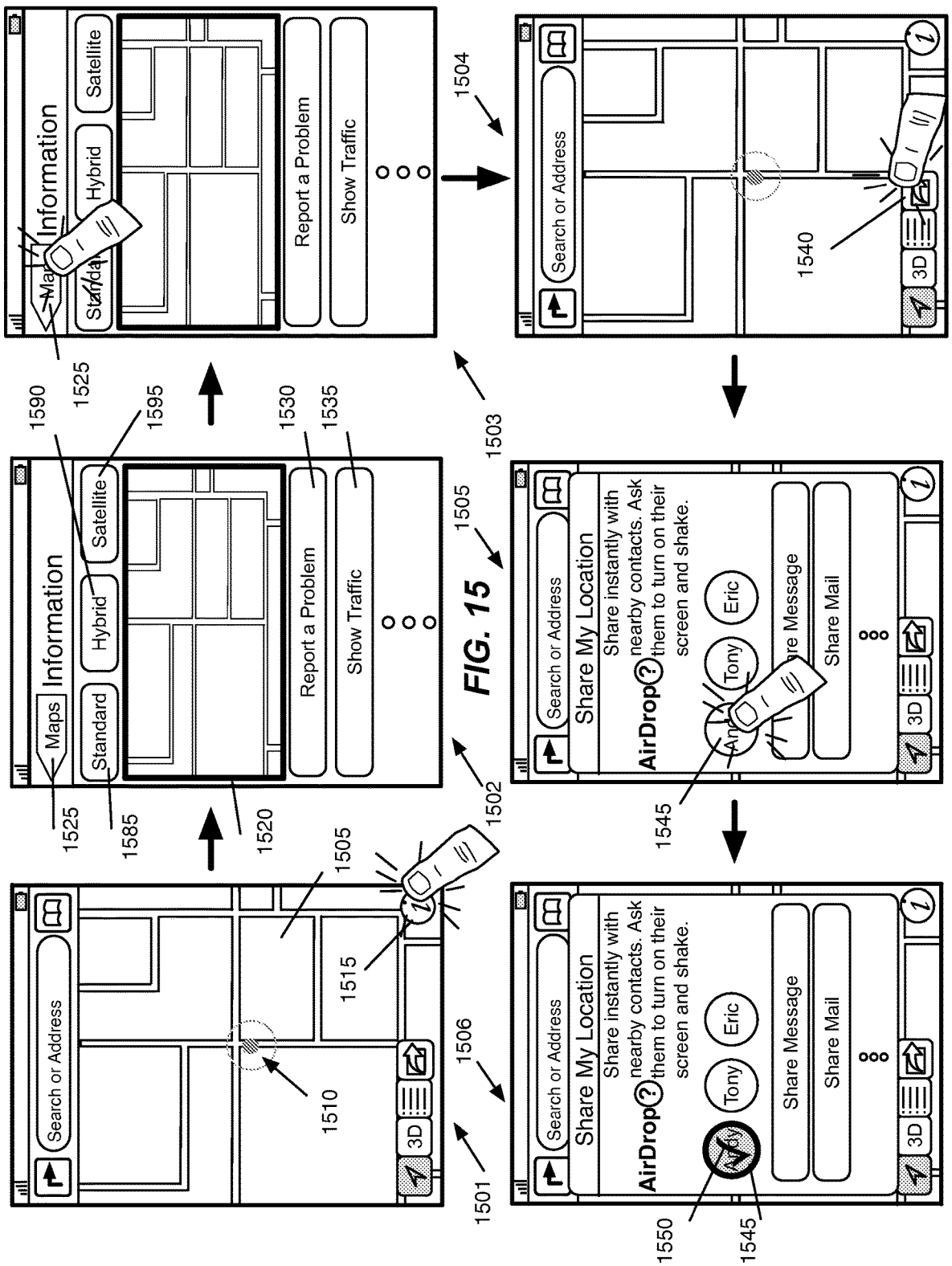

FIG. 15 conceptually illustrates a user interface for an alternative use of information button on a map in some embodiments of the invention.

Figure 16:
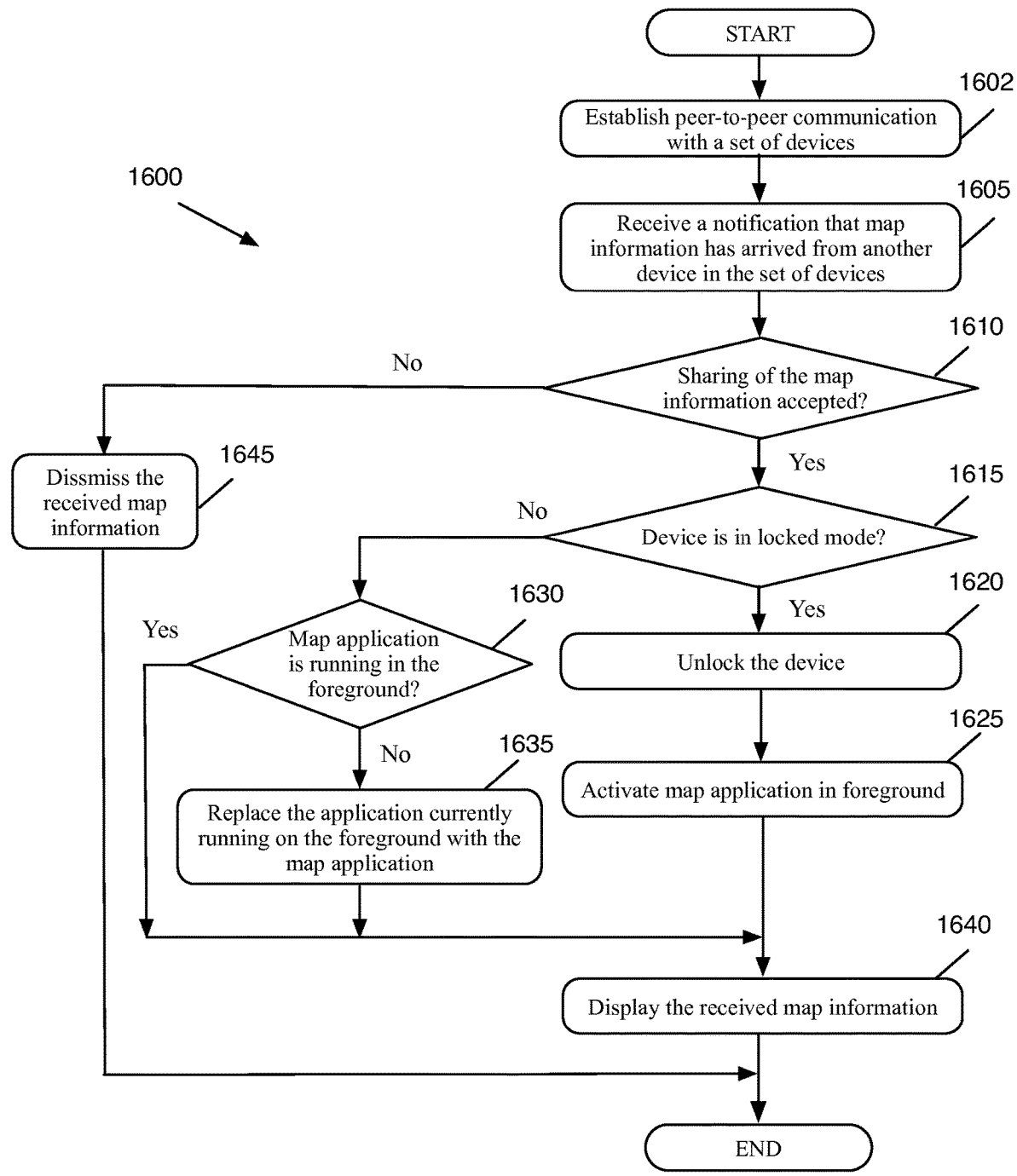

FIG. 16 conceptually illustrates a process for receiving map information that is received from another device.

Figure 17:
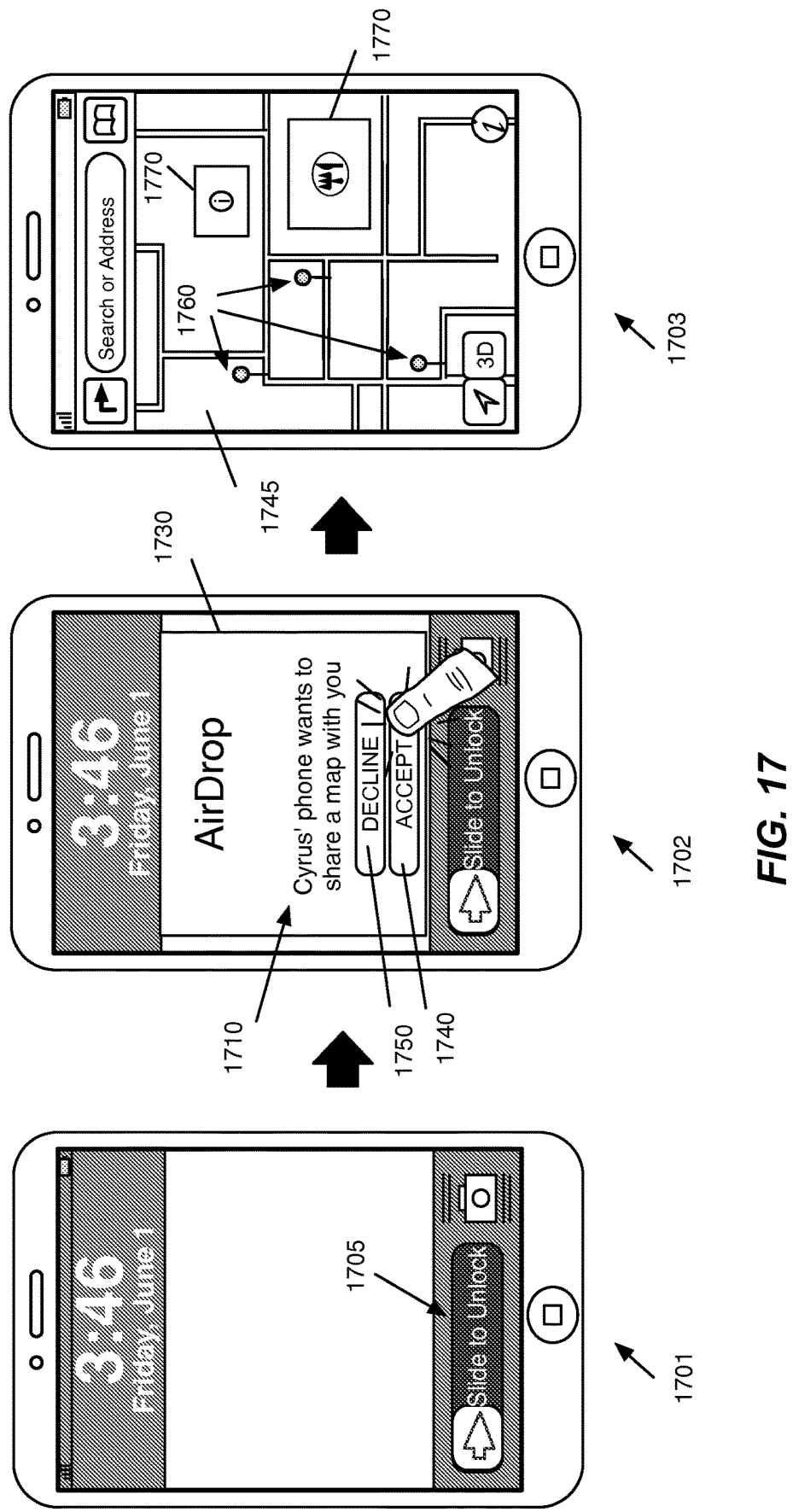

FIG. 17 conceptually illustrates a user interface for receiving shared map information by a device in locked mode in some embodiments of the invention.

Figure 18:
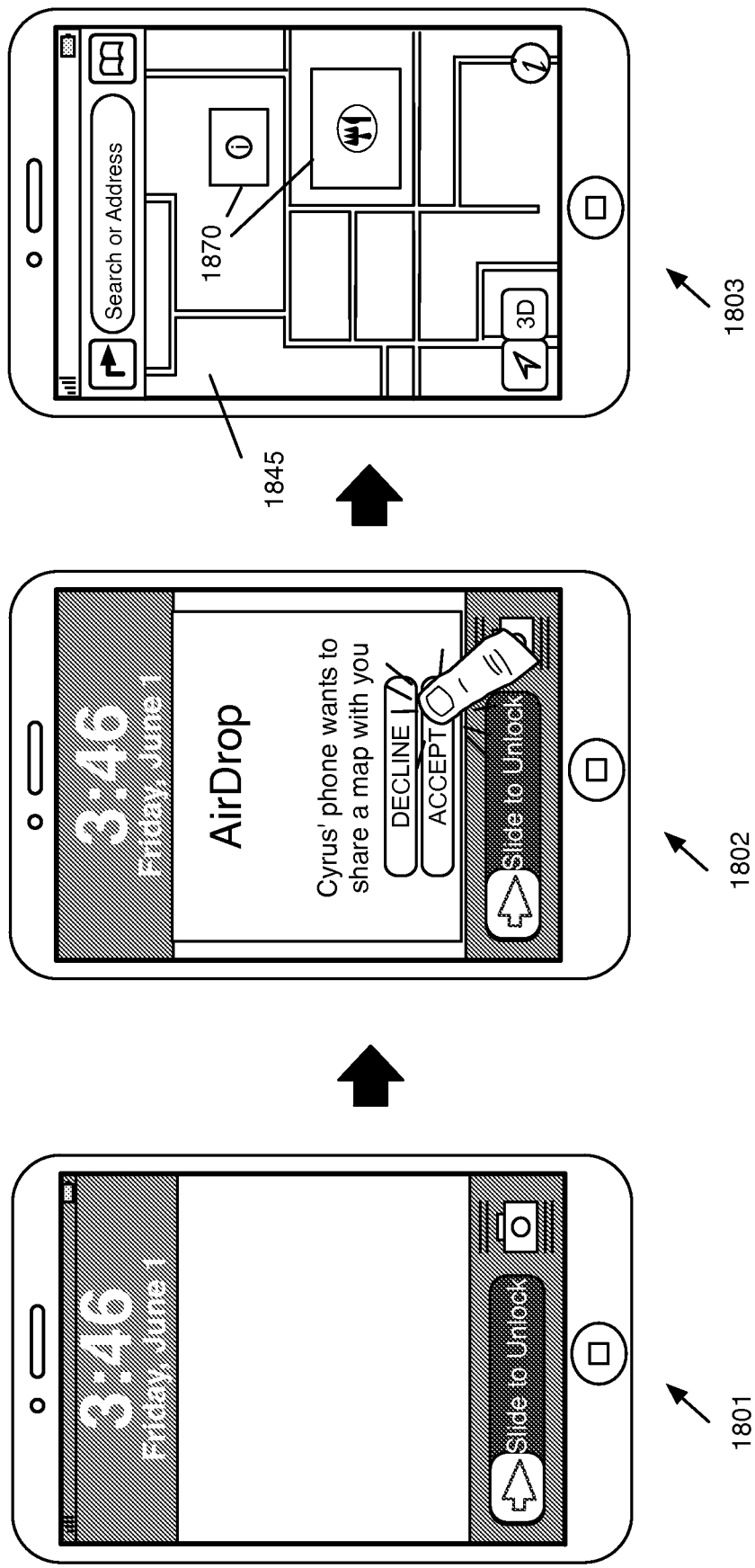

FIG. 18 conceptually illustrates a user interface for receiving shared map information by a device in locked mode in some embodiments of the invention.

Figure 19:
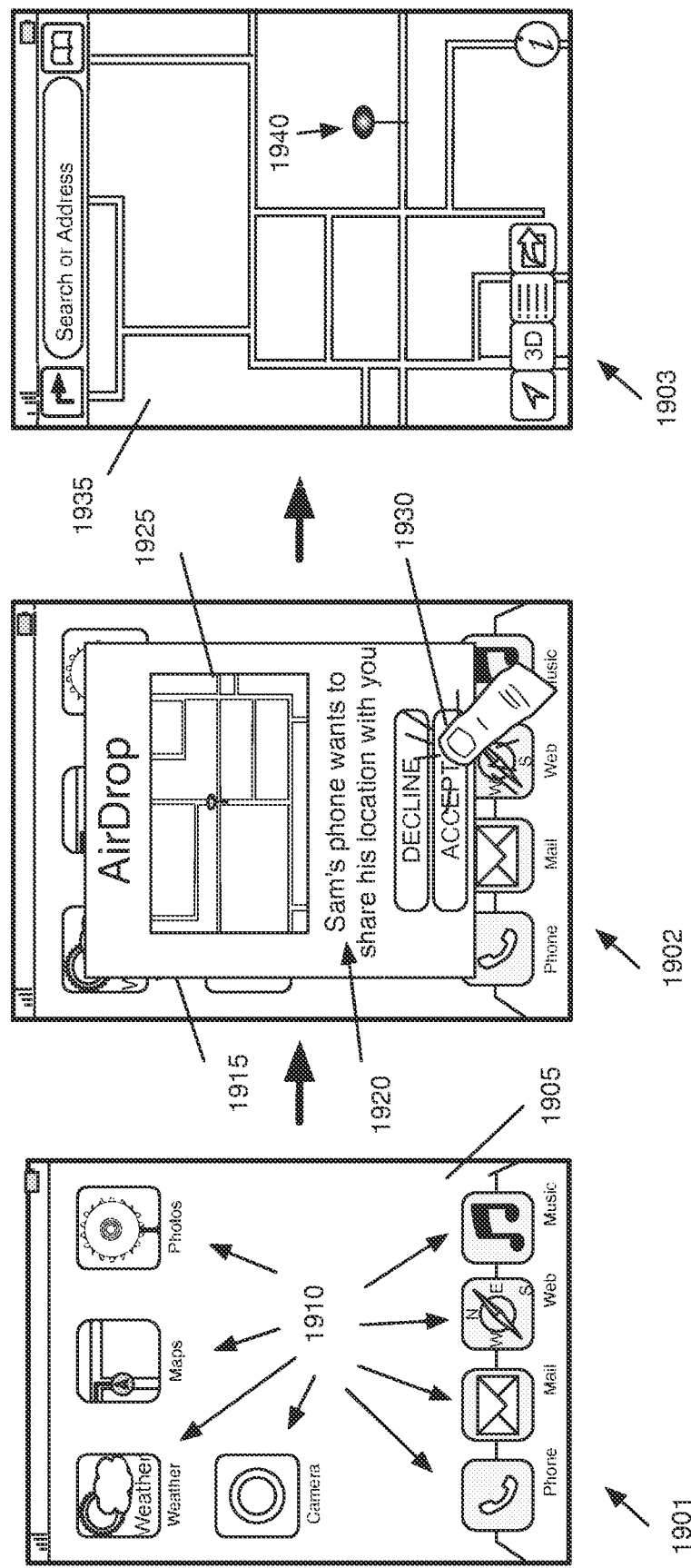

FIG. 19 conceptually illustrates a user interface for receiving shared map information by a device when the map application is not running in the foreground in some embodiments of the invention.

Figure 20:
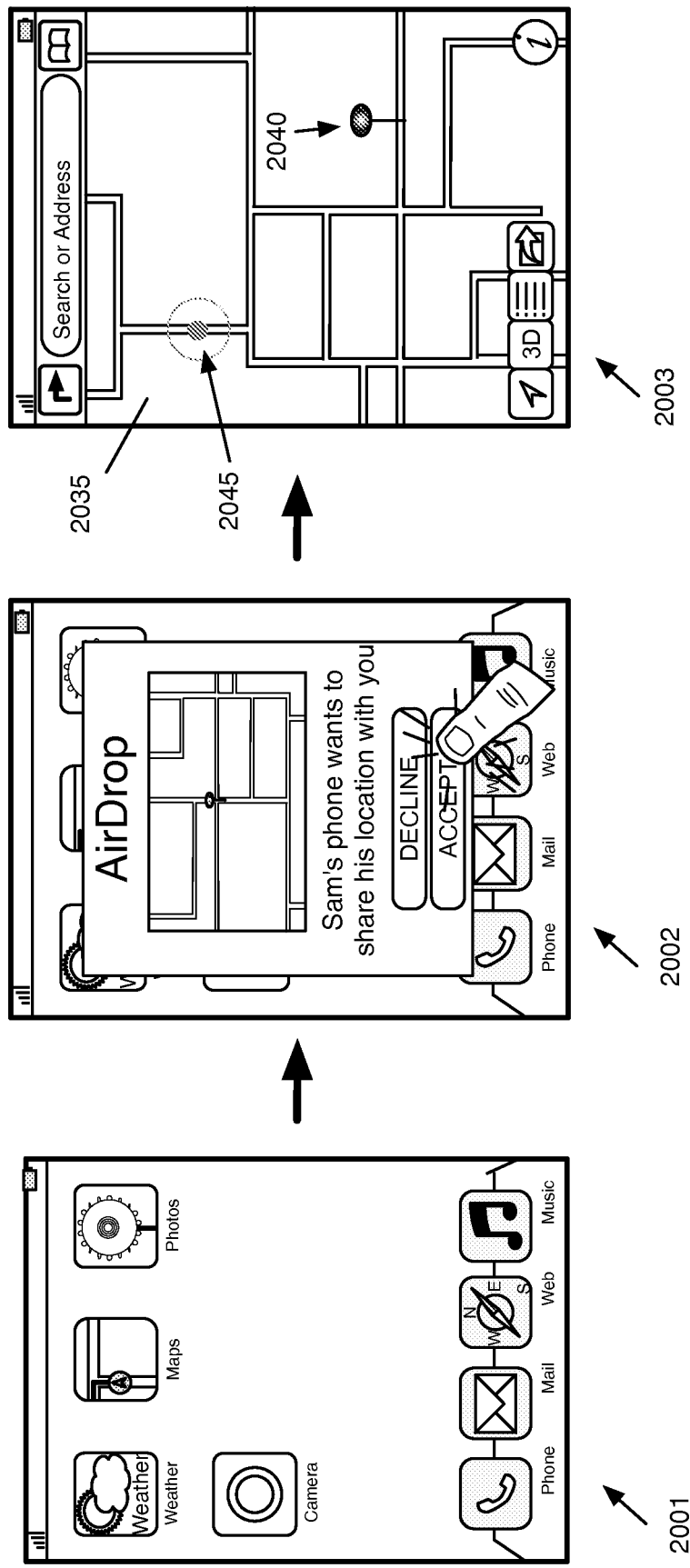

FIG. 20 conceptually illustrates receiving the current location of a device while the receiving device is in the same map region as the sending device and has location tracking.

Figure 21:
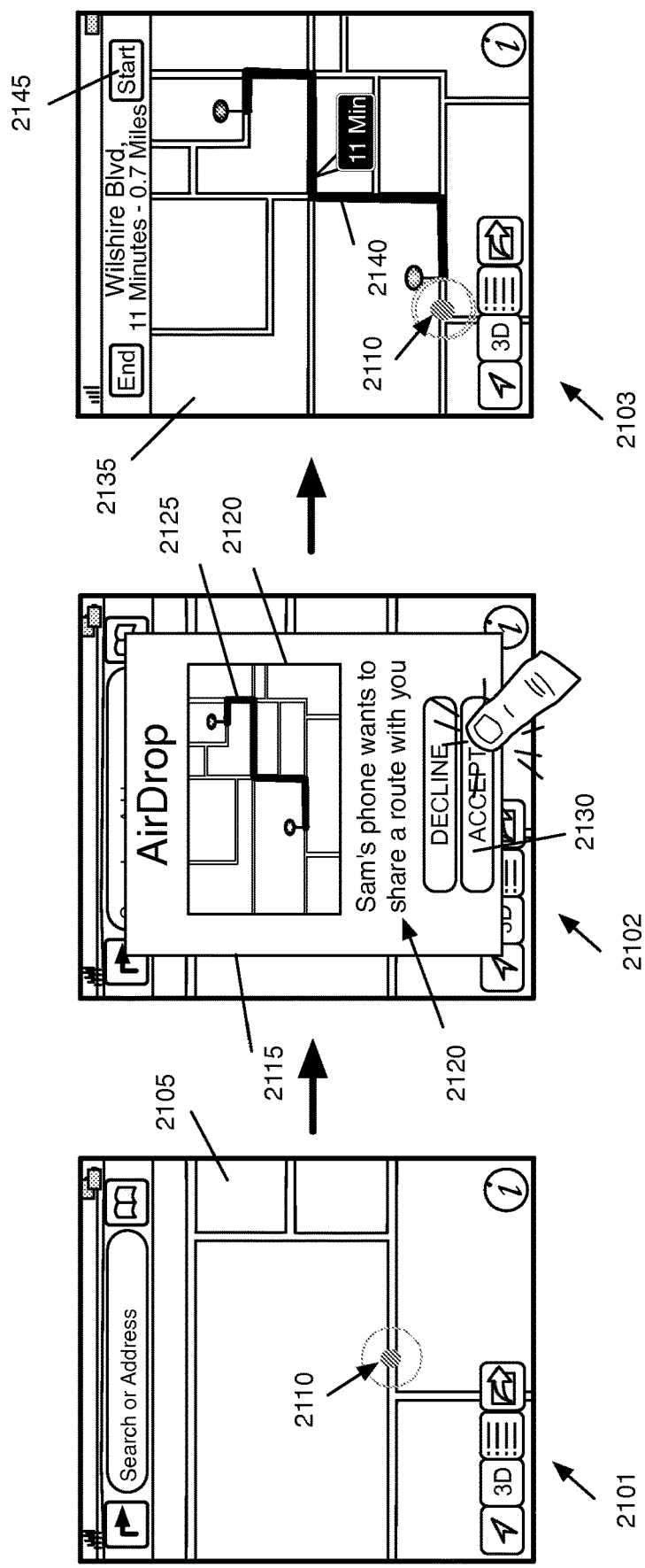

FIG. 21 conceptually illustrates a user interface for receiving a shared route information when the mapping application is running on the foreground in some embodiments of the invention.

Figure 22:
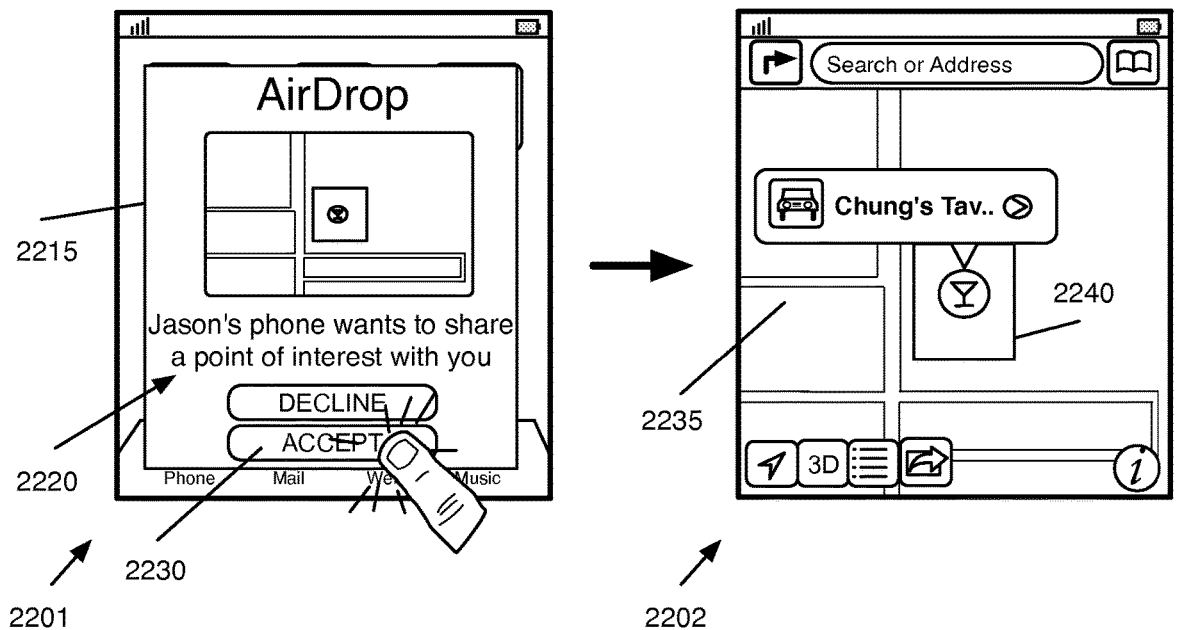

FIG. 22 conceptually illustrates a user interface for receiving a shared point of interest in some embodiments of the invention.

Figure 23:
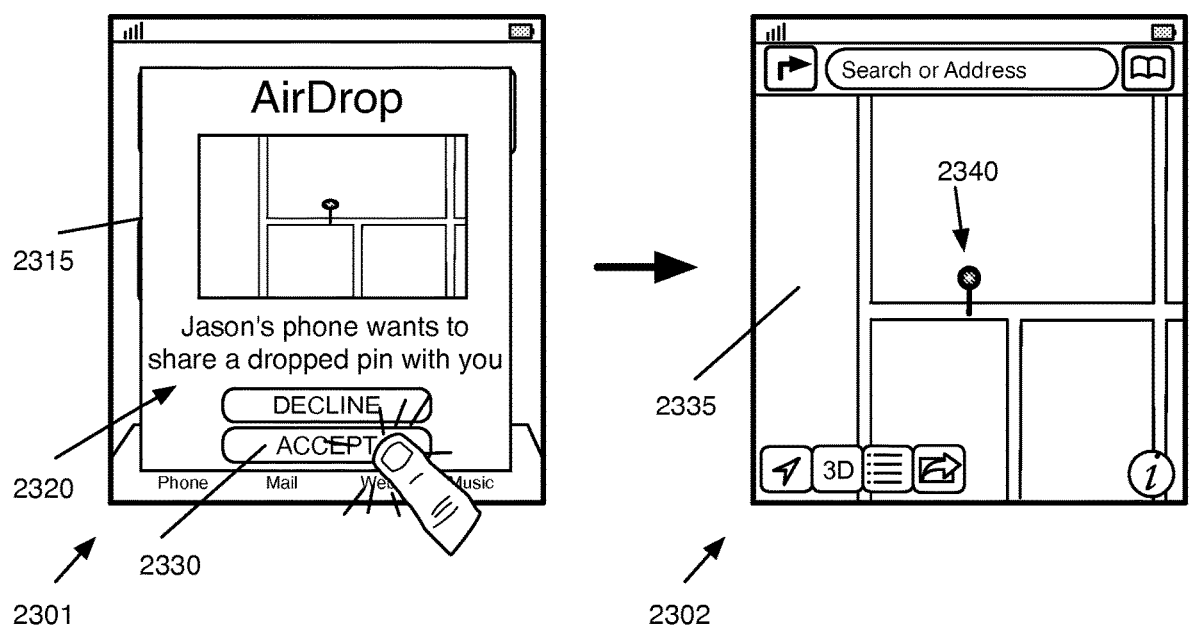

FIG. 23 conceptually illustrates a user interface for receiving a shared pin in some embodiments of the invention.

Figure 24:
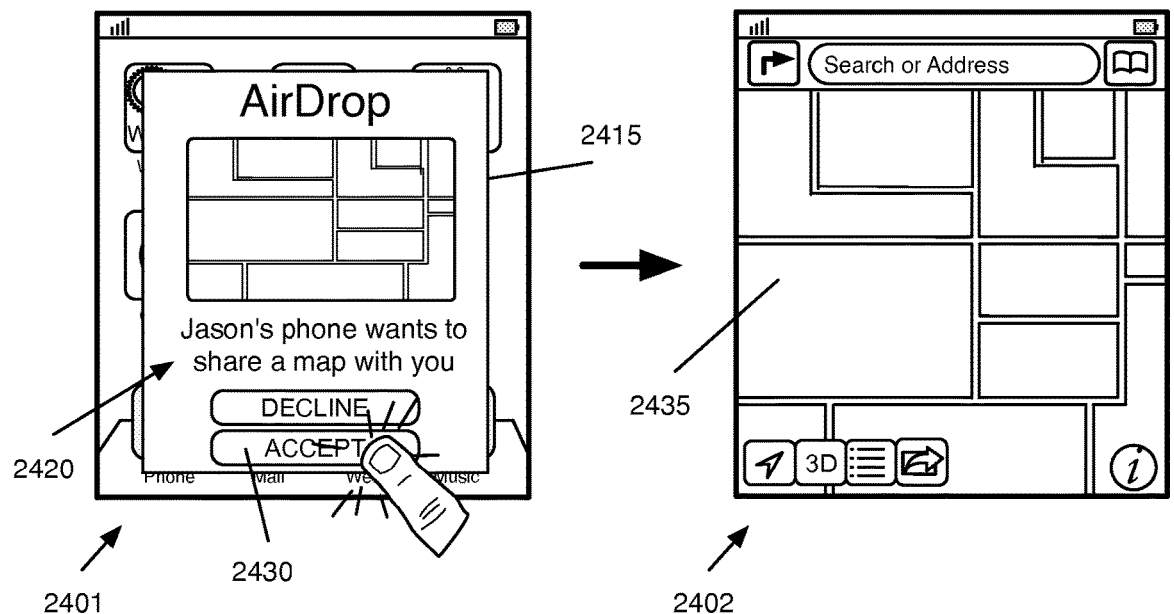

FIG. 24 conceptually illustrates a user interface for receiving a current map view to share in some embodiments of the invention.

Figure 25:
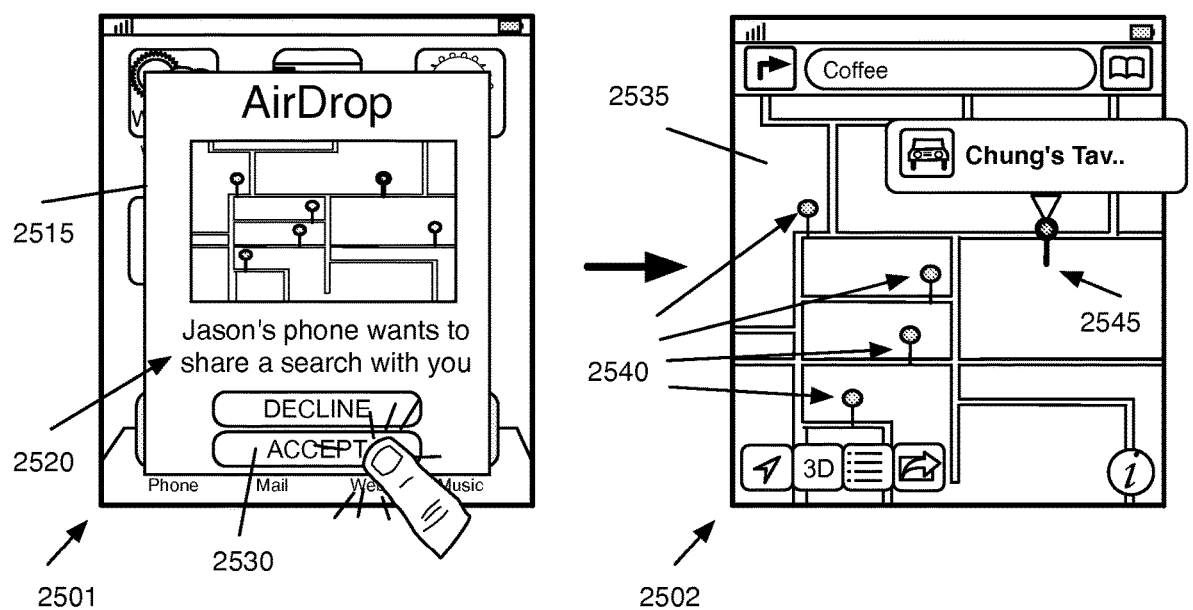

FIG. 25 conceptually illustrates a user interface for receiving shared search results in some embodiments of the invention.

Figure 26:
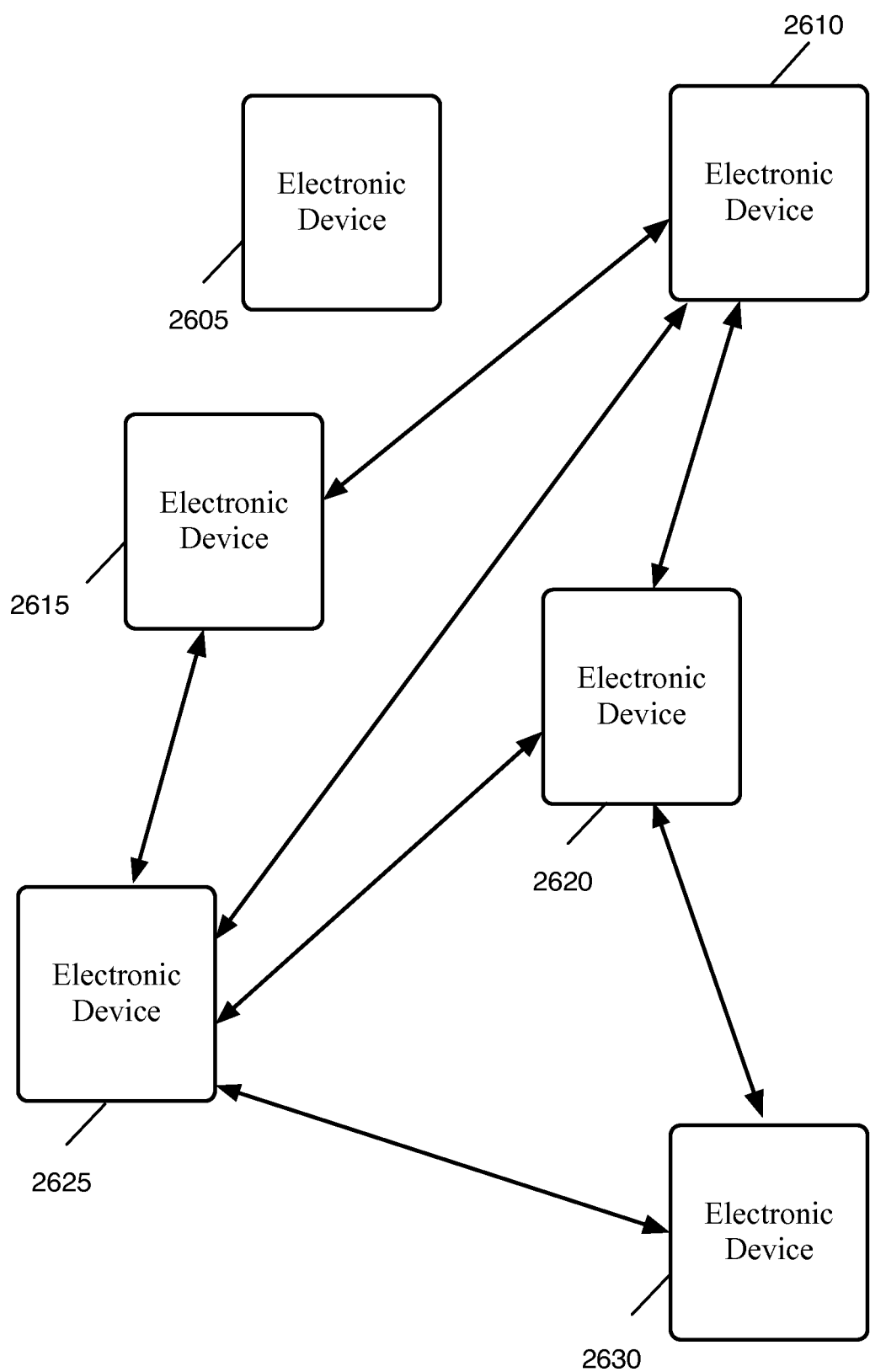

FIG. 26 conceptually illustrates a system level diagram for sharing map information using peer-to-peer communication in some embodiments of the invention.

Figure 27:
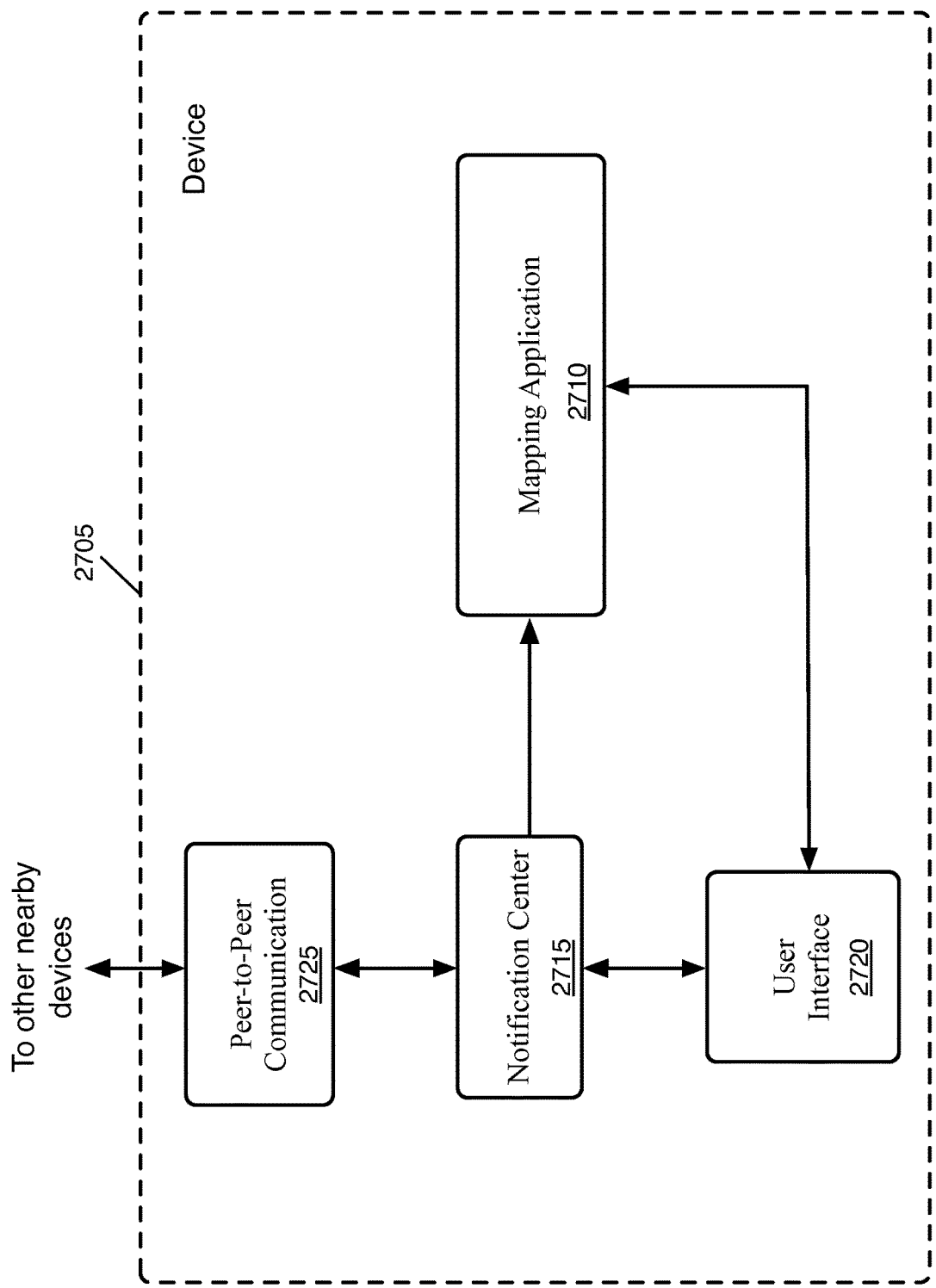

FIG. 27 conceptually illustrates the client side diagram of a device for sharing map information with other device in some embodiments of the invention.

Figure 28:
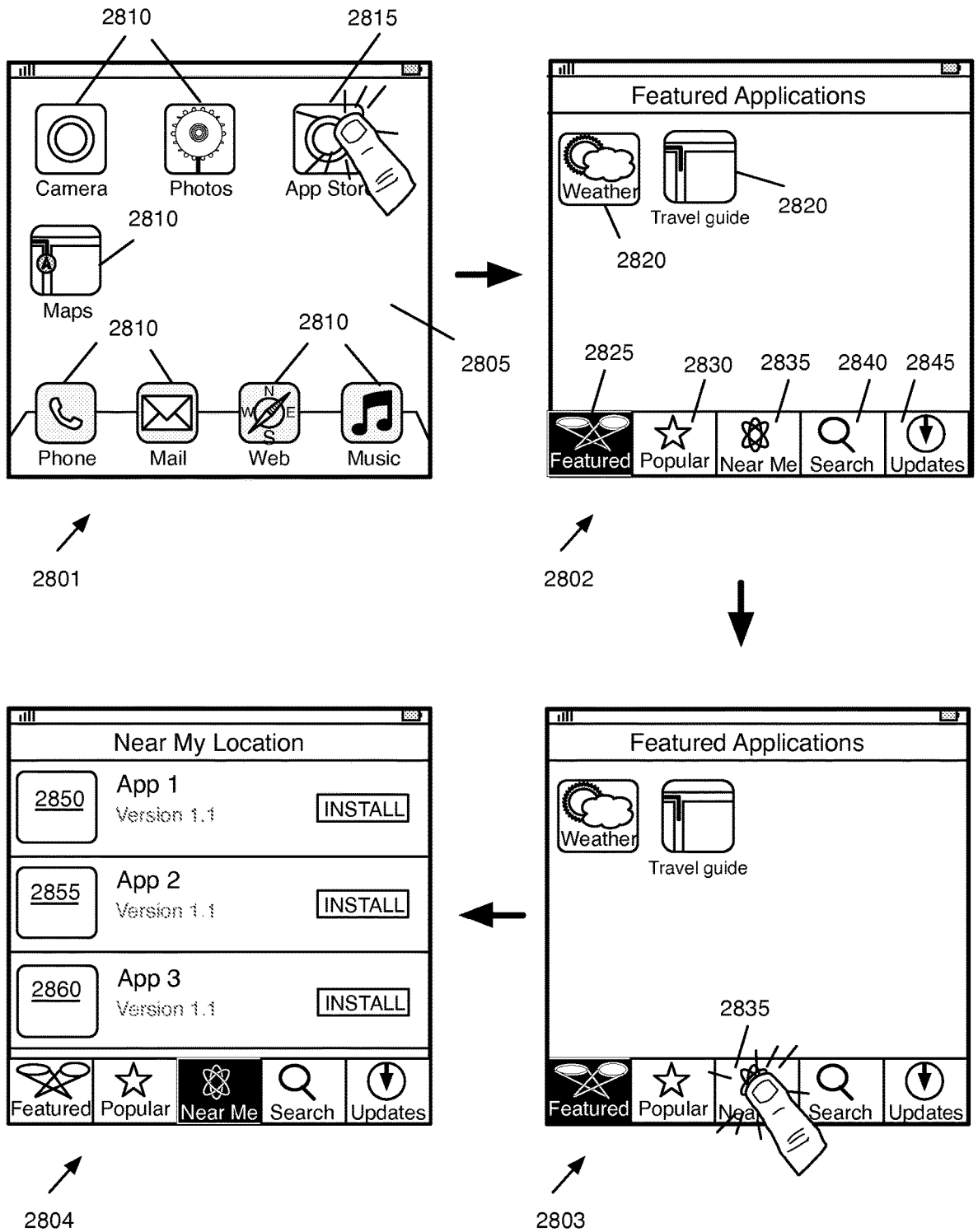

FIG. 28 conceptually illustrates a user interface for recommending applications based on the current location of a device in some embodiments of the invention.

Figure 29:
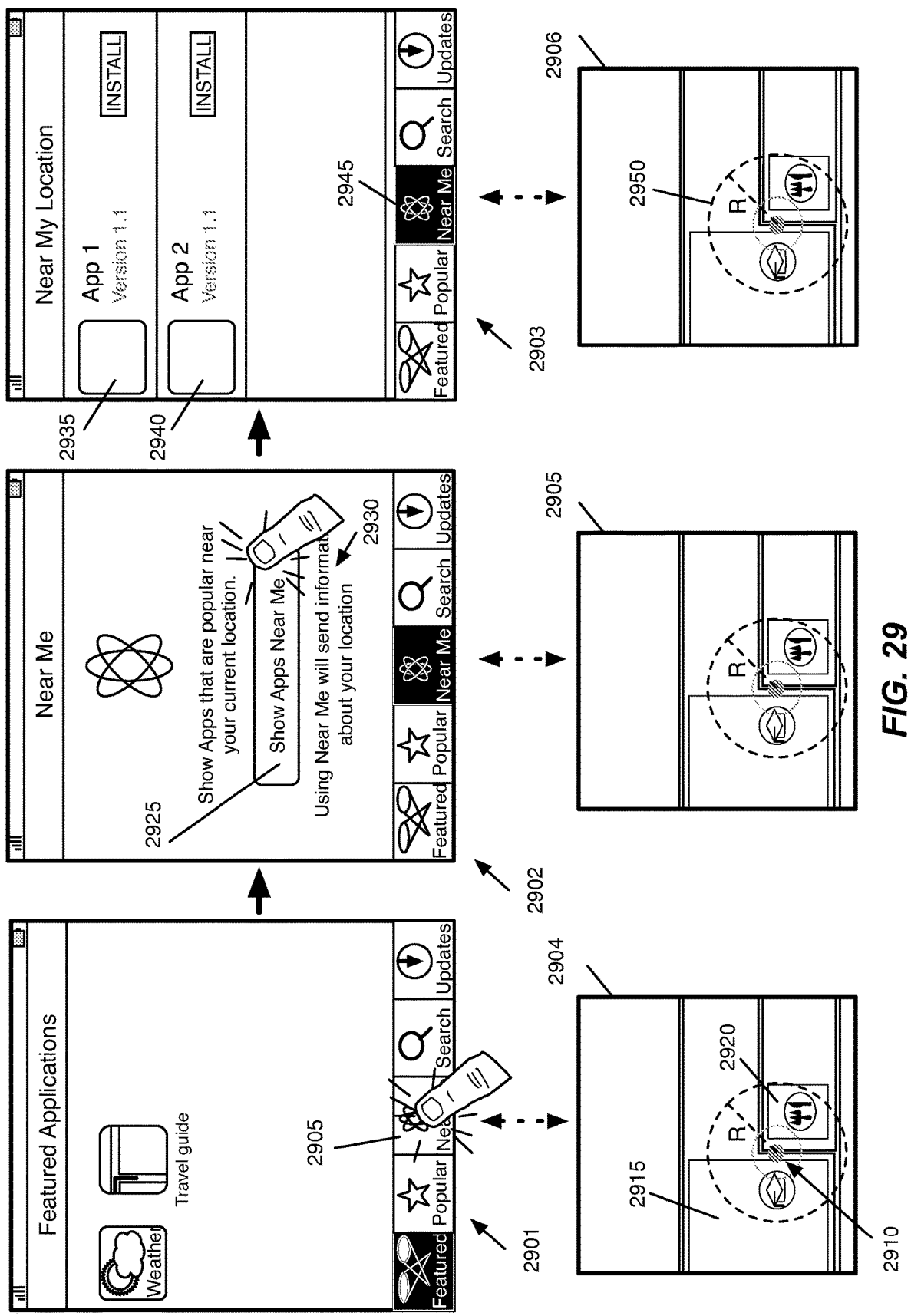

FIG. 29 conceptually illustrates a user interface for recommending applications based on the current location, of a device when the device user authorizes sending the location of the device to a set of remote servers in some embodiments of the invention.

Figure 30:
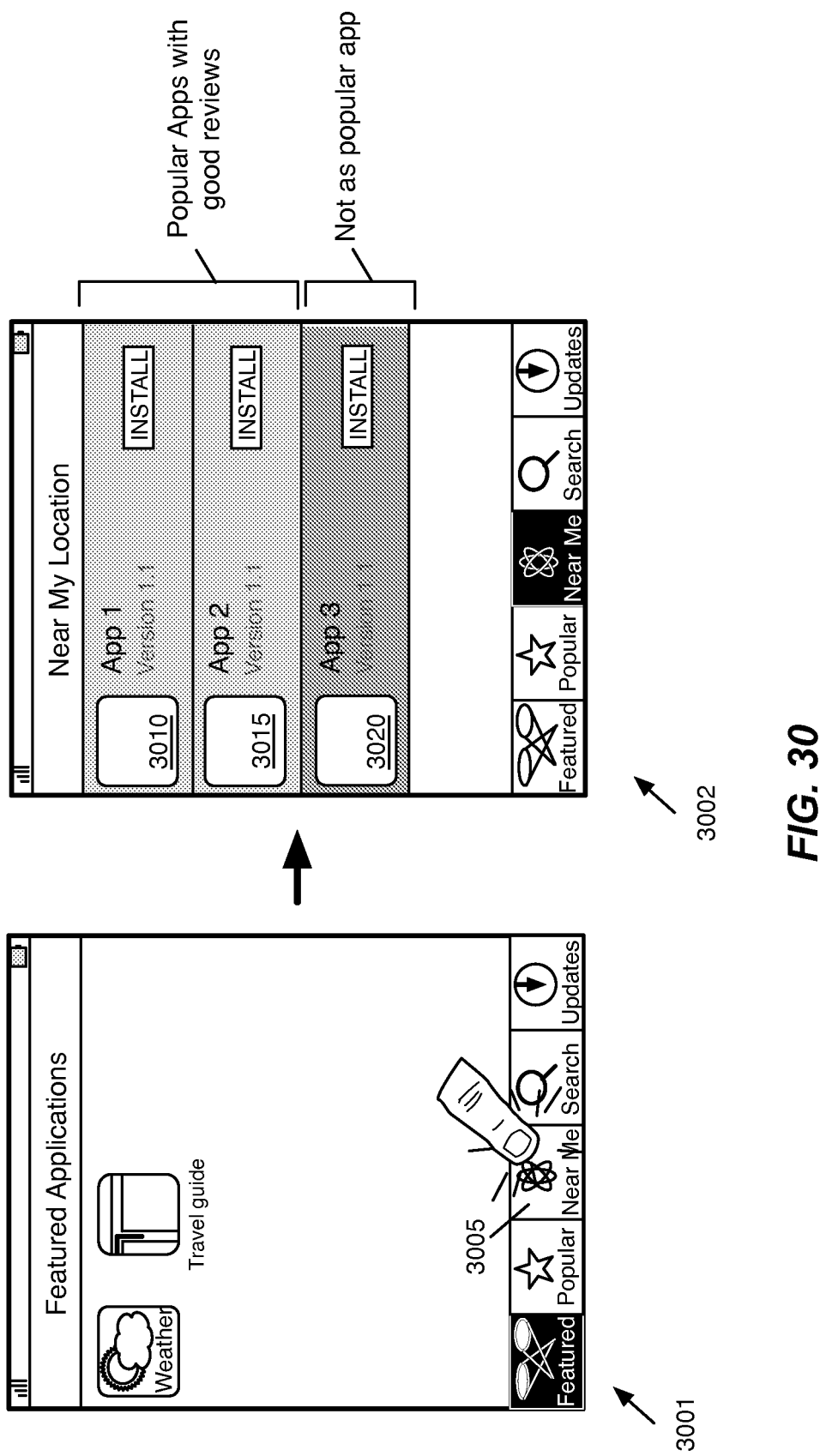

FIG. 30 conceptually illustrates a user interface for visually identifying location-based application recommendations based on the applications popularity in some embodiments of the invention.

Figure 31:
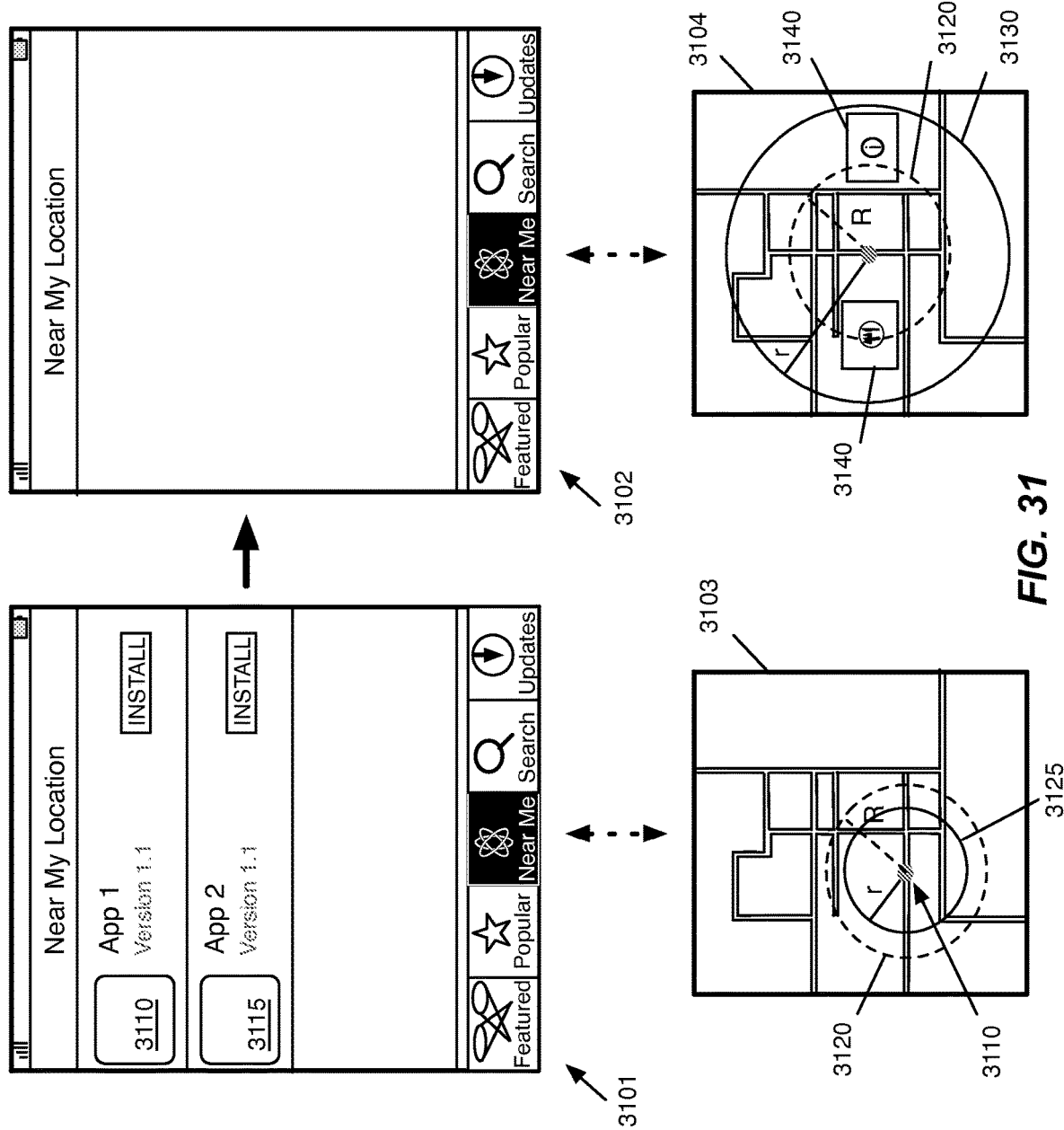

FIG. 31 conceptually illustrates a user interface that requires the location of a device with a predetermined accuracy in order to provide application recommendations based on the location of the device.

Figure 32B:
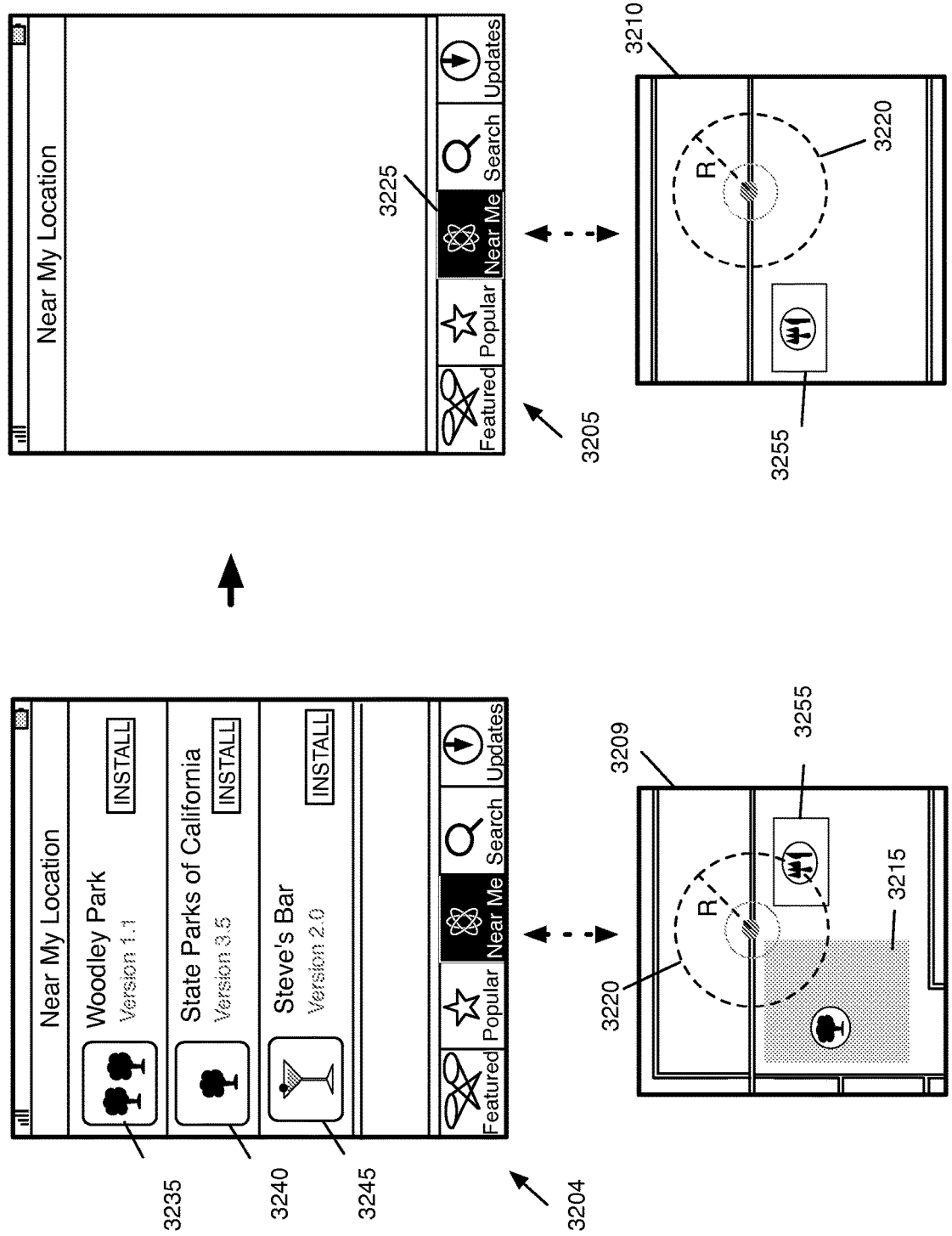

FIGS. 32A-32B conceptually illustrate a user interface that provides application recommendations based on the location of a device in some embodiments of the invention.

Figure 33:
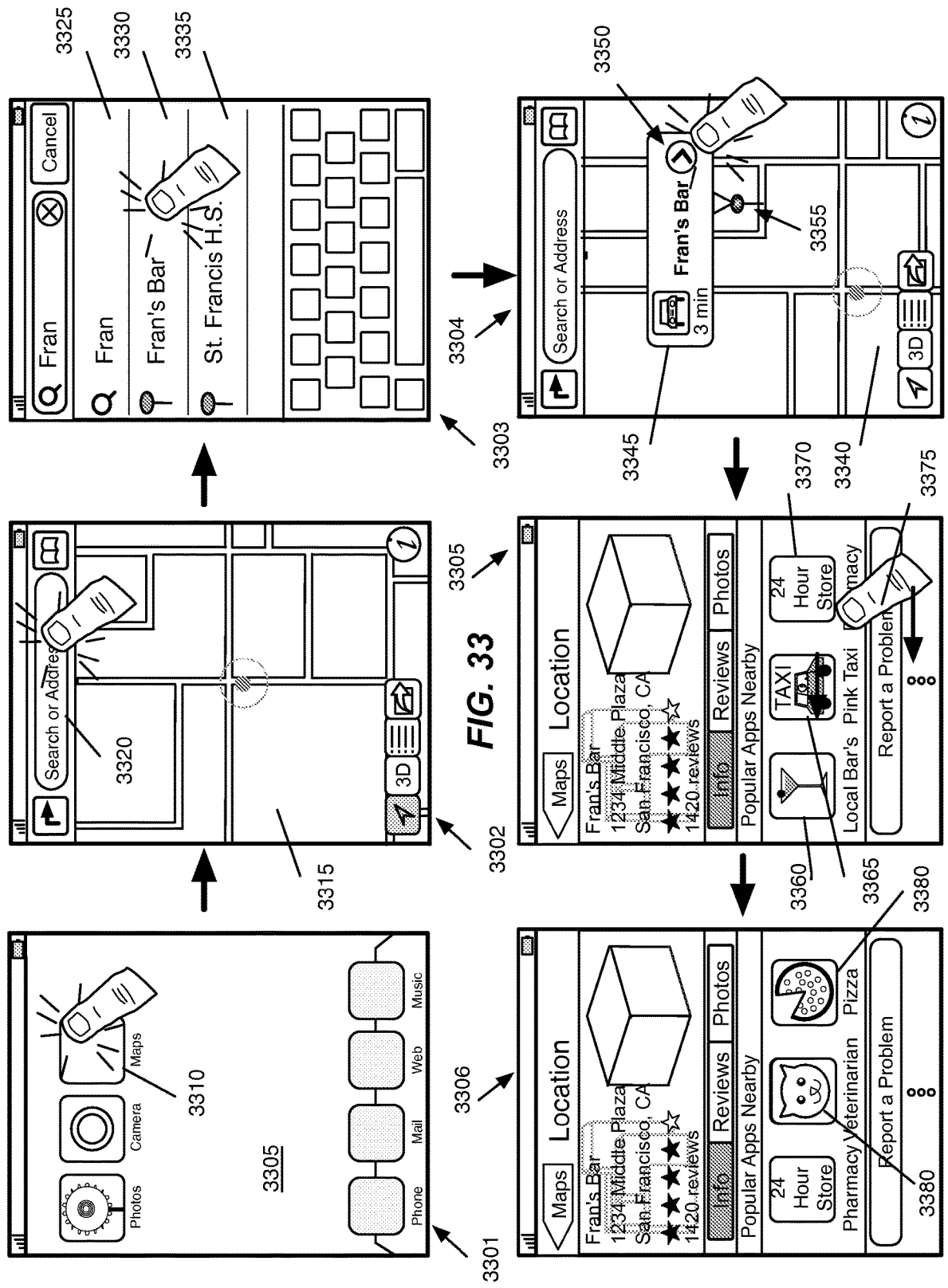

FIG. 33 conceptually illustrates a user interface that provides application recommendations based on the location of a selected point on the map in some embodiments of the invention.

Figure 34:
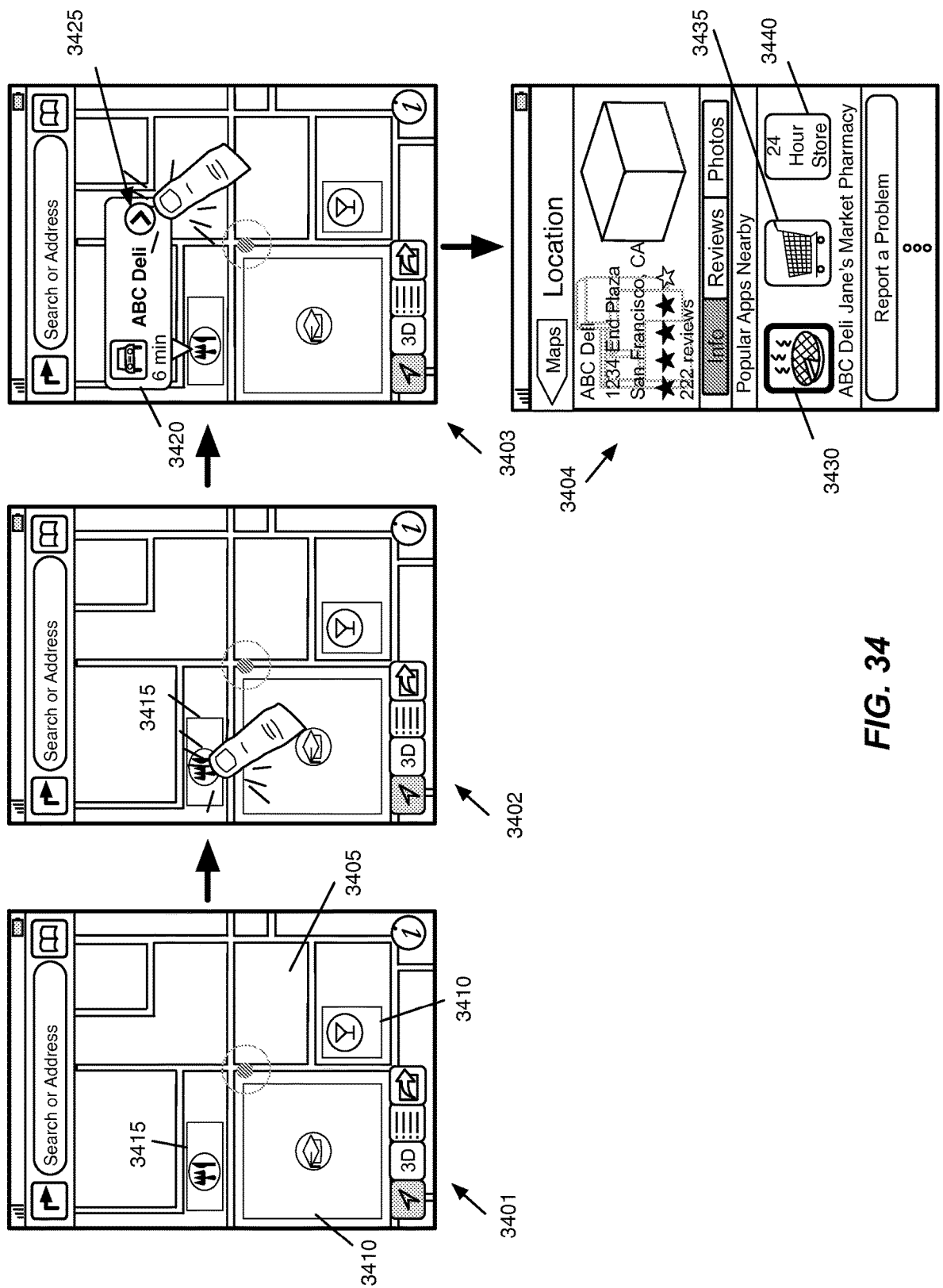

FIG. 34 conceptually illustrates a user interface that provides application recommendations based on the location of a selected point of interest that has registered an application with the mapping application in some embodiments of the invention.

Figure 35:
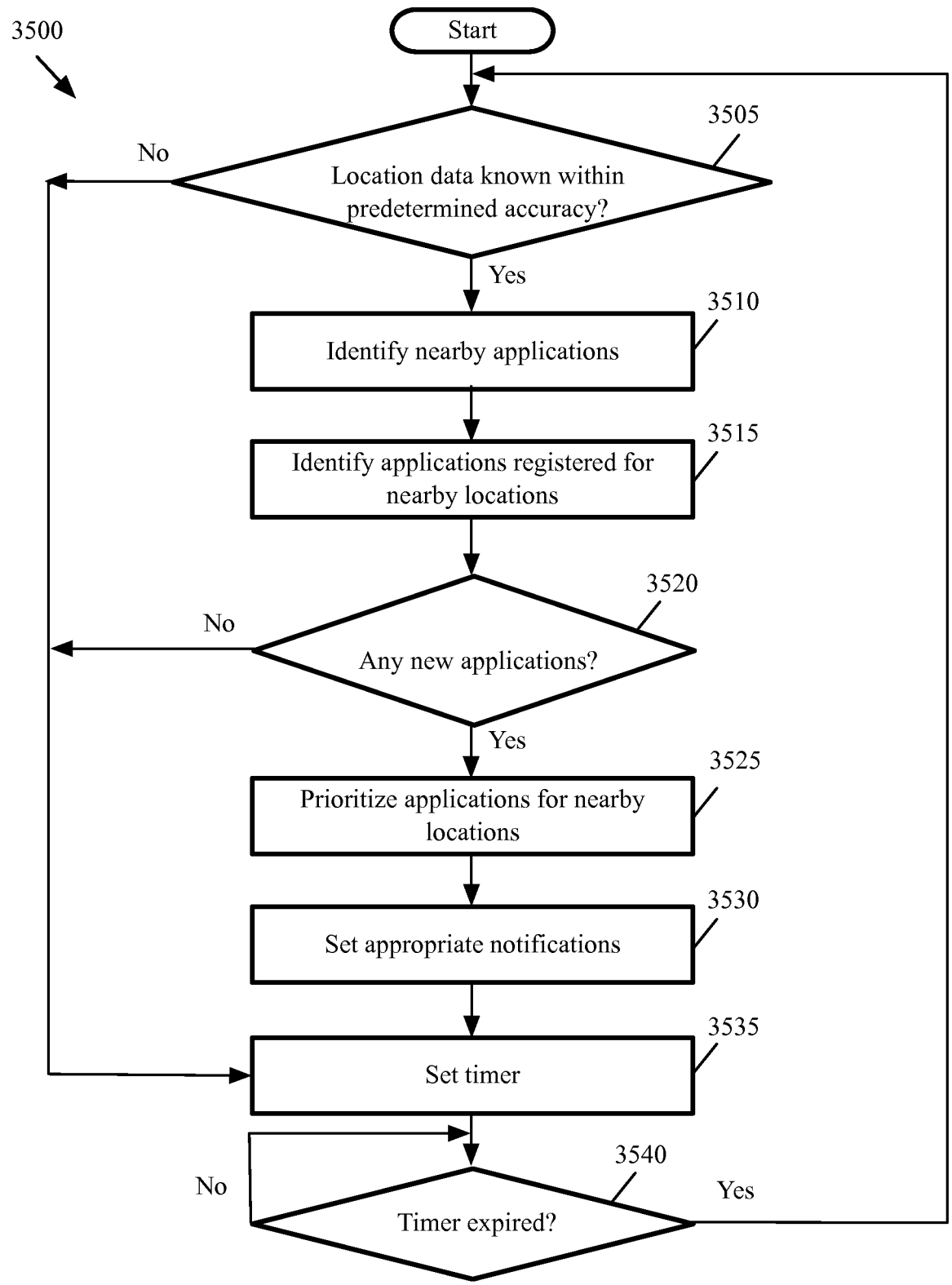

FIG. 35 conceptually illustrates a process for providing recommendations for popular applications based on location data for a location of interest in some embodiments of the invention.

Figure 36:
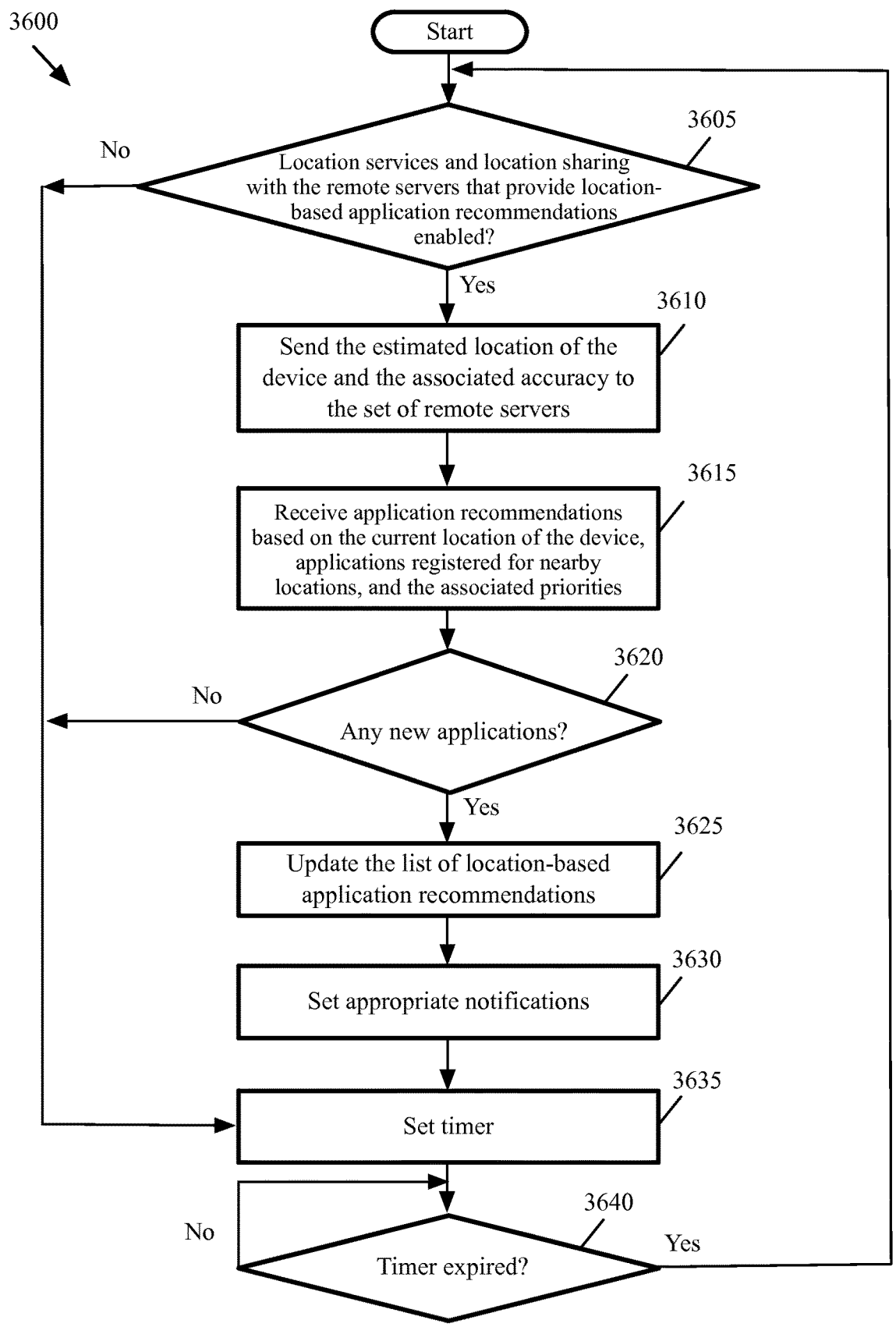

FIG. 36 conceptually illustrates a process for providing recommendations for popular applications based on the current location of a device in some embodiments of the invention.

Figure 37:
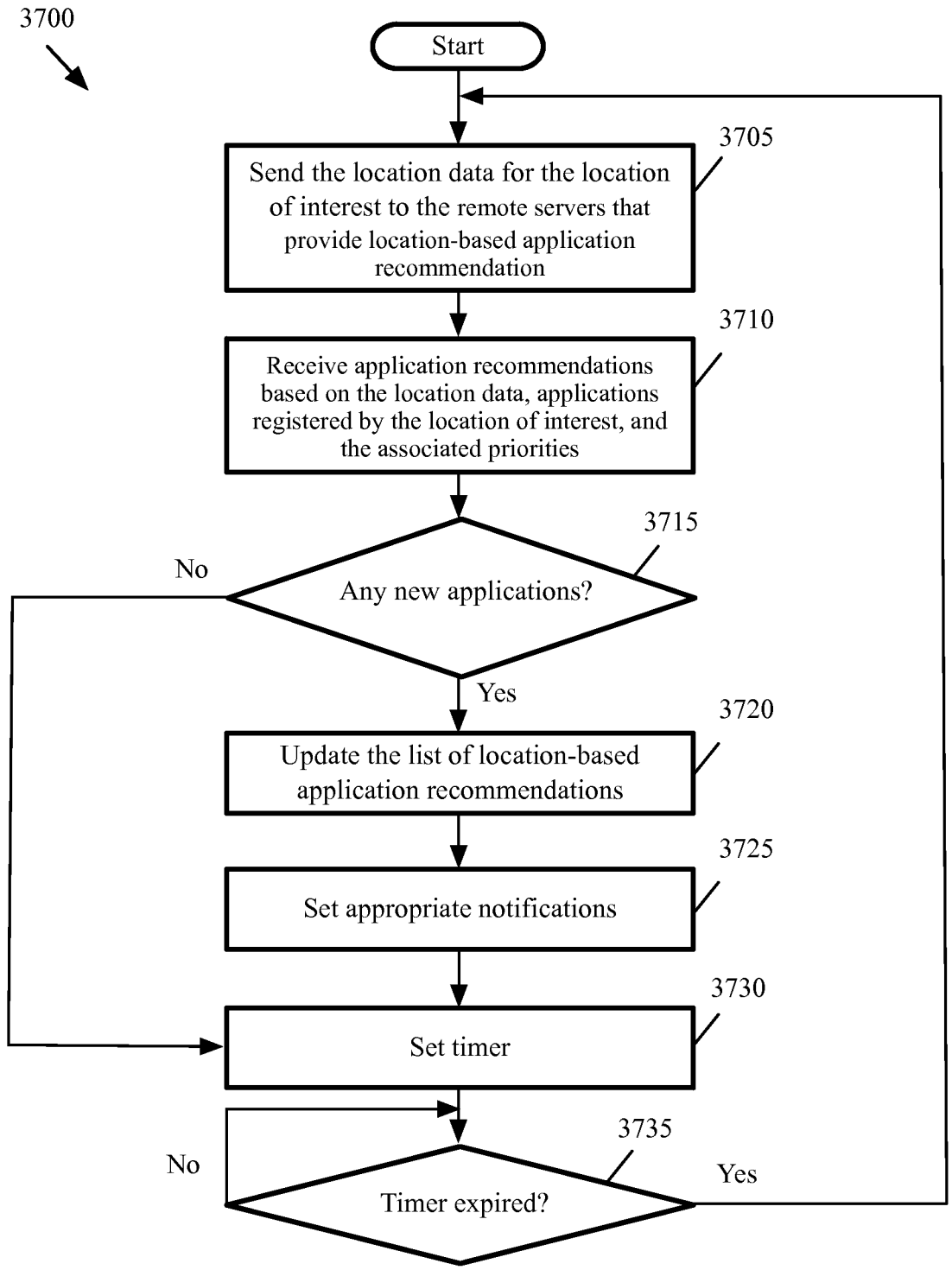

FIG. 37 conceptually illustrates a process for providing recommendations for popular applications based on location data for a location of interest on a map in some embodiments of the invention.

Figure 38:
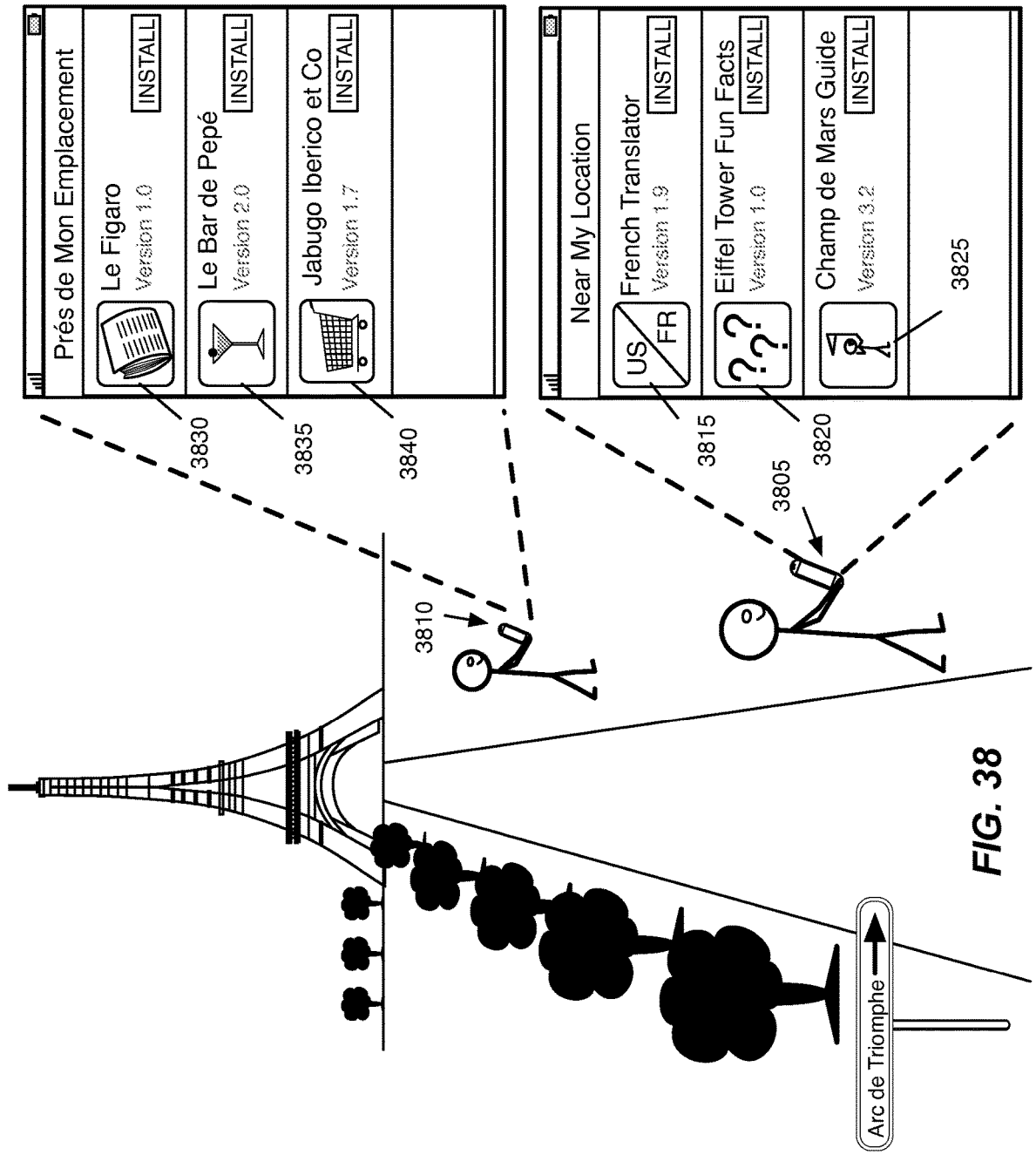

FIG. 38 conceptually illustrates an example of providing different application recommendations based on the home region as well as the current physical location of a device in some embodiments of the invention.

Figure 39:
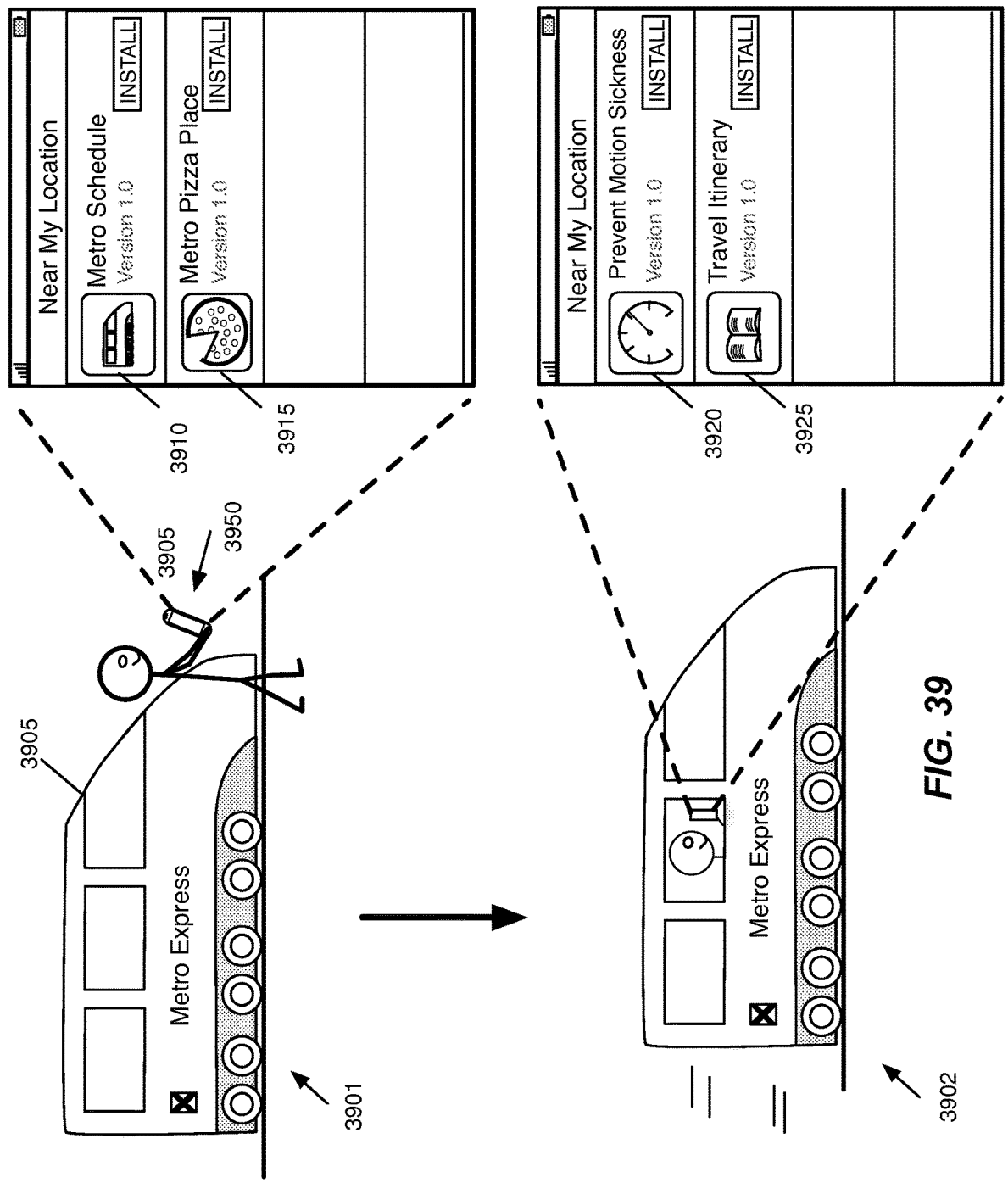

FIG. 39 conceptually illustrates recommending different applications based on the current location as well as the travelling speed of a device in some embodiments of the invention.

Figure 40:
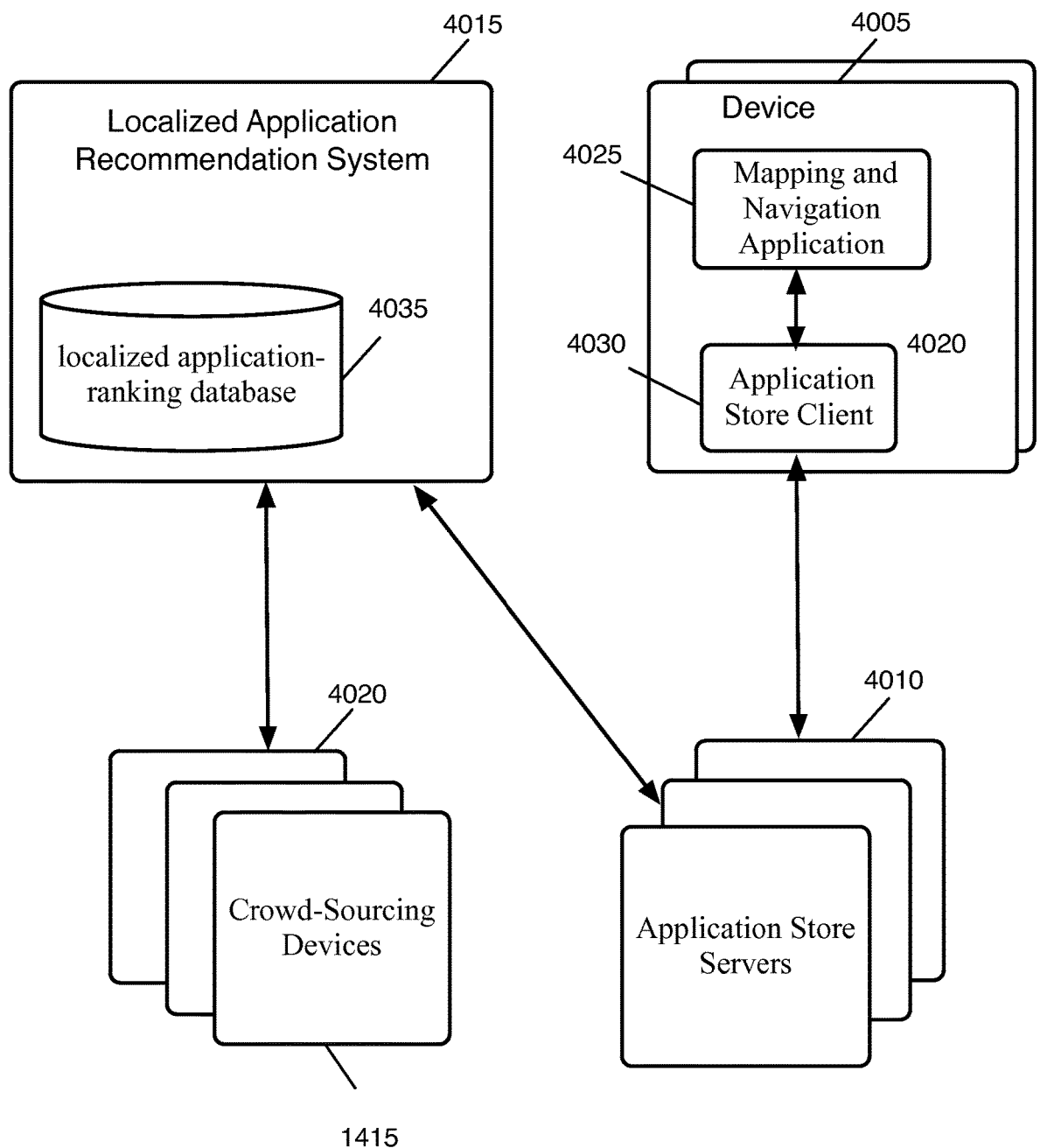

FIG. 40 conceptually illustrates a system for providing application recommendations to a device based on a location of interest.

Figure 41:
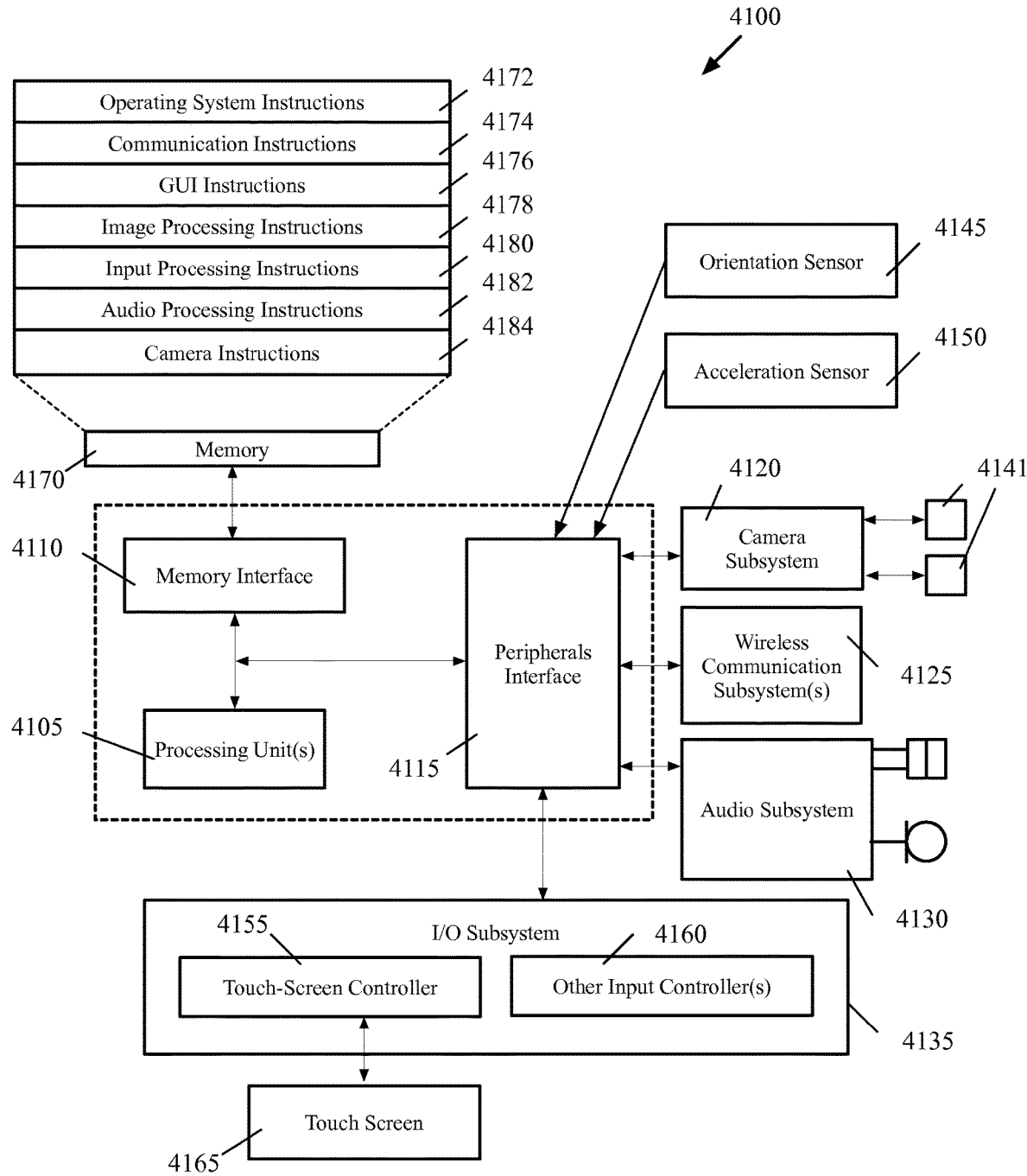

FIG. 41 is an example of an architecture of a mobile computing device with which some embodiments of the invention are implemented.

Figure 42:
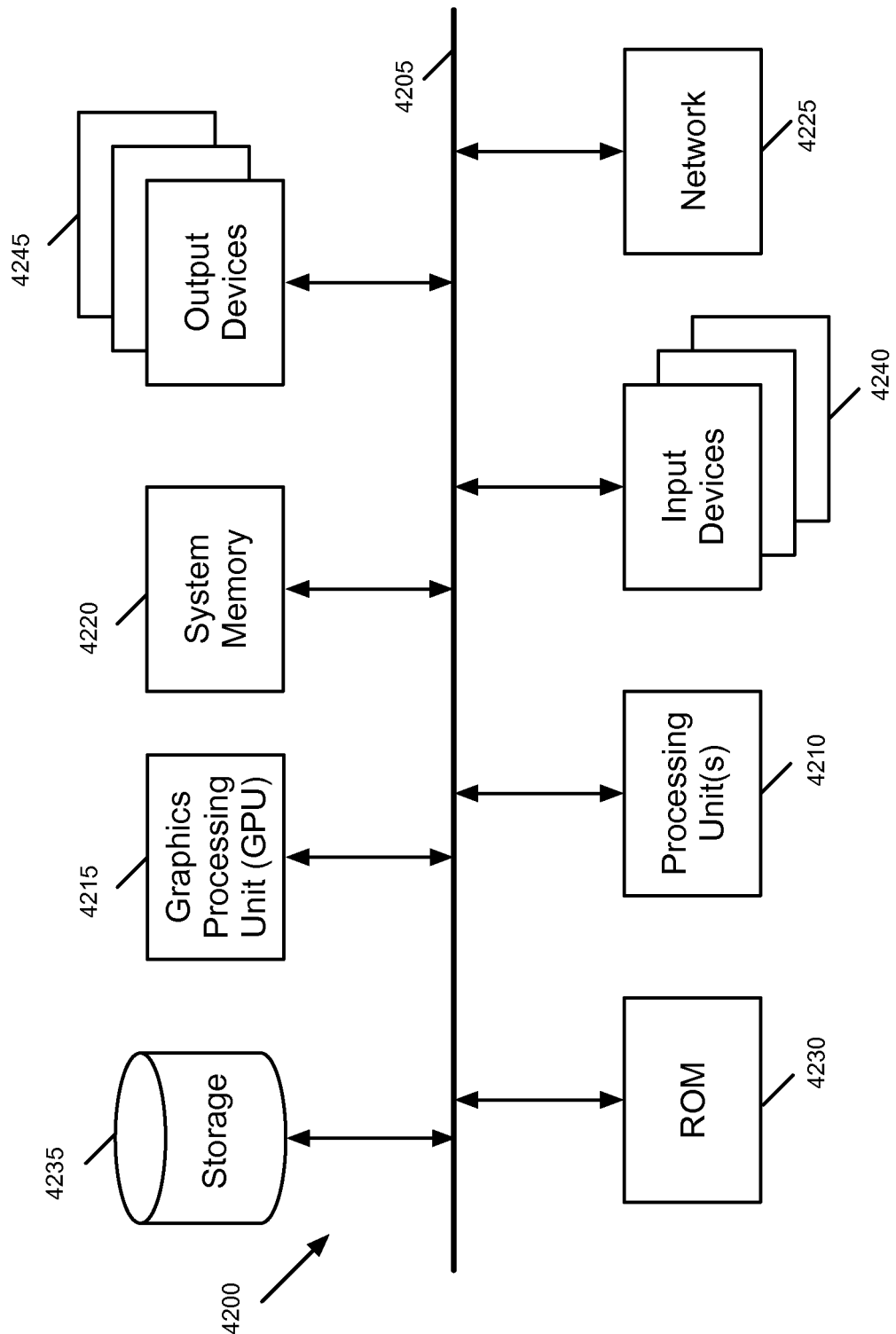

FIG. 42 conceptually illustrates another example of an electronic system with which some embodiments of the invention, are implemented.

Figure 43:
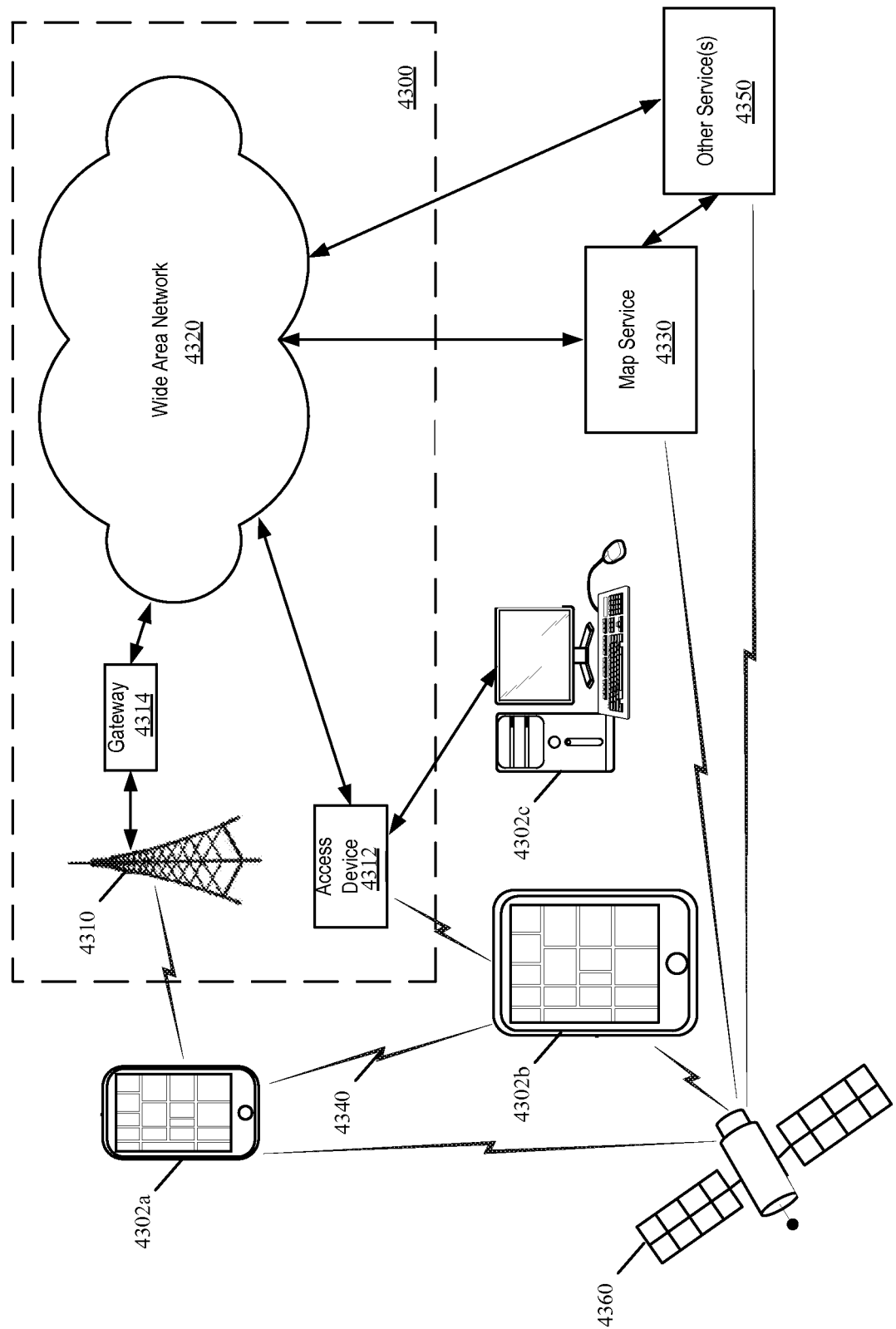

FIG. 43 illustrates a map service operating environment, according to some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of sharing map related information between an electronic device (referred to as a device) and other nearby devices. FIGS. 1A and 1B conceptually illustrates a user interface for sharing map information in some embodiments of the invention. The figures are described in nine stages 101-109. In stage 101 a map 142 is displayed on the device display screen. The current location 118 of the device is also available and is shown on the map. In this example, the current location is indicated by a small solid circle 118 surrounded by a larger circle 119. The size of larger circle 119 conceptually indicates how precisely the location is estimated. The smaller the circle, the greater the precision is.

In addition, several point of interest 115-120 and several pins 125 are also shown on the map. In this example, the pills identify the results of a search related to the word "coffee" as entered on the search area 130. In stage 101 a point of interest 120 is selected. Selection of the point of interest is conceptually shown by a finger 135 tapping on the point of interest (or an information button 140 related to the point of interest) on a touchscreen display. In other embodiments selection is performed by using any user input controlling device such as a mouse, touchpad, tracking ball, etc., depending on the type of user input control utilized by the device.

In stage 102, point of interest 120 remains selected as shown by the banner 145 that provides additional options such as selecting the button 150 for driving directions and button 155 for getting additional information about the selected point of interest. In this stage the share button 160 is also selected to share map information with other users. At this point there are more than one map related items that the user of the device might wish to share. As shown, in addition to the selected point of interest 120, the current location 118 of the device is also available and shows that the device has moved in time elapsed between stages 101 and 102.

In stage 103, a list 165 (also referred to as an action list or action card) is displayed that provides a choice between the selected location 120 and the current location 118 of the device. Some embodiments provide animation for displaying the action card. For instance, in stage 103 of the illustrated embodiment, the list 65 slides up from the bottom of the display screen and is fully displayed in the stage 104.

As shown in stage 104, the list provide options to shared the selected location (displayed as "share a location") and sharing the current location of the device (displayed as "share my location"). In this example, the option 170 to share a location is selected.

Once the map related information to share is identified, the action list 165 is replaced by a list 175 (also referred to as a share list or share card) to provide options for the method of sharing as well as who to share the map information. Some embodiments provide animation for replacing the action card 170 shown in stage 104 with the share list 195 shown in stage 180.

For instance, some embodiments provide a telescopic effect for replacing the action card with the share list. As shown in stages 105-107 of the illustrated embodiment, the action list 165 shrinks into smaller shapes 175, 180, 187 (shown here as circles but other embodiments use other shapes, e.g., a shape proportional to the dimensions of the action list 165). Then in stages 107 and 108 the share list is displayed as growing shapes 185 and 190. In some embodiments, the two lists 185 and 187 appear together (as shown in stage 107) one shrinking and the other growing at the same time. In other embodiments (not shown) the shapes for the action list shrink and disappear before the growing shapes for the share list are displayed.

In stage 109, the share list 195 is displayed on the device display screen. The share list 195 provides options to share the map information with others through peer-to-peer communication 194, text message 196, email 197, etc. The list also provides an option 198 to print the route. Sharing the map information through the peer-to-peer communication also provides option to choose the nearby devices 191-193 for sharing the map information.

Peer-to-peer (or P2P) communication allows devices to send information directly to one another without sending the information through a centralized server. The devices can discover and directly communicate with each other through wireless channels by sending signals from the antenna of the sending device to the antenna of the receiving device without the signals going through any other intervening infrastructure access points, gateways, servers, or cellular base-stations. Wireless technologies such as Wi-Fi, Bluetooth® or other short-range communication methods are used in different embodiments to provide connectivity without a need for a gateway or an access point.

In stage 109, one of the nearby devices 191 is selected to receive the shared map information. As shown in stages 110-112, the button 191 that corresponds to the selected device shows an animation. For instance, a small circle 181 growing to a larger circle 182 and shrinking back to a smaller circle several times until the device receives a notification from the selected device that the shared map information is received. The button 191 corresponding to the selected device then shows a checkmark 183 to indicate the successful transfer of information.

The embodiments described in this Specification function with or without animating the display of the action cards, share lists, and device selection buttons. For simplicity, the animations are not shown in the subsequent figures in this Specification.

FIG. 2 conceptually illustrates a user interface for receiving shared map information from other devices in some embodiments of the invention. The figure is described in four stages 201-204. In stage 201, the device is displaying a map 205, which shows a particular region of the map.

In stage 202, the device receives a notification 210 indicating that a map item to share is received from another device. Some embodiments provide animation for displaying the notification. For instance, in stage 202 of the illustrated embodiment, the notification 210 slides down from the top of the display screen and is fully displayed in the stage 203.

The notification 210 in some embodiments includes an icon or a small image 220 of a map. In some embodiments, the displayed small map is a smaller version (or an icon made) of the actual map to be displayed. In other embodiments, the small image is a generic image of a map. Yet in other embodiments (e.g., when the device is in locked mode), the notification does not include an image of a map. The notification in some embodiments identifies (as shown by 225) the sender.

In stage 203, the request to receive the map information is accepted (e.g., after an accept button 240 is selected). On the other hand, if button 250 is selected, the received map information is discarded in some embodiments. In stage 204 the received location is displayed on the receiving device displayed screen. As shown, the map 205 that was displayed on the device in stage 201 is replaced by the map 245 in stage 204. In some embodiments, the same region of the map that was displayed on the sending device is displayed on the receiving device display screen.

In some embodiments, the same view (e.g., the same zoom level, the same camera view, etc. of the map that was displayed on the sending device when the map selection was made is also displayed on the receiving device. For instance, when the map to share is the map 142 shown in FIGS. 1A-B, the map 245 in stage 204 is displayed at the same zoom level, camera view, and shows the same region as the map 142. The map 245 dimensions are adjusted according to the display size and display aspect ratio of the receiving device. As shown in FIG. 2, the map 245 also shows the point of interest 120 that the device in FIGS. 1A-B selected to share. The user in the receiving device can select the button 270 to get directions to the point of interest or select button 275 to get additional information about the point of interest.

The embodiments described in this Specification function with or without animating the display of the notification. For simplicity, the animations are not shown in some of the subsequent figures in this Specification.

The embodiments described by reference to FIGS. 1A, 1B, and 2 show several control buttons (such as buttons 280 in FIG. 2) on the map. In some embodiments, these controls are floating controls. Some embodiments use floating controls in order to keep the on-screen controls to a minimum and thereby display as much of the interactive navigation as possible. In some embodiments, the floating controls are part of a cluster of controls that adapt to the task at hand by adjusting its contents in an animated fashion, when a user moves between different navigation views, or between different application modalities for embodiments in which the navigation is just one of several modalities of another application. This adaptive nature allows the navigation application to optimize for different tasks while maintaining a consistent look and interaction model while moving between those tasks.

In some embodiments, these controls buttons are hidden in order to maximize the display area for showing the map. In these embodiments, receiving a control (such as a gesture performed on a touchscreen once) displays the controls. A similar or a different control (such as the same or a different gesture performed on the touchscreen once) hides the controls.

FIG. 3 conceptually illustrates a user interface for displaying a map in some embodiments of the invention. The figure is described in four stages 301-304. As shown, in stage 301 a map 305 is displayed on the device display screen without displaying any control buttons. In this stage, a control is received (e.g., when the user taps the touchscreen display once) to show the controls.

In some embodiments, the controls are displayed on the screen with animation. As shown in stage 302 different controls are sliding from the top and bottom of the display screen. In stage 303 the controls 380 are fully displayed. In addition to these controls, other information such as the current device batter level 390 and the cellular reception strength 385 (if the device is cellular capable) were hidden in stage 201 and are displayed in stage 303. In this stage, a control is received (e.g., when the user taps the touchscreen display once or uses another hand gesture on the touchscreen to hide the controls. In stage 304 the controls are hidden one more time and the map 305 is displayed on full screen.

The embodiments described in this Specification function with or without hiding the controls. For simplicity, hiding and showing of the controls are not shown in the subsequent figures in this Specification.

Several more detailed embodiments of the invention are described in sections below. Section I discusses sharing map information with other devices using peer-to-peer communication. Next, Section II describes receiving the shared map information by other devices. Section III describes location-based application recommendations of some embodiments. Section IV provides a description of an electronic system with which some embodiments of the invention are implemented. Finally, Section V describes the map service environment of some embodiments.

I. Sharing Map Information with other Devices Using Peer-to-Peer Communication

FIGS. 4A-4B conceptually illustrate a process 400 for sharing map-related information to share with other devices. The process is described by referencing FIGS. 5-15. As shown in FIGS. 4A-4B, the process displays (at 405) a map on the device display screen. FIG. 5 conceptually illustrates a user interface for sharing map information when the current location of the device is available and a route is displayed on the map in some embodiments of the invention. The figure is described in six stages 501-506. In stage 501, a map 590 is displayed on the display screen of a device. The map shows the current location of the device (in this example, the current location is indicated by a small circle surrounded by a larger circle).

The top bar 510 includes a direction control 515. In stage 501, the direction control 515 button is selected. Stage 502 illustrates that the selection of the direction control 515 opens a direction entry page 520 through which a user can request a route to be identified between a starting location and an ending location. The direction entry page 520 includes starting 525 and ending 530 fields for providing starting and ending locations for a route, and a table 535 that lists recent routes that the application has provided to the user.

In stage 502, the user has requested routes from the current location to one of the ending location that is displayed in the table 535. In stage 503 several routes 540-550 are shown. The route 545 is the currently selected route and is shown in a darker color. A route can be the currently selected route when a user selects the route (e.g., by selecting the banner 555 that shows the estimated travel time) or is selected by default (e.g., as the route with the shortest estimated travel time) when the routes are first displayed.

Referring back to FIGS. 4A-4B, process 400 receives (at 410) a request to share map information with other devices. For instance, in the example of FIG. 5, the share button 560 is selected to share map information. Process 400 then determines (at 415) whether the map shows one or more routes. If not, the process proceeds to 475, which is described below. Otherwise, the process determines (at 420) whether the map identifies the current location of the device. Some embodiments provide an option for a user to disable location services for the device. In these embodiments when the user disables location services, the map does not identify the current location of the device. In other embodiments, a device may not have a GPS or other location identification capabilities. In the example of FIG. 5, several routes 540-550 are shown on the map and the current location 505 of the device is also shown on the map.

If the map does not identify the current location of the device, the process proceeds to 460, which is described below. Otherwise, the process determines (at 425) whether a point of interest (POI) or a pin is selected. If yes, the process proceeds to 455, which is described below. Otherwise, the process displays (at 430) a list (referred to as an action sheet or action card) with the route and the current location of the device as items to share. The process then receives (at 435) an identification of one of the items to share.

As shown in stage 503 in FIG. 5, no point of interest or pin is selected. In stage 504, a list 565 is displayed that provides the options to share a route or share the current location of the device. The user has selected the option 570 to share the route. In some embodiments, when the option to share a route is selected, process 400 identifies the currently selected route (e.g., the route 545 in FIG. 5 that is selected either explicitly or as default) as the item to share In other embodiments, all displayed routes are selected as items to share.

Process 400 then establishes (at 440) peer-to-peer communication with a set of devices. For instance, the device establishes Wi-Fi, Bluetooth®, or any other short-range communication with a set of nearby devices. The process then replaces (at 442) the action sheet with a list (referred to as a share list or share sheet) to provide options to select different users to share the selected map information. The process then receives (at 445) a selection of a device to share the identified map information. The process then sends (at 450) the identified map item to the selected device. The process then ends.

As shown in stage 505 in FIG. 5, the action list 565 is replaced with a list 585 of options to share the map information with others through peer-to-peer communication 586, text message 587, email 588, etc. The list also provides an option 589 to print the route.

As shown, a group of nearby devices 575-577 is displayed. In some embodiments, these devices are in vicinity of the device that is displaying the map and have established peer-to-peer communication with each other. In stage 505, the user has selected device 575 for sharing the map information. In stage 506, the information is sent to the identified device (as shown in this example by a check mark 580 displayed on the device name), for instance through a peer-to-peer communication channel.

When process 400 determines (at 425) that a point of interest or a pin is selected, the process displays (at 455) a list with the route, the current location, and the selected point of interest or pin as items to share. The process then proceeds to 435, which was described above. FIG. 6 conceptually illustrates a user interface for sharing map information when the current location of the device is available, a route is displayed, and another item is selected on the map in some embodiments of the invention.

The figure is described in five stages 601-605. Stages 601-602 are similar to stages 501-502 described by reference to FIG. 5, above. In stages 601-602, a map 690 is shown and the user requests directions from the current location to an ending location.

In stage 603, the user also selects a point of interest 660 (e.g., by selecting an information button or icon 655 displayed on or next to the point of interest). In stage 604, point of interest 660 remains selected as shown by a banner 665 that provides additional options such as selecting the button 670 for driving directions and button 675 for getting additional information about the selected point of interest. In this stage the share button 680 is also selected to share map information with other users.

In stage 605, a list 685 is displayed that includes options to share a location (i.e., the location of the selected point of interest), a set of routes, or the current device location. Similar to stages 504-506 in FIG. 5, the user of the device in FIG. 6 can select one of the options followed by selecting a device to receive the shared information. These stages are not repeated in FIG. 6 for brevity.

Referring back to FIGS. 4A-4B, when process 400 determines (at 420) that the map does not identify the current location of the device, the process determines (at 460) whether a point of interest or a pin is selected. If not, the process identifies (at 470) the route as the item to share. Since there are no options other than the route, some embodiments do not display the action sheet. The process then proceeds to 440, which was described above. On the other hand, when a pin or point or interest is selected, the process displays (at 465) the action sheet with the route and the selected item as the options. The process then proceeds to 435, which was described above.

FIG. 7 conceptually illustrates a user interface for sharing map information when the current location of the device is not available, a route is displayed, and another item is selected on the map in some embodiments of the invention. The figure is described in four stages 701-704. In stage 701 several routes 740-750 and several points of interest 760-765 are displayed on the map. In this example, the current location of the device is not shown on the map (e.g., the location identification services are disabled or the device is not capable of identifying the current location).

In stage 702 a point of interest 755 is selected. In stage 703, point of interest 760 remains selected as shown by a banner 765 that provides additional options for getting additional information about the selected point of interest. In this stage the share button 780 is also selected to share map information with other users.

In stage 703, a list 785 is displayed that includes options to share a location (i.e., the location of the selected point of interest) or the current device location. The current location of the device is not available and is not listed as an option to share. Similar to stages 504-506 in FIG. 5, the user of the device in FIG. 7 can select one of the options followed by selecting a device to receive the shared information. These stages are not repeated in FIG. 7 for brevity.

FIG. 8 conceptually illustrates a user interface for sharing map information when the current location of the device is not available, a route is displayed, and no other items is selected on the map in some embodiments of the invention. The figure is described in four stages 801-804. In stage 801 several routes 840-850 and several points of interest 860-865 are displayed on the map. In this example, the current location of the device is not shown on the map (e.g., the location identification services are disabled or the device is not capable of identifying the current location).

In stage 802 the share button 880 is selected to share map information with other users. Since the current location of the device is not available and no pins or point of interest are selected, the route is automatically selected as the item to share. In stage 803, a list 820 is displayed to provide options to select the mechanism (peer-to-peer communication, text message, email, etc.) as well as the users and/or devices to share the information. In contrast to the embodiment of FIG. 5 that displays an action list 565 after the share button 560 is selected, in the embodiment of FIG. 8 the display of the action list is bypassed and the share list 820 is displayed after the share button 880 is selected. The share list includes a banner 830 which indicates that the item to share is a route.

As shown, from a group of listed devices 875-877, the user has selected the device 875 for sharing the map information. In stage 804, the information is sent to the identified device (as shown in this example by a check mark 880 displayed on the device name). 0120

Referring back to FIGS. 4A-4B, when the process determines (at 415) that a route is not shown on the map, the process determines (at 475) whether the map identifies the current location of the device. If not, the process proceeds to 492, which is described below.

Otherwise, the process determines (at 480) whether a point of interest or a pin is selected. If not, the process identifies (at 485) the current location of the device as the item to share. The process then proceeds to 440, which was described above. Otherwise, the process displays 490) the action sheet with the current location and the selected item as the options. The process then proceeds to 435, which was described above.

FIG. 9 conceptually illustrates a user interface for sharing map information when the current location of the device is available, no route is displayed, and another item is selected on the map in some embodiments of the invention. The figure is described in four stages 901-904. In stage 901 a map 905 is displayed on the device display screen. The current location 910 of the device is also available and is shown on the map.

Several pins 915-920 are also shown on the map. In this example, the pins identify the results of a search related to the word "coffee" as entered on the search area 925. As shown, one of the pins 920 is selected in stage 901.

In stage 902, pin 920 remains selected as shown by the banner 930 that provides options to get more information about the location identified by the pin. In this stage, the share button 935 is selected. In stage 903, a list 940 is displayed that provides a choice between the selected location 920 and the current location 910. As shown, the option 945 to share the selected location is chosen. In stage 904, a list 950 is displayed that includes an option 950 for selecting the other devices to share the selected map information.

FIG. 10 conceptually illustrates a user interface for sharing map information when the current location of the device is available, no route is displayed, and no other items is selected on the map in some embodiments of the invention. The figure is described in four stages 1001-1004, in stage 1001, a map 1005 is displayed on the device display screen. The current location 1010 of the device is also available and is shown on the map.

As shown in stage 1001, the search area 1015 is selected. Stage 1002 shows the display screen of the device after the word "Bank" is typed in the search area 1015. In this stage a list 1020 of several results is displayed and the result "bank" 1025 is selected.

In stage 1003, several pins 1030 are displayed that show locations related to the search results for "bank." As shown, the share button 1035 is selected to share the map information.

In stage 1004, a share list 1040 is displayed to provide options to select the mechanism (e.g., peer-to-peer communication, text message, email, etc.) as well as the users and/or devices to share the information. In contrast to the embodiment of FIG. 5 that displays an action list 565 after the share button 560 is selected, in the embodiment of FIG.

10 the display of the action list is bypassed and the share list 1040 is displayed after the share button 1035 is selected. The share list includes a banner 1045, which indicates that the item to share is the current location of the device. Selection of a device to share the information and sending the information are similar to stages 505 and 506 in FIG. 5 and are not repeated here for brevity.

Referring back to FIGS. 4A-4B, after the process determines (at 475) that the current location is not available, the process determines (at 492) whether a point of interest or a pin is selected. When a pin or point of interest is selected, the process identifies (at 495) the selected item as the item to share. The process then proceeds to 440, which was described above. Otherwise, the process identifies (at 497) the current map region at the current zoom level and the current camera view as the item to share. The process then proceeds to 440, which was described above.

FIG. 11 conceptually illustrates a user interface for sharing map information when the current location of the device is not available, no route is displayed, and no other items is selected on the map in some embodiments of the invention. The figure is described in three stages 1101-1103. In stage 1101, a map 1105 is displayed on the device display screen. The current location of the device is not available and is not shown on the map.

In addition, several pins 1115 and several points of interest 1110 are displayed on map. However, none of the pins or points of interest are currently selected on map. In stage 1102, the share button 1135 is selected. Since the current location is not available, no route is displayed on the map, and no pins or points of interest are selected, the current view of the map is shared.

Different embodiments share the current view of the map differently. In some embodiments, the current region, the zoom level, and the camera view of the map are shared. In some embodiments, all other information such as the pins and points of interest are also shared. In other embodiments, only the points of interest are shared but the pins are not shared. Yet in other embodiments, neither the pins nor the points of interest are shared.

Since there are no options other than sharing the map is available, display of an action list (such as the action list 565 shown in FIG. 5) is bypassed in some embodiments. As shown, in stage 1103, the share list 1150 is displayed. A banner 1145 on the share list identifies the map as the item to share. Selection of a device to share the information and sending the information are similar to stages 505 and 506 in FIG. 5 and are not repeated here for brevity.

FIG. 12 conceptually illustrates a user interface for sharing map information when the current location of the device is not available, no route is displayed, and an item is selected on the map in some embodiments of the invention. The figure is described in six stages 1201-1206, in stage 1201, a map 1205 is displayed on the device display screen. The current location of the device is not available and is not shown on the map.

As shown, the user has selected the search area 1210 to enter search criteria. In stage 1202, the user has entered the word "Venice" in the search area 1210. Several suggestions are displayed that include the search word "Venice." As shown, in this stage a previously searched for location 1215 is selected. In stage 1203, a pin 1220 is dropped at the selected location. A banner 1225 is also displayed that allows getting more information about the location.

In stage 1204, the share button 1230 is selected. Since the current location is not available and no route is shown on the map, the selected pin 1220 is the only map item to share. The display of an action list (such as the action list 565 shown in FIG. 5) is therefore bypassed in some embodiments. As shown in stage 1205, the share list 1250 is displayed. A banner 1245 on the share list identifies the item to share as a selected location. Selection of a device to share the information in stage 1205 and sending the information in stage 1206 are similar to stages 505 and 506 in FIG. 5 and are not repeated here for brevity.

FIG. 13 conceptually illustrates a user interface for an alternative manner of sharing a selected item on a map in some embodiments of the invention. The figure is described in six stages 1301-1306. In stage 1301, a map 1305 is displayed on the device display screen. The current location 1350 of the device is also available and is shown on the map. In addition several routes 1355 are also shown on the screen.

In stages 1302 and 1302, the user has selected a search result 1320 using similar steps as described by reference to selection of search result 1220 in FIG. 12. In stage 1303, the button 1320 is selected to get more information about the selected location 1320. In stage 1304 detailed information (e.g., in the form of an information card) about the selected location 1320 are shown on the device display screen. Although in the illustrated embodiment, the information card in stage 1304 covers the display screen, in other embodiments the information card covers only a portion of the display screen. The information card also displays an option 1360 to return to map display and an option 1365 to share the information about the selected location (or selected pin).

As shown in stage 1304, the share button 1365 is selected. Although the current location 1350 is available and several routes 1355 are displayed, selection of share button 1365 in some embodiments (such as the illustrated embodiment) results in bypassing the display of an action list (such as the action list 685 shown in FIG. 6). In these embodiments, selection of share button 1365 that is associated with the information card is considered as a clear indication that the user intends to share the information card and not the routes or the current location of the device. Stages 1305 and 1306 are similar to stages 1205 and 1206 described by reference to FIG. 12 and are not repeated for brevity.

In other embodiments (not shown) the share button 1365 that is associated with an information card acts similar to the share buttons 680 and 1380 associated with the map 1305. In these embodiments, selection of the button 1365 results in the display of an action list (such as the action list 685 in FIG. 6) that provides options for selection of the selected location 1320, the current location 1350, or a route 1355.

Alternative Embodiments

FIG. 14 conceptually illustrates a user interface for an alternative manner of sharing a selected item on a map in some embodiments of the invention. The figure is described in six stages 1401-1406. In stage 1401 a map 1405 is displayed. The current location 1410 of the device is also shown on the map. In this stage an information button 1415 is selected.

As shown in stage 1402, a list is displayed that provides options for displaying the map in standard 1425, hybrid 1430, or satellite view 1435. The list also provides options to return 1440 to map display, share 1445 the current location, drop 1450 a pin at the current location, print 1455 the map, report 1460 a problem, show 1465 traffic, etc. In stage 102, the option 1445 to share the current location is selected. In stage 1403 a share list 1470 similar to the share list 195 shown in FIGS. 1A-1B is displayed. Stages 1405-1406 are similar to stages 110-112 described by reference to FIGS. 1A-1B, above.

FIG. 15 conceptually illustrates a user interface for an alternative use of information button on a map in some embodiments of the invention. Unlike the embodiments described by reference to FIG. 14 above, the information button embodiment described in FIG. 15 does not provide an option to share map information. The figure is described in six stages 1501-1506. In stage 1501 a map 1505 is displayed. The current location 1510 of the device is also shown on the map. In this stage an information button 1515 is selected.

As shown in stage 1502, after the information button 1515 is selected, a list is displayed that displays a smaller version 1520 of the map and provides for displaying the map in standard 1485, hybrid 1490, or satellite view 1495. The list also provides options to return 1525 to map display, report 1530 a problem, show 1535 traffic, etc. The list, however, does not provide an option to share map information. In stage 1503, the option to return to map display is selected. In stage 1504 the map is displayed on the display screen of the device.

Selection of the share button 1540 provides the same options as described by reference to FIGS. 1-13, above. In the example of FIG. 15, the current location of the device is available, no route is displayed, and no pins or points of interest are selected. Therefore the display of the action card is bypassed as described by reference to FIG. 10, above.

In stage 1505 a device 1545 is selected. In stage 1506 the successful sending of the shared information is acknowledged by displaying a checkmark 1550 in the button corresponding the receiving device.

II. Accepting Shared Map Information using Peer-to-Peer Communication

Once a device selects a map item to share and sends the information to another device, the receiving device receives a notification that map information is available to share.

FIG. 16 conceptually illustrates a process 1600 for receiving map information that is received from another device. As shown, the process establishes (at 1602) peer-to-peer communication with a set of devices. Establishing peer-to-peer communication in different embodiments is described further below. The process then receives (at 1605) a notification that map information has arrived from another device. Process 1600 then determines (at 1610) whether sharing of the map information was accepted. If the sharing is accepted, the process proceeds to 1615, which is described below. Otherwise, when sharing is not accepted (e.g., when a button such as the decline button 240 shown in FIG. 2 is selected), the process dismisses (at 1645) the shared information. The process then ends.

Process 1600 determines (at 1615) whether the device is in locked mode. In some embodiments, the device is locked when only a reduced set of controls can be used to provide input into the device. For instance, in some embodiments, locking of the device greatly limits the number of inputs that a user can provide through the touch-sensitive screen of the device. In some embodiments, devices with multiple functions (e.g., mobile phones that run multiple applications) can be placed into locked mode from various applications. In some embodiments, there are multiple ways to place a device into locked mode (e.g., by default after a predetermined period of time between user inputs, by pressing the power switch on the device once, by selecting a menu option, etc.).

When the device is not in locked mode, the process proceeds to 1630, which is described below. Otherwise, the process unlocks at (1620) the device. The process then activates (at 1625) the map application in the foreground. The process displays (at 1640) the received map information. The process then ends.

In some embodiments, the process (e.g., by using the map application) utilizes the received information and generates the map and/or the shared map information such as a search result, a location, a pin, a point of interest, etc., for displaying on the device display screen.

FIG. 17 conceptually illustrates a user interface for receiving shared map information by a device in locked mode in some embodiments of the invention. The figure is described in three stages 1701-1703. In stage 1701, the device is locked mode (as indicated by the unlocking slider 1705). In stage 1702, the device receives a notification 1730 that map information to share has arrived. The notification identifies (as shown by 1710) the device that has sent the shared information.

Also, in the embodiment shown in FIG. 17, the notification when the device is in the locked mode does not include an icon for a map. In other embodiments, the notification received when the device is in the locked mode does include an icon for a map (e.g., as shown by the icon 220 in FIG. 2).

In some embodiments (as the illustrated embodiment), the device acceptance of the notification unlocks the device. In other embodiments, the shared map item is displayed on the device display screen while the screen is locked (e.g., the display screen still shows the slide to unlock control 1705 and requires sliding the control 1705 before the device is unlocked).

In stage 1702, the request to receive the map information is accepted (e.g., after an accept button 1740 is selected). On the other hand, if button 1750 is selected, the received map information is discarded in some embodiments. As shown in stage 1703, the map application is activated in the foreground and the same region of the map that was displayed on the sending device is displayed on the receiving device display screen.

In some embodiments, the same view (e.g., the same zoom level, the same camera view, etc.) of the map that was displayed on the sending device when the map selection was made is also displayed on the receiving device. For instance, when the map to share is the map 1105 shown. FIG. 11, the map 1745 in stage 1703 is displayed at the same zoom level, camera view, and shows the same region as the map 1105. The map 1745 dimensions are adjusted according to the display size and display aspect ratio of the receiving device.

As shown in FIG. 11, other than the map region, other items on the map 1105 such as the pins 1760 and point of interest 1770 are also shown on the map 1745. In other embodiments, some or all of the items are not sent from the sending device to the receiving device. For instance, the points of interest are automatically generated on the receiving device by the map application and are not sent from the sending device. In addition, in some embodiments, pins are not sent unless a pin a selected and is explicitly sent by the sending device (e.g., as described by reference to FIG. 9, above.

FIG. 18 conceptually illustrates a user interface for receiving shared map information by a device in locked mode in some embodiments of the invention. The figure is described in three stages 1801-1803. The first two stages 1801-1802 are the same as stages 1701-1702 in FIG. 17 and are not described again for brevity. As shown in stage 1803, the map 1845 shows the same region, zoom level, and camera view as the map 1105 shown in FIG. 11. However, the pins 1115 are not shown on the map 1845. In addition, the points of interest 1870 are features of the map and are generated by the map application on the receiving device instead of being received from the sending device.

Referring back to FIG. 16, when the device was not in the locked mode, the process determines (at 1630) whether the map application is running in the foreground. When the map information is running in the foreground, the process proceeds to 1640, which was described above (i.e., displays the received map information). Otherwise, the process replaces the application that is currently running in the foreground with the map application. The process proceeds to 1640, which was described above (i.e., displays the received map information).

FIG. 19 conceptually illustrates a user interface for receiving shared map information by a device when the map application is not running in the foreground in some embodiments of the invention. The figure is described in three stages 1901-1903. In stage 1902 an application other than map application is running in the foreground. In this example, the application launcher 1905 is running in the foreground. As shown, several other application icons 1910 are displayed on the device display screen. Each one of these applications can be selected and launched in the foreground.

In stage 1902 is notification 1915 is received and is displayed on the device display screen. The notification includes (as shown by message 1920) the type of map information and the identification of the user (or the device) that wants to share the information. The notification in this example also displays an image 1925. The image in some embodiments is an icon or a small image of a map. In some embodiments, the displayed small map is a smaller version (or an icon made) of the actual map to be displayed. In other embodiments, the small image is a generic image of a map. Yet in other embodiments (e.g., when the device is in locked mode), the notification does not include an image of a map.

As shown in stage 1902, the notification is accepted (e.g., by selecting the accept button 1930). In stage 1903, the application 1905 that was running in the foreground is replaced by the mapping application, which has displayed a map 1935 with the information that is shared. In this example, the information to share is the current location of the device that has shared the map information, which is shown as a pin 1940 on the map 1935.

For instance, consider the example that the map 1935 displayed on device in FIG. 19 (i.e., Andy's device) is received from the device in FIG. 10 (i.e., Sam's device). The map 1935 displayed on Andy's device shows the same region, zoom level, and camera view as the map 1905. In addition, the current location 1010 of Sam's device is shown as the pin 1940 on the Map 1940 on Andy's device. In this example, other information such as pins 1030 shown on map 1005 is not shared with Sam. In other embodiments, all information shown on the sending device's map is shared with the receiving device.

In the example of FIG. 19, the current location of the receiving device is on shown on the map 1935 either because the receiving device is not in the region shown on map 1935 or the location tracking of the receiving device is disabled. FIG. 20 conceptually illustrates receiving the current location of a device while the receiving device is in the same map region as the sending device and has location tracking. FIG. 20 is shown in three stages 2001-2003. The first two stages 2001-2002 are the same as stages 1901-1902 in FIG. 19.

In stage 203, in addition to the location 240 of the sending device (i.e., Sam's device) that is shown as a pin on the map 235, the current location 2045 of the receiving device (i.e., Andy's device) is shown on the map 1935, e.g., as a small circle surrounded by another circle.

Several more embodiments for receiving shared map information such as a route, a point of interest, a selected pin, the current view of a map, or a search result are described below. For brevity, some of the embodiments are described only in one scenario where the mapping application is running in the foreground. One of ordinary skill in the art will realize that these scenarios are applicable to the embodiments were the screen is locked or when an application other than the mapping application is running in the foreground, for example by using the descriptions given by reference to FIGS. 16-18, above. Similarly, some of the embodiments are described only in one scenario where the mapping application is not running in the foreground. One of ordinary skill in the art will also realize that these scenarios are applicable to the embodiments were the screen is locked or when the mapping application is running in the foreground, for example by using the descriptions given by reference to FIGS. 16, 19, and 20, above.

FIG. 21 conceptually illustrates a user interface for receiving a shared route information when the mapping application is running on the foreground in some embodiments of the invention. The figure is described in three stages 2101-2103. In stage 2101, a map 2105 is displayed on the display screen. The current location 2110 of the device is also displayed.

In stage 2102 a notification 2115 is received that indicates (as shown by the message 2120) that another user wants to share route. The notification in some embodiments includes an image 2120 of a map. In this example, the image is a smaller version of the map to share and includes markings 2125 for the route to be shared. In this stage sharing of the route is accepted (e.g., by selecting accept button 2130).

In stage 2103 the map 2105 that was displayed on the display screen is replaced by a map 2135 that shows the same region with the same zoom level and camera view as a map that was displayed on the sending device. The map 2135 shows the route 2140 that the sending device sent to share. In the illustrated embodiment, only one route is received even though the sending device might have shown several routes. For instance, the received route is a current route or a selected route (such as route 545 shown in FIG. 5). In other embodiments, if the map on the sending device displays several routes all displayed routes are shared (e.g., all route 540-550 shown in FIG. 5 are shared).

In this example, the route being shared is from the current location of the sending device to a destination. Since the devices use peer-to-peer communication to share the map information, the receiving device is also in the same vicinity (as indicated by the location 2110 of the receiving device on the map 2105). The receiving device can start navigation along the route after receiving a command (e.g., when the start button 2145 is selected). If the map shows a route in another region, selecting button 2145 shows turn-by-turn directions from the source location of the route to the destination of the route without actually starting navigation.

FIG. 22 conceptually illustrates a user interface for receiving a shared point of interest in some embodiments of the invention. The figure is described in two stages 2201-2202. In stage 2201 a notification 2215 is received that indicates (as shown by the message 2220) that another user wants to share a point of interest. In this stage sharing of the point of interest is accepted (e.g., by selecting accept button 2230).

In stage 2202 the mapping application starts on the foreground and displays a map 2235 that shows the map region displayed at the sending device. The map 2235 shows the point of interest 2240 is received from the sending device.

FIG. 23 conceptually illustrates a user interface for receiving a shared pin in some embodiments of the invention. The figure is described in two stages 2301-2302. In stage 2301 a notification 2315 is received that indicates (as shown by the message 2320) that another user wants to share a point of interest. In this stage sharing of the point of interest is accepted (e.g., by selecting accept button 2330).

In stage 2302 the mapping application starts on the foreground and displays a map 2335 that shows the map region displayed at the sending device. The map 2335 shows the point of interest 2340 is received from the sending device.

FIG. 24 conceptually illustrates a user interface for receiving a current map view to share in some embodiments of the invention. The figure is described in two stages 2401-2402. In stage 2401 a notification 2415 is received that indicates (as shown by the message 2420) that another user wants to share a map. In this stage sharing of the point of interest is accepted (e.g., by selecting accept button 2430).

In stage 2402 the mapping application starts on the foreground and displays a map 2435 that shows the map region displayed at the sending device. The map 2435 in some embodiments shows the same region, camera view, and zoom level as the map that was displayed on the sending device when the map information to share was sent.

FIG. 25 conceptually illustrates a user interface for receiving shared search results in some embodiments of the invention. The figure is described in two stages 2501-2502. In stage 2501 a notification 2515 is received that indicates (as shown by the message 2520) that another user wants to share a search. In this stage sharing of the point of interest is accepted (e.g., by selecting accept button 2530).

In stage 2502 the mapping application starts on the foreground and displays a map 2535 that shows the map region displayed at the sending device. The map 2535 in some embodiments shows the same region, camera view, and zoom level as the map that was displayed on the sending device when the map information to share was sent. The map also shows several search results 2540-2545. The map also identifies the search result 2545 that was selected on the sending device when the shared information was sent.

Architecture

Some embodiments provide tools for devices to share map information with other nearby devices. Some embodiments utilize peer-to-peer communication to share the map information. FIG. 26 conceptually illustrates a system level diagram for sharing map information using peer-to-peer communication in some embodiments of the invention. The figure shows several electronic devices 2605-2630. Some of these electronic devices include wireless communication subsystems such as the subsystem 4025 described by reference to FIG. 41, below. These communication subsystem in some embodiments includes short-range communication transceivers such as Bluetooth®, infrared, etc.

In the example of FIG. 26, device 2610 has established peer-to-peer communication (e.g., through a Wi-Fi channel) with devices 2615-2625. Device 2610 has not established peer-to-peer communication with device 2630 (e.g., because the two devices are too far or they do not have the same type of short-range transceivers). In addition, none of the devices 2610-2630 have established peer-to-peer communication with device 2605 (e.g., because the device 2605 has disabled peer-to-peer communication with other device, is too far the other device or does do not include a short-range transceiver compatible with other devices). The devices in FIG. 26, can share map information such as a current map view, a map with all details, a pin, a point of interest, a single route, several routes, search results, etc., with each other as described by reference to FIGS. 1A-3, above.

FIG. 27 conceptually illustrates the client side diagram of a device for sharing map information with other device in some embodiments of the invention. As shown, the device 4105 includes a mapping application 4110, a notification center module 4115, a peer-to-peer communication module 4125, and a user interface 4120.

The peer-to-peer communication module establishes a short-range peer-to-peer communication channel with other nearby devices. The map information that is received through the peer-to-peer communication channel is sent to notification center 4115. The notification center displays a notification (such as notification 210 shown in FIG. 2) when map information to share has arrived. When sharing is accepted (e.g., when accept button 250 in FIG. 2 is selected through the user interface 4120), the mapping application 4110 displays the shared map information as shown in the embodiments described above.

Similarly, when there is map information to share (e.g., the location 1320 in FIG. 13), the mapping application 4110 sends the information to the notification center 4120. The notification center sends the information to the receiving device through the communication channel established by the peer-to-peer communication module 4125.

III. Location-Based Application Recommendations

Some embodiments provide applications based on a location of a device. In these embodiments when location services are enabled and the device is capable of determining its location, different popular applications are recommended based on the current location of the device.

FIG. 28 conceptually illustrates a user interface for recommending, applications based on the current location of a device in some embodiments of the invention. The figure is described in four stages 2801-2804. In stage 2801 an application launcher 2805 is running in the foreground. As shown, several other application icons 2810-2815 are displayed on the device display screen by the application launcher. Each one of these applications can be selected and launched in the foreground. In stage 2801, one of the applications 2815 is selected in stage 2801. This application (referred to as application store or app store) provides different lists of applications to download. Different applications are offered to purchase for a fee or load for free by the application store.

In some embodiments the device receives the list of available applications from a set of remote servers (also referred to application store servers). The set of remote servers are a digital application distribution platform that provides the list of available applications to select and download into the electronic devices. The remote servers maintain a database of available applications and provide a list of applications to each device through a network based on, e.g., the device type, the device's past preferences, popularity of applications, price of applications, etc. The set of remote servers communicate with application store 2815, which is a client side application. Application store 2815 sends a location of interest such as the current location of the device, a selected point on a displayed map, a destination of a route displayed on the map, etc., to the set of remote servers and receive application recommendations relevant to the location of interest from the set of servers. In the following discussions, application 2805 (which is the client side application residing on the device) is referred to as the application store and the application store servers (which include server side applications) are referred to as the set of remote servers providing application recommendations for simplicity.

In stage 2801, application 2815 is activated in the foreground. As shown, several selection buttons 2825-2845 are shown on the display screen. In some embodiments, the button that is currently active is highlighted. In this stage the featured button 2825 is active. Several featured applications 2820 are currently displayed on the display screen.

In stage 2803 selection button 2835 (referred to as "near me") is selected. Selection of this button results in getting application recommendations based on the current location of the device. As shown in stage 2804, several applications 2850-2860 are displayed on the screen based on a set of criteria that include the location of the device.

Some embodiments tag applications with location data when they are used. Aggregated application usage data are analyzed to determine applications that are particularly relevant to a given location (i.e., exhibiting a high degree of localization). Analysis in some embodiments include determining the application usage intensity relative to other locations, whether hotspots exist or not at a given location, the spatial entropy of a particular application, the device population in a particular area, etc. Based on the localized application analysis, applications are ranked according to local relevance, and application recommendations are provided by the set of remote servers to a user based on the ranking. A more detailed description of identifying applications that exhibit localization characteristics and ranking application based on usage data is described in U.S. patent application Ser. No. 13/842,724, entitled "App Recommendation Using Crowd-Sourced Localized App Usage Data," filed on Mar. 15, 2013, now published as U.S. Patent Publication 2013/0325856. This application is incorporated herein by reference.

Some embodiments identify a point of interest such as the current location of the device or a location selected on a displayed map to query a localized application-ranking database with application hotspot and application data ranking/scoring information with location data representing the location of interest. The database is external to the device and includes anonymized crowd-sourced localized application usage data. A more detailed description of providing application recommendations based on mining anonymized crowd-sourced localized application usage data is described in U.S. patent application Ser. No. 13/843,291, entitled "Mobile Device with Localized App Recommendations," filed on Mar. 15, 2013, now issued as U.S. Pat. No. 9,195,721. This application is incorporated herein by reference.

A. Activation of Location-Based Application Recommendations

FIG. 29 conceptually illustrates a user interface for recommending applications based on the current location of a device when the device user authorizes sending the location of the device to a set of remote servers in some embodiments of the invention. The figure is described in three stages 2901-2903. The figure also shows three maps 2904-2906 that show the current location of the device in each stage. These maps are not displayed on the device and are included in the figure to describe how different applications are selected based on the location of the device.

In stage 2901, application store (i.e., application 2805 described by reference to FIG. 28, above) is active in the foreground and button 2905 is selected to get application recommendations based on the location of the device. As shown in the corresponding map, the device is currently located (as shown by circle 2910 near two points of interest 2915 and 2920.

Getting recommendations based on the location of the device requires application store 2805 to gain access to the current location of the device. Some embodiments provide several levels of privacy protections for sharing the location of the device with an application running on the device or running on remote servers. The user is provided with an option to enable or disable location services (e.g., live location tracking and reporting) on the device. Enabling location services allows information from cellular, Wi-Fi, and Global Positioning System (GPS) networks to be used to determine the approximate location of the device.

In addition, some embodiments require each individual application running on a device or running on any remote servers to get authorization for accessing the location of the device. For instance, the operating system or the location services does not provide the location of the device to a requesting application until the user authorizes sharing the location with the particular application.

In the example of FIG. 29, location sharing is enabled on the device but the user is requesting to get location-based application recommendations from the application store 2805 for the first time. In stage 2902 an activation button 2925 with a message 2930 that warns the user that getting recommendations for popular applications near the current location of the device requires sending the current location to the set of remote servers. The activation button 2925 is selected in stage 2902 to authorize using the location of the device by the application store. In stage 2903 several applications 2935-2940 based on the current location of the device (e.g., applications relevant to points of interests 2915-2920) are displayed on the screen.

In some embodiments activation is required only once per application (e.g., the first time that the recommendations are used). In these embodiments, the user is provided an option (not shown) to disable location sharing with individual applications through system settings. As long as the authorization for accessing the device location is not revoked, button 2945 can be used each time a user wants to get location-based application recommendations.

In the example of FIG. 29, the location services were already enabled. In some embodiments, if the location services were not enabled when button 2905 is selected (regardless of a prior authorization for the application store to access the device location), the user is first prompted to enable location services (e.g., to select a button to be directed to system level settings to enable location services). Location-based application recommendations are not provided by application store until the user enables location services and the application store is authorized either previously or as described by reference to FIG. 29 to access the device location.

Some embodiments recommend applications that are relevant when the device is within a threshold distance (e.g., 50 meters, 100 meters, 1000 meters, etc.) of a particular location. For instance, an application related to coffee shops is recommended only to devices that are within a predetermined distance of a coffee shop.

In FIG. 29, this threshold distance is conceptually shown as a dashed circle 2950 around the current location 2910 of the device. In this example, point of interest 2915 is a college and point of interest 2920 is a restaurant. Both points of interest are within the predetermined distance from the current location of the device (as shown by the dashed circle 2950). The recommended application 2935 is an application that shows the daily specials for the restaurant 2920. Application 2940 shows information about different extra curriculum programs provided by the college 2915.

B. Visually Identifying More Popular Applications

Some embodiments visually rank the recommended applications based on the applications popularity. FIG. 30 conceptually illustrates a user interface for visually identifying location-based application recommendations based on the applications popularity in some embodiments of the invention. The figure is described in two stages 3001-3002.

In stage 3001 the button labeled "near me" 3005 is selected to receive popular application recommendations based on the location of the device. In stage 3002 three popular applications 30101-3015 are recommended based on the location of the device.

As shown, the two more popular applications 3010-3015 are visually identified displayed with a different color than the less popular application 3020). In this example, the two more popular applications 3010-3015 are the applications that have received better reviews from the users.

In some embodiments, the applications are prioritized (e.g., by the set of remote servers) based on different criteria such as the total number of the users that have used the application at the vicinity of the current location of the device, the total number of the users that have used the application at the vicinity of the current location of the device, total number of downloads, the number of favorable reviews, the rating of the application, user reviews, relevancy to points of interest and other locations near the current location of the device, etc.

Some embodiments allow applications related to a point of interest or to a location such as a business, a public place, an institution, a government office, a building, etc., to be registered with the set of servers that provide location-based recommendations displayed by the mapping and navigation application. Some embodiments consider applications that are registered by a nearby location as more relevant than other applications. For instance, when the device is close to a particular coffee shop, an application that is registered by that coffee shop get for priority than an application that provides fun facts about coffees. Both applications are relevant to the current location of the device, but the application that is registered by the nearby location gets higher priority.

C. Dynamically Providing Application Recommendations Based on Current Location of the Device Some embodiments provide different application recommendations as the location of a device changes. Some embodiments recommend applications that are relevant when the device is within a threshold distance of a particular location. Some embodiments also require the location of the device to be determined with a predetermined accuracy in order to provide recommendations.

FIG. 31 conceptually illustrates a user interface that requires the location of a device with a predetermined accuracy in order to provide application recommendations based on the location of the device. The figure is described in two stages 3101-3102. The figure includes two maps 3103-2904 that show the current location of the device in each stage. These maps are not displayed on the device and are included in the figure to describe how different applications are selected based on the location of a device.

Some embodiments recommend applications that e relevant when the device is within a threshold distance of a particular location. In FIG. 31, this threshold distance is conceptually shown as a dashed circle 3120 (with a radius of R) around the current location 3110 of the device. In other words, application recommendations are provided only for locations that are within a predetermined radius (e.g., 200 meters) of the estimated location of the device.

Also, some embodiments require the location of the device to be known with a predetermined accuracy 50 meters) order to provide recommendations. The device periodically estimates the current location of the device with a certain accuracy. The application store accesses the current location information and sends the device location and the associated accuracy to the set of remote servers that provide application recommendations based on location. As described above by reference to FIG. 29, the user is provided with the option to enable or disable location services on the device as well as the option to enable and disable location sharing with individual applications.

Enabling of location services allows information from cellular, Wi-Fi, and GPS networks to be used to determine the approximate location of the device. Each of these methods has an associated accuracy. For instance, when the device is within a clear line of sight of GPS satellites, the device uses GPS information received from the satellites to determine the device location. When the device has GPS connectivity, the location can be estimated with a few meters accuracy (e.g., 7-15 meters) depending on the atmospheric effects and receiver quality. When there is no clear line of sight of GPS satellites or he device does not include a GPS receiver, the device uses other methods such as crowd-sourced Wi-Fi (e.g., using a database indicating the location of nearby Wi-Fi hotspots) or cellular tower locations to estimate the location of the device. Using cellular tower locations provides a lower accuracy (e.g., in the range or 100's or 1000's of meters) depending on the distance and the number of nearby cellular towers. The accuracy of location determination using the crowd-sourced Wi-Fi hotspots also depends on the distance and the number of nearby hotspots.

In the example of FIG. 31, the recommendations are provided only when the location of the device is determined within a predetermined accuracy (or within a predetermined threshold radius, e.g., 50 meters, 100 meters, etc.). For instance, when the remote servers that provide application recommendations receive the location of the device from the application store, the servers do not provide any location-based application recommendations when the device location is not determined with the required accuracy. In FIG. 31, the estimated location of the device is shown as a circle 3110 and the accuracy of the estimated location is conceptually shown by circles 3125 and 3130 illustrated on maps 3103 and 3104, respectively.

In stage 3101, the device location is determined with an accuracy that is conceptually shown on map 3103 as the circle 3125 with radius r. When this actual accuracy, r, is within the required accuracy for providing the recommendations, the device receives application recommendations based on the current location of the device. In some embodiments, the required accuracy for the location of the device is related to the radius, R, within which location-based recommendations are provided (e.g., the required accuracy is the same, a percentage more, or a percentage less than R). In other embodiments, the two values are independent of each other.

In this example, the device location in stage 3101 is determined within the required accuracy. As shown, several popular applications 3110-3115 are recommended based on the location of the device. On the other hand, the device location in stage 3102 can only be determined within a radius 3130, which in this example is more than the required accuracy threshold for providing recommendations. In this stage, although there are several points of interest 3140 nearby that have corresponding applications, no applications are recommended due to uncertainty of the device location.

FIGS. 32A-32B conceptually illustrate a user interface that provides application recommendations based on the location of a device in some embodiments of the invention. The device is for instance a mobile device such as smartphone, tablet, laptop, etc. The figure is described in five stages 3201-3205. The figure also shows five maps 3206-3210 that show the current location of the device in each stage. These maps are not displayed on the device and are included in the figure to describe how different applications are selected based on the location of a device.

In stage 3201 application store 3250 is active on the foreground. The featured button 3290 was previously selected (as shown by the highlighted button 3290) and several featured applications 3295 are displayed on the device display screen. The button 3225 labeled "near me" is not highlighted. In this stage, there are two points of interest 3212 and 3215 shown on the map 3206 with corresponding popular applications. However, the two points of interest in stage 3201 are far from the current estimated location 3270 of the device and are outside the range (as shown by the dashed circle 3220) of locations for which location-based application recommendations are provided.

In stage 3202 the device has moved closer to point of interest 3215 and the point of interest 3215 is within the range 3220 of locations for which the device receives location-based application recommendations (as shown by the circle 3220 intersecting the point of interest 3215 on the map 3207). The "near me" button 3225 is badged (e.g., with a circle 3230), to show the number of popular applications that have become available based on the location of the device.

In this example, the number shown in the circle 3230 indicates that two popular applications have become available. In some embodiments, this number shows the total number of applications that are available for the current location of the device. In other embodiments, the number indicates only the number of applications that meet a certain criteria for popularity (e.g., applications that are registered to the particular point of interest 3215, application that have been used by more than a certain number of users at this location, applications that have a certain number of favorable reviews, etc.). In some embodiments, the visual appearance of button 3225 is also changed (e.g., is shown in a different color, blinks, etc.) to get the user's attention.

In some embodiments, the application store receives the location-based application recommendations from the set of remote servers in the background and updates the badge 3230 and the visual appearance of the button 3225. If the device moves to a location where there are no applications related to any location within the required range 3220, badge 3230 is removed and the visual appearance of button 3225 is changed to indicate that no recommendations are currently available.

In stage 3202 the button 3225 is selected to show the recommended applications. In stage 3203 the device is still close to the point of interest 3215 (as shown by the circle 3220 on map 3208) and the recommended applications 3235-3240 are displayed on the screen. Each application 3235-3240 can be installed in the device by selecting the corresponding install buttons 3280-3285.

In stage 3204, the device has moved shown on the map 3209) to a location where point of interest 3215 is still in the range 3220 of locations for which location-based application recommendations are provided. In addition, another point of interest 3255 is also within the range 3220. As shown in this stage, a third application 3245 that is related to the point of interest 3255 is added to list of recommended applications.

In stage 3205, the device has moved (as shown on the map 3209) to a location where no point of interest is within the range 3220. As shown, the button 3225 is still highlighted but no location-based applications are recommended.

D. Providing Application Recommendations Based on a Selected Location oar the Map Some embodiments provide recommendations for popular applications based on selected points on a map displayed on a device. FIG. 33 conceptually illustrates a user interface that provides application recommendations based on the location of a selected point on the map in some embodiments of the invention. The figure is described in six stages 3301-3306.

In stage 3301, application launcher 3305 is active in the foreground. As shown, the mapping and navigation application 3310 is selected. In stage 3302, the mapping and navigation application is activated in the foreground and a map 3315 is displayed on the display screen of the device. In this stage the search field 3320 is selected.

In stage 3303 the user has entered a search string (the string. "Fran" in this example) in the search field. Several locations 3325-3335 based on the search string are displayed. In this stage one of the displayed locations 3330 is selected.

In stage 3304 a map 3340 is displayed and the selected location is identified (e.g., with a pin 3355). As shown, a banner 3345 is displayed for the selected location. As shown, the user has selected the button 3350 to get additional information about the location. Although the example of FIG. 33 is described for a search result as a location of interest, in other embodiments the location of interest can be other points such as a selected point on the map, a destination of a route, etc.

In stage 3305, additional information (e.g., in the form of an information card) for the selected location is displayed on the screen. As shown, the information includes recommendations for several popular applications related to the selected location. In this example, the popular applications include an application 3360 for other local bars near the selected location, a taxi service 3365 operating in the area, and an application 3370 for a 24-hour store near the selected location. As shown, the user can scroll the list of the popular applications (as conceptually shown by the finger 3375 scrolling the list).

In some embodiments, a set of remote servers provides the recommendations to application store (such as application store 3250 shown in FIGS. 32A-32B) and the mapping and navigation application receives the recommendations from the application store. In other embodiments, the set of servers provide the recommendations directly to the mapping and navigation application 3305.

In stage 3306 the list of popular applications is scrolled and several more recommended applications 3380 are shown. In some embodiments, the applications are prioritized (e.g., by the set of remote servers) based on different criteria such as the total number of the users that have used the application at the selected location, the total number of the users that have used the application at a location similar to the selected location on the map (e.g., close to any coffee shop when the device is also close to a coffee shop), total number of downloads, the number of favorable reviews, the rating of the application, user reviews, relevancy to the selected location, etc.

Some embodiments allow applications related to a point of interest or to a location such as a business, a public place, an institution, a government office, a building, etc., to be registered with the set of servers that provide location-based recommendations displayed by the mapping and navigation application. Some embodiments consider applications that are registered by a particular location as more relevant than other applications when the particular location is selected on the map. Some embodiments visually identify these applications (e.g., displayed with a different color, different framing, tagged as an official application for the selected location, etc.).

FIG. 34 conceptually illustrates a user interface that provides application recommendations based on the location of a selected point of interest that has registered an application with the mapping application in some embodiments of the invention. The figure is described in four stages 3401-3404. In stage 3401 a map 3405 is displayed on the display screen of the device. Several points of interest 3410-3415 are displayed on the map. In stage 3402 a point of interest 3415 is selected. Although the example of FIG. 33 is described for a selected point as a location of interest, in other embodiments the location of interest can be other points such as a search result, a destination of a route, etc.

In stage 3403 a banner 3420 for the selected point of interest is displayed. As shown, the information button 3425 on the banner is selected to display additional information about the selected point of interest. In stage 3404, additional information (e.g., in the form of an information card) for the selected point of interest is displayed on the screen. As shown, the information card includes several recommended popular applications 3430-3440. In this example, the selected point of interest is a business that has registered an application with the mapping application. This application 3430 is displayed before any other recommended application as the most relevant application to the selected point of interest. In some embodiments, the application is badged or visually identified (e.g., with a different color, with a more prominent framing, etc.) as an official application for the selected location.

FIG. 35 conceptually illustrates a process 3500 for providing recommendations for popular applications based on the current location of a device or the location of a selected point on a map in some embodiments of the invention. The process is, for instance, performed by the set of remote servers that provide location-based application recommendations. As shown, the process determines (at 3505) whether location data for a location of interest is known within a predetermined accuracy. For instance, as described above by reference to FIG. 31, a device location is estimated with a certain accuracy. When the location of interest is the current location of the device, process 3500 checks to determine the location is estimated with the required accuracy. On the other hand, when the location of interest is a location on a map such as a selected point of interest, a selected location on the map, a search result, a route destination, etc., (e.g., as described above by reference to FIGS. 32-33), the location used by the mapping and navigation application to display the location of interest on the map is sent to the set of remote servers. This location, in some embodiments is always considered accurate enough to enable location reporting from the remote set of servers.

If location data is not known within predetermined accuracy, the process proceeds to 3535, which is described below. Otherwise, the process identifies (at 3510) popular applications that are relevant to the current location of the device. The process then identifies (at 3515) applications that are registered by the nearby locations (e.g., nearby businesses or points of interest). The process then determines (at 3520) whether any new applications are found. If not, the process proceeds to 3535, which is described below. Otherwise, the process prioritizes 3525) applications for the nearby locations.

Different embodiments use different criteria for prioritizing the recommended applications. For instance, in some embodiments applications that are registered by a location get higher priority (e.g., are shown as a first recommend application or among the top recommended applications, etc.) when at device is at or nearby the location. In some embodiments, applications get higher priorities based on the user reviews. In some embodiments applications get higher priorities based on their relevancy to the nearby locations. In some embodiments, applications are prioritized based on the speed of the device (e.g., as described by reference to FIG. 39, below). In some embodiments, the applications are prioritized based on the determination that the user is a local resident or a traveler (e.g., as described by reference to FIG. 38, below).

Some embodiments also use other criteria such as the popularity of the applications determined by one or more of the total number of the users that have used the application at the current location of the device, the total number of the users that have used the application at a location similar to the current location of the device (e.g., close to any coffee shop when the device is also close to a coffee shop), total number of downloads, the number of favorable reviews, the rating of the application, user reviews, etc.

The process then sets (at 3530) notifications and recommendations based on the priorities of the applications. For instance, the process provides a list of some of all applications that are relevant to the current location of the device along with the corresponding priorities, etc., to the device. The process then sets (at 3535) a timer. The process then determines (at 3540) whether the timer is expired. If not the process returns to 3540. Otherwise, the process proceeds to 3505 to determine whether any new applications can be found.

Process 3500 is described as using a timer to periodically check whether location data is known within a predetermined accuracy. However, the process in some embodiments is activated whenever a location estimate is received from a device. For instance, the application store sends the location of the device and the associated accuracy to the set of remote servers every 5 seconds. In these embodiments, operations 3503 and 3535-3540 are not performed. Instead, when location is not received with the predetermined accuracy or no new applications are identified, the process ends and is reactivated with another location estimate is received from the device.

FIG. 36 conceptually illustrates a process 3600 for providing recommendations for popular applications based on the current location of a device in some embodiments of the invention. The process is, for instance, performed by the application store (or app store) application running on the device. As shown, the process determines (at 3605) whether location services and location sharing with the remote servers that provide location-based application recommendation enabled (e.g., as described by reference to FIG. 29 above). If not, the process proceeds to 3635, which is described below. Otherwise, the process sends (at 3610) the estimated location of the device and the associated accuracy to the set of remote servers.

The process then receives (at 3615) application recommendations based on the current location of the device, applications registered for nearby locations, and the associated priorities for the remote servers. The process then determines (at 3620) whether any new applications are found. If not, the process proceeds to 3635, which is described below.

Otherwise, the process updates (at 3625) the list of location-based application recommendations. The process then sets (at 3630) the appropriate recommendations. For instance, if a request to provide the list of nearby application is already received (e.g., button 3225 in FIGS. 32A-32B is already selected), the list is dynamically updated. On the other hand, if application store is active in the foreground but the list of nearby application was not displayed (e.g., as shown in stage 3202 in FIGS. 32A-32B) other notification such changing the button 3226 highlight, displaying the badge 3230, or other types of alerts are used to notify the user of a change in the nearby application recommendations. Also, if the application store was not active in the foreground, process 3600 updates the list and displays the list whenever requested by the user.

The process then sets (at 3635) a timer. The process then determines (at 3640) whether the timer is expired. If not the process returns to 3640. Otherwise, the process proceeds to 3605 to determine whether any new applications can be found.

FIG. 37 conceptually illustrates a process 3700 for providing recommendations for popular applications based on a location of interest on a map in some embodiments of the invention. The process is, for instance, performed by the application store (or app store) application running on the device. As shown, the process sends (at 3705) the location data for the location of interest to the set of remote servers. The location of interest can be a selected point of interest, a selected location on a displayed map, a search result, a route destination, etc.

The process then receives (at 3710) application recommendations based on the location data for the location of interest, applications registered by the selected locations, and the associated priorities for the remote servers. In some embodiments, the process also receives applications registered by nearby locations (e.g., with lower priorities than an application registered by the selected location on the map). The process then determines (at 3715) whether any new applications are found. If not, the process proceeds to 3730, which is described below.

Otherwise, the process updates (at 3720) the list of location-based application recommendations. The process then sets (at 3725) the appropriate recommendations (e.g., as described by reference to FIGS. 33-34 above). The process then sets (at 3730) a timer. The process then determines (at 3735) whether the timer is expired. If not the process returns to 3735. Otherwise, the process proceeds to 3705 to determine whether any new applications can be found.

E. Recommending Different Applications for Nearby Devices based on the Registered Address of the Devices Some embodiments provide different recommendations for a device that is away from the user's home region and a nearby device with a local home region. In some embodiments, the application store has different storefronts for different regions. For instance, in the U.S., the storefront is in English and accepts American credit cards. In contrast, in France the storefront is in French and accepts European credit cards. In some embodiments, the home region for a device is determined by the billing address used for the device. Other embodiments use other criteria such as device settings, user's home address, etc., to determine the home region of a device.

FIG. 38 conceptually illustrates an example of providing different application recommendations based on the home region as well as the current physical location of a device in some embodiments of the invention. In this example, device 3805 is away from its home region (e.g., the device 3805 is in Paris but the device's billing address is in the U.S.). On the other hand, device 3810 is in the device local region (e.g., the device 3810 has a Paris billing address).

As shown in FIG. 38, although the two devices 3805-3810 are in close proximity of each other, each device has received a different set of recommended applications. For instance, device 3805 has received recommendations for applications 3815-3825, which are applicable to travelers and tourists coming from the home region of U.S. to the current location of the device in Paris (e.g., an application 3815 for a translator, an application 3820 for the Eiffel Tower fun facts, and an application 3825 for a Champ de Mars guide). These applications are recommended based on the home region and the current location of device 3805. The applications are, e.g., useful for a U.S. traveler in Paris near the Eiffel Tower.

On the other hand, device 3810 has received recommendations that are appropriate for local residents (such as an application 3830 related to a local French language newspaper, an application 3835 related to a local bar, and an application 3840 for a grocery used by locals). These applications are recommended based on the home region and the current location of device 3810. The applications are, e.g., useful for a local resident of Paris near the Eiffel Tower. The two devices, therefore, get application recommendations based on their home region (or storefront) as well as their current physical location.

F. Recommending Different Applications based on the Location and the Movement of the Device Some embodiments determine the moving speed of device and based on the moving speed and the current location of the device to determine whether the device is inside or outside a moving vehicle such as a train, a bus, or a vehicle. For instance, when the location and the speed of the device indicates that the device is moving faster than a certain speed along a set of railroad tracks, some embodiments determine that the device is inside a moving train.

Different embodiments determine the speed differently. Some embodiments compute the speed by identifying the change in the current position in distance and dividing it by the time interval between the identified current positions used for identifying the distance. Alternatively or conjunctively, some embodiments receive the speed from a speedometer of a vehicle that the user is driving if the device is communicatively connected (e.g., via the Bluetooth®) to the vehicle. Some embodiments provide different application recommendations depending both on the location of the device and whether the device is inside or outside of a vehicle. Some embodiments utilize an application or a framework in the device to determine whether the device is m motion and how fast the device is travelling.

FIG. 39 conceptually illustrates recommending different applications based on the current location as well as the travelling speed of a device in some embodiments of the invention. The figure is described in two stages 3901-3902. In stage 3901, the device 3950 is outside of a metro bus 3905.

Based on the location of the device, it is determined that the device is near a metro station. In addition, the speed of the device indicates that the device is either stationary or the device is moving at walking speeds. In this stage, the recommended applications are popular applications that are applicable to people outside of a metro bus. For instance, the applications include an application 3910 that provides metro schedule and an application 3915 for a pizza place in the metro station.

In stage 3902, the device is inside a metro bus. The seed and the location of the device indicate that the device is travelling inside a metro bus. The recommended popular applications in this stage are an application for teaching how to prevent motion sickness 3920 and a travel itinerary application 3925. The applications 3910-3925 are recommended not only based on the current location of the device but also based on the travelling speed of the device. The recommendations are based on making a determination that the device at the current location and travelling at the current speed is inside a moving metro bus.

G. Architecture

FIG. 40 conceptually illustrates a system for providing application recommendations to a device based on a location of interest. The location of interest can be the current location of the device or a location selected on a map displayed on the device such as a point of interest or the destination in the mapping and navigation application.

As shown, the system in includes several devices 4005 that receive application recommendation based on a location of interest, a set of application store servers 4010, a localized application recommendation system 4015, and a set of crowd-sourcing devices 4020. Devices 4005 include an application store client (e.g., application store 2815 described by reference to FIG. 28, above). Devices 4005 also include a mapping and navigation application (e.g., application 3310 described by reference to FIG. 33, above).

Application store client communicates with a set of application store servers 4010 (e.g., the set of remote servers described by reference to FIG. 28, above) to send a location of interest and to receive application recommendations including application recommendations based on the location of interest. As shown, a set of devices 4020 are participating in providing crowd-sourced location data. Crowd-sourced location data can be anonymously crowd-sourced from the devices 4020. Devices may opt-in for this feature. Devices 4020 tag location data to application usage. The devices determine the current location associated with the application event (e.g., launching the application) and tag the application event with the determined location. In some embodiments, location data for application usage and, optionally, time data may be anonymized on the device-side and submitted to the localized application recommendation system 4015 for further processing.

The localized application recommendation system 4015 ranks the data received from the crowd-sourcing devices 4020 and stores the data in a localized application-ranking database 4035. The localized application recommendation system 4015 provides application recommendations based on a location of interest to the application store servers 4010. The application store servers 4010 in turn provide the recommendations to the devices 4005. In some embodiments application recommendations are pre-chased to the mobile, e.g., from the localized application recommendation system 4015 to the device 4005.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

The mapping and navigation applications of some embodiments operate on mobile devices, such as smart phones (e.g., iPhones®) and tablets (e.g., iPads®). FIG. 41 is an example of an architecture 4100 of such a mobile computing device. Examples of mobile computing devices include smartphones, tablets, laptops, etc. As shown, the mobile computing device 4100 includes one or more processing units 4105, a memory interface 4110 and a peripherals interface 4115.

The peripherals interface 4115 is coupled to various sensors and subsystems, including a camera subsystem 4120, a wireless communication subsystem(s) 4125, an audio subsystem 4130, an I/O subsystem 4135, etc. The peripherals interface 4115 enables communication between the processing units 4105 and various peripherals. For example, an orientation sensor 4145 (e.g., a gyroscope) and an acceleration sensor 4150 (e.g., an accelerometer) is coupled to the peripherals interface 4115 to facilitate orientation and acceleration functions.

The camera subsystem 4120 is coupled to one or more optical sensors 4141 (e.g., a charged coupled device (CCD) optical sensor, a complementary metal-oxide-semiconductor (CMOS) optical sensor, etc.). The camera subsystem 4120 coupled with the optical sensors 4141 facilitates camera functions, such as image and/or video data capturing. The wireless communication subsystem 4125 serves to facilitate communication functions. In some embodiments, the wireless communication subsystem 4125 includes radio frequency receivers and transmitters, and optical receivers and transmitters (not shown in FIG. 41). These receivers and transmitters of some embodiments are implemented to operate over one or more communication networks such as a GSM network, a Wi-Fi network, a Bluetooth® network, etc. The audio subsystem 4130 is coupled to a speaker to output audio (e.g., to output voice navigation instructions). Additionally, the audio subsystem 4130 is coupled to a microphone to facilitate voice-enabled functions, such as voice recognition for searching), digital recording, etc.

The I/O subsystem 4135 involves the transfer between input/output peripheral devices, such as a display, a touch screen, etc., and the data bus of the processing units 4105 through the peripherals interface 4115. The I/O subsystem 4135 includes a touch-screen controller 4155 and other input controllers 4160 to facilitate the transfer between input/output peripheral devices and the data bus of the processing units 4105. As shown, the touch-screen controller 4155 is coupled to a touch screen 4165. The touch-screen controller 4155 detects contact and movement on the touch screen 4165 using any of multiple touch sensitivity technologies. The other input controllers 4160 are coupled to other input/control devices, such as one or more buttons. Some embodiments include a near-touch sensitive screen and a corresponding controller that can detect near-touch interactions instead of or in addition to touch interactions.

The memory interface 4110 is coupled to memory 4170. In some embodiments, the memory 4170 includes volatile memory (e.g., high-speed random access memory), non-volatile memory (e.g., flash memory), a combination of volatile and non-volatile memory, and/or any other type of memory. As illustrated in FIG. 41, the memory 4170 stores an operating system (OS) 4172. The OS 4172 includes instructions for handling basic system services and for performing hardware dependent tasks.

The memory 4170 also includes communication instructions 4174 to facilitate communicating with one or more additional devices; graphical user interface instructions 4176 to facilitate graphic user interface processing; image processing instructions 4178 to facilitate image-related processing and functions; input processing instructions 4180 to facilitate input-related (e.g., touch input) processes and functions; audio processing instructions 4182 to facilitate audio-related processes and functions and camera instructions 4184 to facilitate camera-related processes and functions. The instructions described above are merely exemplary and the memory 4170 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 41 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 41 may be split into two or more integrated circuits.

B. Computer System

FIG. 42 conceptually illustrates another example of an electronic system 4200 with which some embodiments of the invention are implemented. The electronic system 4200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4200 includes a bus 4205, processing unit(s) 4210, a graphics processing unit (GPU) 4215, a system memory 4220, a network 4225, a read-only memory 4230, a permanent storage device 4235, input devices 4240, and output devices 4245.

The bus 4205 collectively represents all system, peripheral, and chipset buses that communicatively connect the numerous internal devices of the electronic system 4200. For instance, the bus 4205 communicatively connects the processing unit(s) 4210 with the read-only memory 4230, the GPU 4215, the system memory 4220, and the permanent storage device 4235.

From these various memory units, the processing unit(s) 4210 retrieves instructions to execute and data to process in order to execute the processes of the invention. The processing unit(s) may be a single processor or a multi-core processor in different embodiments. Some instructions are passed to and executed by the GPU 4215. The GPU 4215 can offload various computations or complement the image processing provided by the processing unit(s) 4210.

The read-only-memory (ROM) 4230 stores static data and instructions that are needed by the processing unit(s) 4210 and other modules of the electronic system. The permanent storage device 4235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive, integrated flash memory) as the permanent storage device 4235.

Other embodiments use a removable storage device (such as a floppy disk, flash memory device, etc., and its corresponding drive) as the permanent storage device. Like the permanent storage device 4235, the system memory 4220 is a read-and-write memory device. However, unlike storage device 4235, the system memory 4220 is a volatile read-and-write memory, such a random access memory. The system memory 4220 stores some of the instructions and data that the processor needs at runtime. In some embodiments, the invention's processes are stored in the system memory 4220, the permanent storage device 4235, and/or the read-only memory 4230. For example, the various memory units include instructions for processing multimedia clips in accordance with some embodiments. From these various memory units, the processing unit(s) 4210 retrieves instructions to execute and data to process in order to execute the processes of some embodiments.

The bus 4205 also connects to the input and output devices 4240 and 4245. The input devices 4240 enable the user to communicate information and select commands to the electronic system. The input devices 4240 include alphanumeric keyboards and pointing devices (also called "cursor control devices"), cameras (e.g., webcams), microphones or similar devices for receiving voice commands, etc. The output devices 4245 display images generated by the electronic system or otherwise output data. The output devices 4245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 42, bus 4205 also couples electronic system 4200 to a network 4225 through a network adapter (not shown). In this manner, the computer can be a part of a network of computers such as a local area network ("LAN"), a wide area network ("WAN"), or an Intranet), or a network of networks, such as the Internet. Any or all components of electronic system 4200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Various embodiments may operate within a map service operating environment. FIG. 43 conceptually illustrates a map service operating environment, according to some embodiments. A map service 4330 (also referred to as mapping service) may provide map services for one or more client devices 4302a-4302c in communication with the map service 4330 through various communication methods and protocols. A map service 4330 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 4302a-4302c may utilize these map services by obtaining map service data. Client devices 4302a-4302c may implement various techniques to process map service data. Client devices 4302a-4302c may then provide map services to various entities, including, but not limited to, users, internal software or hardware modules, and/or other systems or devices external to the client devices 4302a-4302c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.). Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RFLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 4302*a*-4302*c*) are implemented on different portable-multifunction device types. Client devices 4302*a*-4302*c* utilize map service 4330 through various communication methods and protocols. In some embodiments, client devices 4302*a*-4302*c* obtain map service data from map service 4330. Client devices 4302*a*-4302*c* request or receive map service data. Client devices 4302*a*-4302*c* then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing, input to manipulate a virtual camera in the map, changing the map display according to the virtual camera's position, orientation, and field-of-view. Various forms and input devices are implemented to manipulate a virtual camera. In some embodiments, touch input, through certain single or combination gestures touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive UPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 43 illustrates one possible embodiment of an operating environment 4300 for a map service 4330 and client devices 4302a-4302c. In some embodiments, devices 4302a, 4302b, and 4302c communicate over one or more wire or wireless networks 4310. For example, wireless network 4310, such as a cellular network, can communicate with a wide area network (WAN) 4320, such as the Internet, by use of gateway 4314. A gateway 4314 in some embodiments provides a packet oriented mobile data service, such as General Packet Radio Service (CPRS), or other mobile data service allowing wireless networks to transmit data to other networks, such as wide area network 4320. Likewise, access device 4312 (e.g., IEEE 802.11g wireless access device) provides communication access to WAN 4320. Devices 4302a and 4302b can be any portable electronic or computing device capable of communicating with a map service. Device 4302c can be any non-portable electronic or computing device capable of communicating with a map service.

In some embodiments, both voice and data communications are established over wireless network 4310 and access device 4312. For instance, device 4302a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 4310, gateway 4314, and WAN 4320 (e.g., using Transmission Control Protocol/Internet Protocol (TCP/IP) or User Datagram Protocol (UDP)). Likewise, in some implementations, devices 4302b and 4302c can place and receive phone calls, send and receive e-mail messages, and retrieve electronic documents over access device 4312 and WAN 4320. In various embodiments, any of the illustrated client devices may communicate with map service 4330 and/or other service(s) 4350 using a persistent connection established in accordance with one or more security protocols, such as the Secure Sockets Layer (SSL) protocol or the Transport Layer Security (TLS) protocol.

Devices 4302a and 4302b can also establish communications by other means. For example, wireless device 4302a can communicate with other wireless devices (e.g., other devices 4302b, cell phones, etc.) over the wireless network 4310. Likewise devices 4302a and 4302b can establish peer-to-peer communications 4340 (e.g., a personal area network) by use of one or more communication subsystems, such as Bluetooth® communication from Bluetooth Special Interest Group, Inc. of Kirkland, Wash. Device 4302c can also establish peer to peer communications with devices 4302a or 4302b (not shown). Other communication protocols and topologies can also be implemented. Devices 4302a and 4302b may also receive Global Positioning Satellite (GPS) signals from GPS satellites 4360.

Devices 4302a, 4302b, and 4302c can communicate with map service 4330 over one or more wired and/or wireless networks, 4312 or 4310. For instance, map service 4330 can provide map service data to rendering devices 4302a, 4302b, and 4302c. Map service 4330 may also communicate with other services 4350 to obtain data to implement map services. Map service 4330 and other services 4350 may also receive GPS signals from GPS satellites 4360.

In various embodiments, map service 4330 and/or other service(s) 4350 are configured to process search requests from any of the client devices. Search requests may include but are not limited to queries for businesses, addresses, residential locations, points of interest, or some combination thereof. Map service 4330 and/or other service(s) 4350 may be configured to return results related to a variety of parameters including but not limited to a location entered into an address bar or other text entry field. (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 4330 and/or other service(s) 4350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device bookmarks or contacts), search results found elsewhere (e.g., from the Internet) by map service 4330 and/or other service(s) 4350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 4330 and/or other service(s) 4350 provide one or more feedback mechanisms to receive feedback from client devices 4302*a*-4302*c*. For instance, client devices may provide feedback on search results to map service 4330 and/or other service(s) 4350 (e.g., feedback specifying ratings, reviews, temporary or permanent business closures, errors etc.); this feedback may be used to update information about points of interest in order to provide more accurate or more up-to-date search results in the future. In some embodiments, map service 4330 and/or other services) 4350 may provide testing information to the client device (e.g., an A/B test) to determine which search results are best. For instance, at random intervals, the client device may receive and present two search results to a user and allow the user to indicate the best result. The client device may report the test results to map service 4330 and/or other service(s) 4350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps or swipe gestures). However, many of the illustrated operations could be performed via different touch gestures (e.g., double tap gesture, press and hold gesture, swipe instead of tap, etc.) or by non-touch input (e.g., using a cursor controller, a keyboard, a touchpad/trackpad, a near-touch sensitive screen, etc.). In addition, a number of the figures (including FIGS. 4A-4B, 16, and 35-37) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for sharing map data, the method implemented by an electronic device comprising a processor, memory device, and a display screen, the method comprising:

receiving, through a first touch input on the display screen, an input to share selected map data from a user;

in response to the first touch input, presenting a plurality of graphical elements for sharing the selected map data on the display screen, wherein the plurality of graphical elements includes a first graphical element that represents a particular communication method and a recipient of the shared map data;

receiving a second touch input on the first graphical element presented on the display screen, the second touch input being distinct from the first touch input; and responsive to the second touch input on the first graphical element:
transmitting the selected map data from the first electronic device to a second electronic device associated with the recipient using the particular communication method without additional user input,
while transmitting the selected map data to the second electronic device, causing the first graphical element to present an animation indicating that the transmission of the selected map data is in progress,
receiving, by the first electronic device from the second electronic device, an indication that the second electronic device has received the map data, and
terminating the animation in response to receiving the indication that the second electronic device has received the map data.

2. The method of claim 1, further comprising:
receiving a selection of a route from a starting location to a destination location;
receiving the second touch input on the first graphical element; and
in response to the second touch input, transmitting the map data for the route from the first electronic device to the second electronic device associated with the recipient.

3. The method of claim 1, further comprising:
receiving a selection of a point of interest;
receiving the second touch input on the first graphical element; and
in response to the second touch input, transmitting the map data for the point of interest from the first electronic device to the second electronic device associated with the recipient.

4. The method of claim 3, further comprising:
receiving the selection of the point of interest while the device is currently navigating a route, wherein the point of interest does not lie on the route;
in response to the selection, displaying a first map data sharing control and a second map data sharing control;
wherein when the first map data sharing control is selected, map data for the navigated route is transmitted to the second electronic device associated with the recipient, and
wherein when the second map data sharing control is selected, map data for the selected point of interest is transmitted to the second electronic device associated with the recipient.

5. The method of claim 1, further comprising:
receiving, by the electronic device, a search query comprising one or more input characters;
displaying a list of search results corresponding to the one or more input characters;
receiving a selection of a first search result from the list of search results;
displaying map data for the first search result on the display screen;

receiving the touch input on the first graphical element; and in response to the input, transmitting the map data corresponding to the first search result from the first electronic device to the second electronic device associated with the recipient.

6. The method of claim 1, wherein the particular communication method includes transmitting an electronic data message over a peer-to-peer network, a cellular network, and/or Wi-Fi network, and wherein the electronic message includes one or more of an email message, an SMS message, a Bluetooth data message, or a peer-to-peer connection message.

7. The method of claim 1, wherein the recipient corresponds to a contact of the user.

8. A non-transitory machine readable medium storing a program executed by at least one processing unit of an electronic device, the program comprising sets of instructions for:

receiving, through a first touch input on the display screen, an input to share selected map data from a user;

in response to the first touch input, presenting a plurality of graphical elements for sharing the selected map data on the display screen, wherein the plurality of graphical elements includes a first graphical element that represents a particular communication method and a recipient of the shared map data;

receiving a second touch input on the first graphical element presented on the display screen, the second touch input being distinct from the first touch input; and responsive to the second touch input on the first graphical element:

transmitting the selected map data from the first electronic device to a second electronic device associated with the recipient using the particular communication method without additional user input, while transmitting the selected map data to the second electronic device, causing the first graphical element to present an animation indicating that the transmission of the selected map data is in progress, receiving, by the first electronic device from the second electronic device, an indication that the second electronic device has received the map data, and terminating the animation in response to receiving the indication that the second electronic device has received the map data.

9. The non-transitory machine readable medium of claim 8, wherein the program further comprises sets of instructions for:

receiving a selection of a route from a starting location to a destination location;

receiving the second touch input on the first graphical element; and in response to the second touch input, transmitting the map data for the route from the first electronic device to the second electronic device associated with the recipient.

10. The non-transitory machine readable medium of claim 8, wherein the program further comprises sets of instructions for:

receiving a selection of a point of interest;

receiving the second touch input on the first graphical element; and in response to the second touch input, transmitting the map data for the point of interest from the first electronic device to the second electronic device associated with the recipient.

11. The non-transitory machine readable medium of claim 10, wherein the program further comprises sets of instructions for:

receiving the selection of the point of interest while the device is currently navigating a route, wherein the point of interest does not lie on the route;

in response to the selection, displaying a first map data sharing control and a second map data sharing control;

wherein when the first map data sharing control is selected, map data for the navigated route is transmitted to the second electronic device associated with the recipient, and wherein when the second map data sharing control is selected, map data for the selected point of interest is transmitted to the second electronic device associated with the recipient.

12. The non-transitory machine readable medium of claim 8, wherein the program further comprises sets of instructions for:

receiving, by the electronic device, a search query comprising one or more input characters;

displaying a list of search results corresponding to the one or more input characters;

receiving a selection of a first search result from the list of search results;

displaying map data for the first search result on the display screen;

receiving the touch input on the first graphical element; and in response to the input, transmitting the map data corresponding to the first search result from the first electronic device to the second electronic device associated with the recipient.

13. A electronic device comprising:

a set of processing units for executing sets of instructions;

a non-transitory machine readable medium storing a program executed by at least one processing unit of the set of processing units, the program comprising sets of instructions for:

receiving, through a first touch input on the display screen, an input to share selected map data from a user;

in response to the first touch input, presenting a plurality of graphical elements for sharing the selected map data on the display screen, wherein the plurality of graphical elements includes a first graphical element that represents a particular communication method and a recipient of the shared map data;

receiving a second touch input on the first graphical element presented on the display screen, the second touch input being distinct from the first touch input; and responsive to the second touch input on the first graphical element:

transmitting the selected map data from the first electronic device to the a second electronic device associated with recipient using the particular communication method without additional user input, while transmitting the selected map data to the second electronic device, causing the first graphical element to present an animation indicating that the transmission of the selected map data is in progress, receiving, by the first electronic device from the second electronic device, an indication that the second electronic device has received the map data, and terminating the animation in response to receiving the indication that the second electronic device has received the map data.

14. The electronic device of claim 13, wherein the program further comprises sets of instructions for:
receiving a selection of a route from a starting location to a destination location;
receiving the second touch input on the first graphical element; and
in response to the second touch input, transmitting the map data for the route from the first electronic device to the second electronic device associated with the recipient.

15. The electronic device of claim 13, wherein the program further comprises sets of instructions for:
receiving a selection of a point of interest;
receiving the second touch input on the first graphical element; and
in response to the second touch input, transmitting the map data for the point of interest from the first electronic device to the second electronic device associated with the recipient.

16. The electronic device of claim 15, wherein the program further comprises sets of instructions for:
receiving the selection of the point of interest while the device is currently navigating a route, wherein the point of interest does not lie on the route;
in response to the selection, displaying a first map data sharing control and a second map data sharing control;
wherein when the first map data sharing control is selected, map data for the navigated route is transmitted to the second electronic device associated with the recipient, and
wherein when the second map data sharing control is selected, map data for the selected point of interest is transmitted to the second electronic device associated with the recipient.

17. The electronic device of claim 13, wherein the program further comprises sets of instructions for:
receiving, by the electronic device, a search query comprising one or more input characters;
displaying a list of search results corresponding to the one or more input characters;
receiving a selection of a first search result from the list of search results;
displaying map data for the first search result on the display screen;
receiving the touch input on the first graphical element; and
in response to the input,
transmitting the map data corresponding to the first search result from the first electronic device to the second electronic device associated with the recipient.

* * * * *